United States Patent
Arnott et al.

(10) Patent No.: US 8,374,937 B2
(45) Date of Patent: Feb. 12, 2013

(54) NON-CAPITALIZATION WEIGHTED INDEXING SYSTEM, METHOD AND COMPUTER PROGRAM PRODUCT

(75) Inventors: Robert D. Arnott, Newport Beach, CA (US); Paul Christopher Wood, Waltham (GB)

(73) Assignee: Research Affiliates, LLC, Newport Beach, CA (US)

( * ) Notice: Subject to any disclaimer, the term of this patent is extended or adjusted under 35 U.S.C. 154(b) by 313 days.

(21) Appl. No.: 12/619,668

(22) Filed: Nov. 16, 2009

(65) Prior Publication Data
US 2010/0287116 A1 Nov. 11, 2010

Related U.S. Application Data

(63) Continuation-in-part of application No. 11/931,913, filed on Oct. 31, 2007, now Pat. No. 8,005,740, and a continuation-in-part of application No. 11/509,002, filed on Aug. 24, 2006, now Pat. No. 7,747,502, application No. 12/619,668, which is a continuation- (Continued)

(51) Int. Cl.
*G06Q 40/00* (2012.01)
(52) U.S. Cl. ............................. 705/36 R; 705/35; 705/37
(58) Field of Classification Search ................ 705/36 R, 705/35
See application file for complete search history.

(56) References Cited

U.S. PATENT DOCUMENTS

| | | | |
|---|---|---|---|
| 4,334,270 A | 6/1982 | Towers | |
| 4,871,177 A | 10/1989 | Mock | |
| 4,933,842 A | 6/1990 | Durbin et al. | |
| 4,974,983 A | 12/1990 | Givati et al. | |
| 5,101,353 A | 3/1992 | Lupien et al. | |
| 5,126,936 A | 6/1992 | Champion et al. | |
| 5,132,899 A | 7/1992 | Fox | |
| 5,193,056 A | 3/1993 | Boes | |
| 5,220,500 A | 6/1993 | Baird et al. | |
| 5,414,838 A | 5/1995 | Kolton et al. | |

(Continued)

FOREIGN PATENT DOCUMENTS

| | | |
|---|---|---|
| EP | 1351179 A1 | 10/2003 |
| GB | 2393532 | 3/2004 |

(Continued)

OTHER PUBLICATIONS

John D. Bazley, Financial Accounting Concepts and Uses, PWS-Kent Publishing Company, 1988, p. 4.*

(Continued)

*Primary Examiner* — Gregory Johnson
(74) *Attorney, Agent, or Firm* — ATFirm; Ralph P. Albrecht

(57) ABSTRACT

An investment system based on indexes created from various metrics is disclosed. The indexes may be built by selecting from a universe of assets, a subset using selection and weighting metrics substantially independent of market capitalization weighting, price weighting, or equal weighting. These metrics may include, but are not limited to book value, sales, dividends, cash flow, employees, demographics, etc. A combination of financial non-market capitalization metrics may be used along with non-financial metrics to create passive investment systems. Once the index is built, it may be used as a basis to purchase securities for a portfolio. As the data underlying the indexes change because of, e.g., economic activity, the index may be updated and may be used as a basis to rebalance the portfolio. Valuation indifferent indexes of the present invention avoid overexposure to overvalued securities and underexposure to undervalued securities, as compared with conventional capitalization-weighted price-weighted indexes.

97 Claims, 5 Drawing Sheets

Related U.S. Application Data in-part of application No. 11/196,509, filed on Aug. 4, 2005, now Pat. No. 7,620,577, which is a continuation-in-part of application No. 10/159,610, filed on Jun. 3, 2002, now abandoned, and a continuation-in-part of application No. 10/961,404, filed on Oct. 12, 2004, now Pat. No. 7,792,719, which is a continuation-in-part of application No. 11/509,002, which is a continuation-in-part of application No. 11/196,509, which is a continuation-in-part of application No. 12/554,961, filed on Sep. 7, 2009, which is a continuation-in-part of application No. 11/931,913, and a continuation-in-part of application No. 11/509,003, filed on Aug. 24, 2006, now Pat. No. 7,587,352, which is a continuation-in-part of application No. 10/252,761, filed on Sep. 23, 2002, now Pat. No. 7,117,175.

(60) Provisional application No. 60/896,867, filed on Mar. 23, 2007, provisional application No. 60/541,733, filed on Feb. 4, 2004, provisional application No. 60/751,212, filed on Dec. 19, 2005, provisional application No. 60/371,662, filed on Apr. 10, 2002.

(56) References Cited

U.S. PATENT DOCUMENTS

| | | | |
|---|---|---|---|
| 5,590,325 A | 12/1996 | Kolton et al. | |
| 5,592,379 A | 1/1997 | Finfrock et al. | |
| 5,644,727 A | 7/1997 | Atkins | |
| 5,745,706 A | 4/1998 | Wolfberg et al. | |
| 5,761,442 A | 6/1998 | Barr et al. | |
| 5,778,357 A | 7/1998 | Kolton et al. | |
| 5,806,048 A | 9/1998 | Kiron | |
| 5,812,987 A * | 9/1998 | Luskin et al. | 705/36 R |
| 5,812,988 A | 9/1998 | Sandretto | |
| 5,819,238 A * | 10/1998 | Fernholz | 705/36 R |
| 5,819,263 A | 10/1998 | Bromley et al. | |
| 5,873,071 A | 2/1999 | Ferstenberg et al. | |
| 5,875,437 A | 2/1999 | Atkins | |
| 5,878,405 A | 3/1999 | Grant et al. | |
| 5,911,135 A | 6/1999 | Atkins | |
| 5,918,217 A | 6/1999 | Maggioncalda et al. | |
| 5,926,792 A | 7/1999 | Koppes et al. | |
| 5,930,774 A | 7/1999 | Chennault | |
| 5,946,666 A | 8/1999 | Nevo et al. | |
| 5,946,667 A | 8/1999 | Tull, Jr. et al. | |
| 5,978,778 A | 11/1999 | O'Shaughnessy | |
| 5,987,433 A | 11/1999 | Crapo | |
| 6,003,018 A | 12/1999 | Michaud et al. | |
| 6,012,043 A | 1/2000 | Albright et al. | |
| 6,012,044 A | 1/2000 | Maggioncalda et al. | |
| 6,018,722 A | 1/2000 | Ray et al. | |
| 6,021,397 A | 2/2000 | Jones et al. | |
| 6,049,772 A | 4/2000 | Payne et al. | |
| 6,052,673 A | 4/2000 | Leon et al. | |
| 6,061,663 A | 5/2000 | Bloom et al. | |
| 6,064,985 A | 5/2000 | Anderson | |
| 6,073,116 A | 6/2000 | Boyle | |
| 6,078,904 A | 6/2000 | Rebane | |
| 6,088,685 A | 7/2000 | Kiron et al. | |
| 6,092,056 A | 7/2000 | Tull, Jr. et al. | |
| 6,115,697 A | 9/2000 | Gottstein et al. | |
| 6,134,535 A | 10/2000 | Belzberg et al. | |
| 6,154,732 A | 11/2000 | Tarbox | |
| 6,161,098 A * | 12/2000 | Wallman | 705/36 T |
| 6,175,824 B1 | 1/2001 | Breitzman et al. | |
| 6,233,566 B1 | 5/2001 | Levine et al. | |
| 6,240,399 B1 | 5/2001 | Frank et al. | |
| 6,247,001 B1 | 6/2001 | Tresp et al. | |
| 6,272,474 B1 | 8/2001 | Garcia | |
| 6,292,787 B1 | 9/2001 | Scott et al. | |
| 6,317,700 B1 | 11/2001 | Bagne | |
| 6,317,726 B1 | 11/2001 | O'Shaughnessy | |
| 6,317,728 B1 | 11/2001 | Kane | |
| 6,336,103 B1 | 1/2002 | Baker | |
| 6,338,047 B1 | 1/2002 | Wallman | |
| 6,338,067 B1 | 1/2002 | Baker et al. | |
| 6,377,963 B1 | 4/2002 | Walker et al. | |
| 6,393,409 B2 * | 5/2002 | Young et al. | 705/37 |
| 6,405,204 B1 | 6/2002 | Baker et al. | |
| 6,456,982 B1 | 9/2002 | Pilipovic | |
| 6,484,151 B1 | 11/2002 | O'Shaughnessy | |
| 6,484,152 B1 | 11/2002 | Robinson | |
| 6,516,303 B1 * | 2/2003 | Wallman | 705/36 T |
| 6,598,028 B1 | 7/2003 | Sullivan et al. | |
| 6,601,044 B1 | 7/2003 | Wallman | |
| 6,622,129 B1 | 9/2003 | Whitworth | |
| 6,687,681 B1 * | 2/2004 | Schulz et al. | 705/36 T |
| 6,839,685 B1 | 1/2005 | Leistensnider et al. | |
| 6,859,785 B2 | 2/2005 | Case | |
| 6,876,981 B1 | 4/2005 | Berckmans | |
| 6,879,964 B2 | 4/2005 | Sauter et al. | |
| 6,901,383 B1 | 5/2005 | Ricketts et al. | |
| 6,920,432 B1 | 7/2005 | Carey | |
| 6,928,418 B2 | 8/2005 | Michaud et al. | |
| 6,938,009 B1 | 8/2005 | Herbst et al. | |
| 6,941,280 B1 | 9/2005 | Gastineau et al. | |
| 6,947,901 B1 | 9/2005 | McCabe et al. | |
| 6,985,880 B1 | 1/2006 | Hodgdon et al. | |
| 7,016,873 B1 | 3/2006 | Peterson et al. | |
| 7,024,388 B2 | 4/2006 | Stefek et al. | |
| 7,031,937 B2 | 4/2006 | Brown et al. | |
| 7,035,820 B2 | 4/2006 | Goodwin et al. | |
| 7,047,217 B1 | 5/2006 | Gottstein | |
| 7,050,998 B1 | 5/2006 | Kale et al. | |
| 7,076,461 B2 | 7/2006 | Balabon | |
| 7,085,738 B2 | 8/2006 | Tarrant | |
| 7,089,191 B2 | 8/2006 | Baron et al. | |
| 7,089,202 B1 | 8/2006 | McNamar et al. | |
| 7,089,205 B1 | 8/2006 | Abernethy | |
| 7,092,857 B1 | 8/2006 | Steiner et al. | |
| 7,099,838 B1 | 8/2006 | Gastineau et al. | |
| 7,107,229 B1 | 9/2006 | Sullivan | |
| 7,117,175 B2 | 10/2006 | Arnott | |
| 7,127,423 B2 | 10/2006 | Dunning et al. | |
| 7,155,468 B2 | 12/2006 | Weiss | |
| 7,165,044 B1 | 1/2007 | Chaffee | |
| 7,177,831 B1 * | 2/2007 | O'Shaughnessy et al. | 705/36 R |
| 7,194,468 B1 | 3/2007 | Bacila et al. | |
| 7,206,760 B1 | 4/2007 | Carey et al. | |
| 7,222,093 B2 | 5/2007 | Block et al. | |
| 7,222,095 B2 | 5/2007 | Squyres | |
| 7,249,080 B1 * | 7/2007 | Hoffman et al. | 705/36 R |
| 7,249,086 B2 | 7/2007 | Bloom et al. | |
| 7,251,627 B1 | 7/2007 | Vass | |
| 7,272,578 B1 | 9/2007 | Leistensnider et al. | |
| 7,295,987 B2 | 11/2007 | Graff | |
| 7,299,205 B2 | 11/2007 | Weinberger | |
| 7,305,362 B2 | 12/2007 | Weber et al. | |
| 7,330,831 B2 * | 2/2008 | Biondi et al. | 705/36 T |
| 7,353,115 B2 | 4/2008 | Bertogg | |
| 7,353,198 B2 | 4/2008 | Rios | |
| 7,366,692 B2 | 4/2008 | Alcaly et al. | |
| 7,395,236 B2 | 7/2008 | Degraaf et al. | |
| 7,412,414 B2 | 8/2008 | Michaud et al. | |
| 7,418,419 B2 | 8/2008 | Squyres | |
| 7,421,405 B2 | 9/2008 | Little | |
| 7,444,300 B1 | 10/2008 | Broms et al. | |
| 7,496,531 B1 | 2/2009 | Gastineau et al. | |
| 7,509,274 B2 * | 3/2009 | Kam et al. | 705/35 |
| 7,509,278 B2 | 3/2009 | Jones | |
| 7,571,130 B2 | 8/2009 | Weber | |
| 7,571,134 B1 | 8/2009 | Burns | |
| 7,587,352 B2 | 9/2009 | Arnott | |
| 7,590,584 B1 * | 9/2009 | Stokes et al. | 705/37 |
| 7,620,577 B2 | 11/2009 | Arnott et al. | |
| 7,664,694 B2 | 2/2010 | Brandhorst | |
| 7,668,773 B1 * | 2/2010 | Pruitt | 705/36 T |
| 7,685,069 B1 | 3/2010 | Subramanian | |
| 7,698,192 B2 | 4/2010 | Kiron | |
| 7,742,969 B2 | 6/2010 | Teague et al. | |
| 7,747,502 B2 | 6/2010 | Arnott | |
| 7,792,719 B2 | 9/2010 | Arnott | |

| Patent/Publication | Date | Name |
|---|---|---|
| 7,885,885 B1 | 2/2011 | Strongin, II et al. |
| 7,958,038 B2 | 6/2011 | Choueifaty |
| 8,005,740 B2 | 8/2011 | Arnott et al. |
| 8,024,217 B2 | 9/2011 | Sadre |
| 8,024,258 B2 | 9/2011 | Gastineau et al. |
| 8,131,620 B1 | 3/2012 | Steinberg et al. |
| 8,306,892 B1 | 11/2012 | Gross et al. |
| 2001/0025266 A1 | 9/2001 | Gastineau et al. |
| 2001/0037212 A1 | 11/2001 | Motosuna et al. |
| 2001/0039526 A1 | 11/2001 | Pittenger |
| 2001/0046846 A1 | 11/2001 | Tsumura |
| 2001/0049651 A1* | 12/2001 | Selleck ............ 705/37 |
| 2002/0003729 A1 | 1/2002 | Uchihashi |
| 2002/0007329 A1 | 1/2002 | Alcaly et al. |
| 2002/0007332 A1 | 1/2002 | Johnson et al. |
| 2002/0013755 A1 | 1/2002 | Kiron |
| 2002/0023035 A1 | 2/2002 | Kiron |
| 2002/0032629 A1 | 3/2002 | Siegel et al. |
| 2002/0038271 A1 | 3/2002 | Friend et al. |
| 2002/0046038 A1 | 4/2002 | Prokoski |
| 2002/0052820 A1 | 5/2002 | Gatto |
| 2002/0059126 A1 | 5/2002 | Ricciardi |
| 2002/0059127 A1* | 5/2002 | Brown et al. ............ 705/36 |
| 2002/0062272 A1 | 5/2002 | Kim et al. |
| 2002/0111891 A1* | 8/2002 | Hoffman et al. ............ 705/36 |
| 2002/0116211 A1 | 8/2002 | Hatakeyama |
| 2002/0116310 A1 | 8/2002 | Cohen et al. |
| 2002/0116311 A1 | 8/2002 | Chalke et al. |
| 2002/0120541 A1* | 8/2002 | D'Ambrosio et al. ......... 705/36 |
| 2002/0120570 A1 | 8/2002 | Loy |
| 2002/0123952 A1 | 9/2002 | Lipper |
| 2002/0128947 A1 | 9/2002 | Sauter et al. |
| 2002/0128951 A1 | 9/2002 | Kiron |
| 2002/0133447 A1 | 9/2002 | Mastman |
| 2002/0138381 A1* | 9/2002 | Tomecek ............ 705/36 |
| 2002/0143676 A1 | 10/2002 | Kiron |
| 2002/0143682 A1 | 10/2002 | Bergmann et al. |
| 2002/0156713 A1 | 10/2002 | Gaini |
| 2002/0161684 A1 | 10/2002 | Whitworth |
| 2002/0173998 A1 | 11/2002 | Case |
| 2002/0174045 A1* | 11/2002 | Arena et al. ............ 705/36 |
| 2002/0174047 A1 | 11/2002 | Fernholz |
| 2002/0178039 A1 | 11/2002 | Kennedy |
| 2002/0184126 A1 | 12/2002 | McIntyre |
| 2003/0004849 A1 | 1/2003 | Velez et al. |
| 2003/0014343 A1 | 1/2003 | Jones |
| 2003/0018556 A1 | 1/2003 | Squyres |
| 2003/0018563 A1 | 1/2003 | Kilgour et al. |
| 2003/0018570 A1 | 1/2003 | McCabe et al. |
| 2003/0036989 A1 | 2/2003 | Bhatia |
| 2003/0046215 A1 | 3/2003 | Teague et al. |
| 2003/0061169 A1 | 3/2003 | Long, III et al. |
| 2003/0065599 A1 | 4/2003 | Huang |
| 2003/0065600 A1 | 4/2003 | Terashima et al. |
| 2003/0065602 A1 | 4/2003 | Yip |
| 2003/0065604 A1 | 4/2003 | Gatto |
| 2003/0065605 A1 | 4/2003 | Gatto |
| 2003/0069822 A1 | 4/2003 | Ito et al. |
| 2003/0074293 A1 | 4/2003 | Kiron |
| 2003/0074295 A1 | 4/2003 | Little |
| 2003/0074306 A1 | 4/2003 | Rios et al. |
| 2003/0088489 A1 | 5/2003 | Peters et al. |
| 2003/0093352 A1 | 5/2003 | Muralidhar et al. |
| 2003/0105697 A1* | 6/2003 | Griffin et al. ............ 705/36 |
| 2003/0120577 A1 | 6/2003 | Sakui et al. |
| 2003/0120578 A1 | 6/2003 | Newman |
| 2003/0126054 A1 | 7/2003 | Purcell |
| 2003/0144947 A1 | 7/2003 | Payne |
| 2003/0154151 A1 | 8/2003 | Biondi et al. |
| 2003/0172018 A1 | 9/2003 | Chen et al. |
| 2003/0172026 A1 | 9/2003 | Tarrant |
| 2003/0182219 A1 | 9/2003 | Bodurtha et al. |
| 2003/0191704 A1 | 10/2003 | Alb |
| 2003/0208427 A1 | 11/2003 | Peters et al. |
| 2003/0212621 A1 | 11/2003 | Poulter et al. |
| 2003/0225657 A1 | 12/2003 | Whaley et al. |
| 2003/0225658 A1 | 12/2003 | Whaley |
| 2003/0225662 A1* | 12/2003 | Horan et al. ............ 705/36 |
| 2003/0225663 A1* | 12/2003 | Horan et al. ............ 705/36 |
| 2003/0229555 A1 | 12/2003 | Marlowe-Noren |
| 2004/0002910 A1* | 1/2004 | Mizukami ............ 705/36 |
| 2004/0024671 A1 | 2/2004 | Freund |
| 2004/0039620 A1 | 2/2004 | Ando et al. |
| 2004/0044505 A1 | 3/2004 | Horwitz |
| 2004/0049448 A1 | 3/2004 | Glickman |
| 2004/0068456 A1 | 4/2004 | Korisch |
| 2004/0083150 A1 | 4/2004 | Michaud et al. |
| 2004/0083151 A1 | 4/2004 | Craig et al. |
| 2004/0093294 A1 | 5/2004 | Trevino |
| 2004/0111352 A1 | 6/2004 | Kim |
| 2004/0117284 A1 | 6/2004 | Speth |
| 2004/0133497 A1 | 7/2004 | Spear |
| 2004/0139031 A1 | 7/2004 | Amaitis et al. |
| 2004/0167847 A1 | 8/2004 | Nathan |
| 2004/0181436 A1 | 9/2004 | Lange |
| 2004/0181477 A1 | 9/2004 | Sauter et al. |
| 2004/0193528 A1 | 9/2004 | Sadre |
| 2004/0210504 A1 | 10/2004 | Rutman |
| 2004/0225536 A1 | 11/2004 | Schoen et al. |
| 2004/0236661 A1 | 11/2004 | Benning |
| 2004/0254871 A1 | 12/2004 | Weiss |
| 2004/0267657 A1 | 12/2004 | Hecht |
| 2005/0010481 A1 | 1/2005 | Lutnick et al. |
| 2005/0015326 A1 | 1/2005 | Terry |
| 2005/0033679 A1 | 2/2005 | Rachev et al. |
| 2005/0038725 A1 | 2/2005 | Boyle et al. |
| 2005/0049948 A1 | 3/2005 | Fuscone |
| 2005/0049952 A1 | 3/2005 | Carter |
| 2005/0060254 A1 | 3/2005 | Jones |
| 2005/0080704 A1 | 4/2005 | Erlach et al. |
| 2005/0108043 A1 | 5/2005 | Davidson |
| 2005/0108148 A1 | 5/2005 | Carlson |
| 2005/0114169 A1 | 5/2005 | Ansari |
| 2005/0114251 A1 | 5/2005 | Sperandeo |
| 2005/0144107 A1 | 6/2005 | Plonski |
| 2005/0149422 A1 | 7/2005 | Van Lier |
| 2005/0171884 A1 | 8/2005 | Arnott |
| 2005/0171894 A1 | 8/2005 | Traynor |
| 2005/0192889 A1 | 9/2005 | Sauter et al. |
| 2005/0216387 A1 | 9/2005 | Barany et al. |
| 2005/0216407 A1 | 9/2005 | Feldman et al. |
| 2005/0222941 A1 | 10/2005 | Tull |
| 2005/0228731 A1 | 10/2005 | Coates |
| 2005/0228734 A1 | 10/2005 | Pagani |
| 2005/0246255 A1 | 11/2005 | Rousseau et al. |
| 2005/0246260 A1 | 11/2005 | Hodgdon et al. |
| 2006/0015433 A1 | 1/2006 | Arnott et al. |
| 2006/0020531 A1 | 1/2006 | Veeneman et al. |
| 2006/0041489 A1 | 2/2006 | Arnott |
| 2006/0059074 A1 | 3/2006 | Freund |
| 2006/0064364 A1 | 3/2006 | Whitehead |
| 2006/0074787 A1 | 4/2006 | Perg et al. |
| 2006/0080192 A1 | 4/2006 | McCabe |
| 2006/0100946 A1 | 5/2006 | Kazarian |
| 2006/0100949 A1 | 5/2006 | Whaley et al. |
| 2006/0100950 A1 | 5/2006 | Hecht |
| 2006/0100955 A1 | 5/2006 | Baldassini et al. |
| 2006/0149645 A1 | 7/2006 | Wood |
| 2006/0149649 A1 | 7/2006 | Hernandez |
| 2006/0161489 A1 | 7/2006 | Allen et al. |
| 2006/0184438 A1 | 8/2006 | McDow |
| 2006/0184444 A1 | 8/2006 | McConaughy et al. |
| 2006/0190371 A1 | 8/2006 | Almgren et al. |
| 2006/0200395 A1 | 9/2006 | Masuyama et al. |
| 2006/0206398 A1 | 9/2006 | Coughlin |
| 2006/0206405 A1 | 9/2006 | Gambill |
| 2006/0212384 A1 | 9/2006 | Spurgin et al. |
| 2006/0218075 A1 | 9/2006 | Feldman et al. |
| 2006/0224487 A1 | 10/2006 | Galdi |
| 2006/0224494 A1 | 10/2006 | Pinkava |
| 2006/0247996 A1 | 11/2006 | Feldman |
| 2006/0253363 A1 | 11/2006 | Tarrant |
| 2006/0253376 A1 | 11/2006 | Seale et al. |
| 2006/0271452 A1 | 11/2006 | Sparaggis |
| 2006/0294000 A1 | 12/2006 | Bassett et al. |
| 2007/0005471 A1 | 1/2007 | Ho et al. |
| 2007/0005476 A1 | 1/2007 | Ho et al. |
| 2007/0016497 A1 | 1/2007 | Shalen et al. |

| | | | |
|---|---|---|---|
| 2007/0022033 A1 | 1/2007 | Ho et al. |
| 2007/0027790 A1 | 2/2007 | Gastineau et al. |
| 2007/0043644 A1 | 2/2007 | Weiss |
| 2007/0043650 A1 | 2/2007 | Hughes et al. |
| 2007/0055598 A1 | 3/2007 | Arnott et al. |
| 2007/0055599 A1 | 3/2007 | Arnott |
| 2007/0061235 A1 | 3/2007 | Timmons et al. |
| 2007/0078743 A1 | 4/2007 | Shilpiekandula et al. |
| 2007/0078744 A1 | 4/2007 | Koss et al. |
| 2007/0112657 A1 | 5/2007 | Huber |
| 2007/0112662 A1 | 5/2007 | Kumar |
| 2007/0118453 A1 | 5/2007 | Bauerschmidt et al. |
| 2007/0118454 A1 | 5/2007 | Bauerschmidt et al. |
| 2007/0118455 A1 | 5/2007 | Albert et al. |
| 2007/0118459 A1 | 5/2007 | Bauerschmidt et al. |
| 2007/0118460 A1 | 5/2007 | Bauerschmidt et al. |
| 2007/0136172 A1 | 6/2007 | West |
| 2007/0174102 A1 | 7/2007 | Coulter |
| 2007/0179874 A1 | 8/2007 | Spirgel et al. |
| 2007/0192228 A1 | 8/2007 | Phelps et al. |
| 2007/0198389 A1 | 8/2007 | Orloske et al. |
| 2007/0219894 A1 | 9/2007 | Guichard |
| 2007/0239571 A1 | 10/2007 | Michaletz |
| 2007/0239583 A1 | 10/2007 | Williams |
| 2007/0244787 A1 | 10/2007 | Lowry |
| 2007/0265952 A1 | 11/2007 | Kridel |
| 2007/0288339 A1 | 12/2007 | Squyres |
| 2008/0071699 A1 | 3/2008 | Catalano-Johnson |
| 2008/0071700 A1 | 3/2008 | Catalano-Johnson |
| 2008/0071702 A1 | 3/2008 | Howard et al. |
| 2008/0091622 A1 | 4/2008 | Yass et al. |
| 2008/0109377 A1 | 5/2008 | Haig |
| 2008/0140547 A1 | 6/2008 | Murphy et al. |
| 2008/0208769 A1 | 8/2008 | Beer et al. |
| 2008/0215502 A1 | 9/2008 | Sabbia |
| 2008/0235121 A1 | 9/2008 | Gonen |
| 2008/0243717 A1 | 10/2008 | Rios |
| 2008/0243721 A1 | 10/2008 | Joao |
| 2008/0249957 A1 | 10/2008 | Masuyama |
| 2008/0270317 A1 | 10/2008 | Waldron et al. |
| 2008/0288387 A1 | 11/2008 | Meyerhoff, II |
| 2008/0288416 A1 | 11/2008 | Arnott |
| 2008/0294539 A1 | 11/2008 | Bassuk |
| 2008/0313100 A1 | 12/2008 | Weber et al. |
| 2009/0006267 A1 | 1/2009 | Fergusson et al. |
| 2009/0006274 A1 | 1/2009 | Levin et al. |
| 2009/0018966 A1 | 1/2009 | Clark |
| 2009/0063363 A1 | 3/2009 | Present et al. |
| 2009/0138407 A1 | 5/2009 | Trease |
| 2009/0164388 A1 | 6/2009 | Jones |
| 2009/0182683 A1 | 7/2009 | Taylor |
| 2009/0198631 A1 | 8/2009 | McGarel |
| 2010/0063942 A1 | 3/2010 | Arnott |
| 2010/0070429 A1 | 3/2010 | Spurgin et al. |
| 2010/0153296 A1 | 6/2010 | Volpert et al. |
| 2010/0191628 A1 | 7/2010 | Arnott et al. |
| 2010/0262563 A1 | 10/2010 | Arnott et al. |
| 2010/0287113 A1 | 11/2010 | Lo et al. |
| 2010/0287116 A1 | 11/2010 | Arnott et al. |

FOREIGN PATENT DOCUMENTS

| | | |
|---|---|---|
| GB | 2419011 A | 4/2006 |
| JP | 10-275177 | 10/1998 |
| JP | 2001249962 A | 9/2001 |
| JP | 20010249962 A | 9/2001 |
| JP | 2002-502514 | 1/2002 |
| JP | 2002-512405 | 4/2002 |
| JP | 2003044664 A | 2/2003 |
| JP | 2003-150779 | 5/2003 |
| JP | A2003-150779 | 5/2003 |
| JP | 2003-187052 | 7/2003 |
| JP | A2004-029882 | 1/2004 |
| JP | 2004259156 A | 9/2004 |
| JP | T 2007-502463 | 2/2007 |
| JP | T 2007-522562 | 8/2007 |
| WO | WO-96/06402 A2 | 2/1996 |
| WO | WO 96/06402 A2 | 2/1996 |
| WO | WO 97/22075 | 6/1997 |
| WO | WO-98/44444 | 10/1998 |
| WO | WO-99/23592 A1 | 5/1999 |
| WO | WO-00/16226 A1 | 3/2000 |
| WO | WO00/70484 | 11/2000 |
| WO | WO 01/33402 A2 | 5/2001 |
| WO | WO-01/33402 A2 | 5/2001 |
| WO | WO-01/37168 A2 | 5/2001 |
| WO | WO 01/37168 A2 | 5/2001 |
| WO | WO-01/39005 A2 | 5/2001 |
| WO | WO 01/39005 A2 | 5/2001 |
| WO | WO-01/46846 | 6/2001 |
| WO | WO 01/46846 | 6/2001 |
| WO | WO01/46846 | 6/2001 |
| WO | WO-01/48629 A1 | 7/2001 |
| WO | WO 02/093322 | 11/2002 |
| WO | WO-02/093322 | 11/2002 |
| WO | WO-02/095639 | 11/2002 |
| WO | WO 02/095639 | 11/2002 |
| WO | WO-03/009094 | 1/2003 |
| WO | WO-03/009094 A2 | 1/2003 |
| WO | WO03/032206 | 4/2003 |
| WO | WO-03/034180 A2 | 4/2003 |
| WO | WO2005/019986 | 3/2005 |
| WO | WO2005/076812 A2 | 8/2005 |
| WO | WO2005/076812 A3 | 8/2005 |
| WO | WO 2005/098723 | 10/2005 |
| WO | WO-2006/089565 A2 | 8/2006 |
| WO | WO 2006/089565 A2 | 8/2006 |
| WO | WO-2006/101764 A1 | 9/2006 |
| WO | WO-2006101764 A1 | 9/2006 |
| WO | WO-2006/103474 A2 | 10/2006 |
| WO | WO 2006/103474 A2 | 10/2006 |
| WO | WO-2007/027200 A2 | 3/2007 |

OTHER PUBLICATIONS

Business Wire, INVESTMENT-TECHNLGIES; (IVES) Jan. 6, 1989, p. 1.*
Diversity-Weighted Indexing, Robert Femholz, Journal of Portfolio Management, Winter 1998, pp. 74-82.*
Investing at the edge (investing in non-capitalization weighted index funds), Jarrod W Wilcox, Journal of Portfolio Management, New York, Spring 1998, vol. 24, Iss. 3; 16 pgs.*
Fundamental Indexation, Robert Arnott, 2004; 36-pages.*
Advisory Action dated Feb. 25, 2009 issued in related U.S. Appl. No. 11/196,509.
Arnott et al., "Redefining Indexation," Research Affiliates, LLC, pp. 1-24, 2004.
Arnott, et al., "Fundamental Indexation," Financial Analysis Journal, vol. 61, No. 2, pp. 83-89, Mar./Apr. 2005.
Arnott, et al., "Redefining Indexation," Research Affiliates, LLC, pp. 1-24, 2004.
Arnott, Rob and Hennessy, David, "Research Affiliates Fundamental Index," Feb. 2006.
Arnott, Robert D. et al., "The Management and Mismanagement of Taxable Assets," First Quadrant, L.P., Investment Management Reflections, 2000, No. 2.
Arnott, Robert D., "*An Overwrought Orthodoxy*", Institutional Investor Magazine, Dec. 2006.
Arnott, Robert D., "*Disentangling Size and Value*", Financial Analyst Journal, Sep. 2005.
Arnott, Robert D., "What Cost Noise?" Financial Analysts Journal, Editor's Corner, CFA Institute, Mar./Apr. 2005, pp. 10-14.
Arnott, Robert D., "*Whither Finance Theory*", Financial Analysts Journal, Jan./Feb. 2005.
Arnott, Robert D., et al., "*Does Noise Create the Size and Value Effect?*", Working Paper, Jan. 2007.
Arnott, Robert D., et al., "Fundamental Indexes: Current and Future Applications", Institutional Investor Journals, Fall 2006.
Arnott, Robert D., et al., "*Noise CAPM and the Size and Value Effects*", Journal of Investment Management, vol. 5, No. 1, Jan. 2007.
Arnott, Robert, "Retrospectives on Selected Fundamental Index Strategies," Research Affiliates, Dec. 2005.
Arnott, Robert, Hsu, Jason, Moore, Phil, "Redefining Indexation," Sep. 9, 2004.
Arvedlund, Erin E., "*Wall Street Pushes Designer Index Funds*", The Wall Street Journal, Aug. 25, 2005.

Asness, Clifford, "New and Improved Same Old Thing: The Value of Fundamental Indexing", Institutional Investor Magazine, Oct. 2006.
Asness, Clifford, "The Value of Fundamental Indexing", Daily ii.com a.k.a. Institutional Investor, Oct. 19, 2006.
Author Unknown, "About Corporate Bonds, Overview," www.investinginbonds.com, The Securities Industry and Financial markets Association, 2005, p. 1.
Author Unknown, "About the America's Fastest Growing companies Family of Stock Indexes," America's Fastest Growing Companies, Jan. 2002.
Author Unknown, "America's Fastest Growing Companies Index," America's Fastest Growing Companies, Jan. 2002.
Author Unknown, "America's Fastest Growing Companies LargeCap Index," America's Fastest Growing Companies, Jan. 2002.
Author Unknown, "America's Fastest Growing Companies Midcap Index," America's Fastest Growing Companies, Jan. 2002.
Author Unknown, "America's Fastest Growing Companies Total Growth Index," America's Fastest Growing Companies, Jan. 2002.
Author Unknown, "Bond Basics, Fundamental Investment Strategies," www.investinginbonds.com, The Securities Industry and Financial Markets Association, 2005, p. 1.
Author Unknown, "Bond Basics: Selecting a Fixed Income Benchmark," www.pimco.com, A company of Allianz, Jul. 2006, pp. 1-5.
Author Unknown, "CaIPERS Goes Fundamental," News, Indexing Developments, Journal of Indexes, May/Jun. 2006, p. 52.
Author Unknown, "CME: Goldman Sachs Commodity Index (GSCI) to include CME Feeder Cattle in 2002 INdex Weighting," Nov. 7, 2001.
Author Unknown, "Dividend Party Goes Global," Journal of Indexes, Mar./Apr. 2006, p. 52.
Author Unknown, "Emerging Markets May Offer Opportunity to Enhance Returns," www.pimco.com, an Allianz Company, Oct. 2005, pp. 1-3.
Author Unknown, "FTSE/RAFI PowerShares ETF Launches on Big Board," Journal of Indexes, Mar./Apr. 2006, pp. 51-52.
Author Unknown, "Generation OPM," Wall Street Technology, www.wallstreetandtech.com, Oct. 25, 2004.
Author Unknown, "Index Industry Leaders . . . In Their Own Words," Journal of Indexes, Sep./Oct. 2006, pp. 10-21.
Author Unknown, "Methodology for the Management of the FTSE RAFI (Research Affiliates Fundamental Index) Index Series," The FTSE RAFI Index Series Ground Rules, Version 1.1, Dec. 2005.
Author Unknown, "MSCI Methodology Book: MSCI Global Value and Growth Index Series," Morgan Stanley Capital International Inc., pp. 1, 2, 8-11, 2003.
Author Unknown, "MSCI to Adjust for Free Float and to Increase Coverage to 85%," MSCI Press Release, www.msci.com, Geneva, Dec. 10, 2000, pp. 1-3.
Author Unknown, "Optimal Value-Weighted Portfolios," Economist's View: Value Weighted Portfolios, Jun. 14, 2006.
Author Unknown, "PowerShares Exchange-Traded Fund Trust," PowerShares FTSE RAFI US 1000 Portfolio-PRF, Prospectus Supplement dated Feb. 22, 2006, Prospectus dated Dec. 19, 2005.
Author Unknown, "PowerShares FTSE RAFI US 1000 Portfolio," www.powershares.com, PRF Facts, Sep. 30, 2005.
Author Unknown, "Separately Managed Accounts to Become Dominant Vehicle for Individual Securities," Tower Group Research, www.advisorpage.com/modules, Advisor Page, Competitive Intelligence, Feb. 6, 2008.
Author Unknown, "Stock Market Perspective: Better Ways to Index?" http://www.pankin.com/persp062.pdf.
Author Unknown, "The Role of Pricing Model Uncertainty"—Resolving Four Paradoxes in Today's Market Behavior,—Strategic Economic Decisions, www.SEDinc.com, SED Profile, May 2008.
Author Unknown, "The Role of high Yield Bonds," www.pimco.com, Publication, Feb. 2006, pp. 1-5.
Author Unknown, "Types of Bonds, Bond and Bond Funds; What You Should Know Before Deciding," www.investinginbonds.com, The Securities Industry and Financial Markets Association, 2005, pp. 1-2.
Author Unknown, "William F. Sharpe Awards—Plus Editorial Board Meeting Excerpts," Journal of Indexes, Mar./Apr. 2006, pp. 36-41.

Author Unknown, DRM Portion of CaIPERS' Presentation Given on Jan. 12, 2001, 4 pages.
Author Unknown, FRC Monitor, "Industry Trends," Nov. 2005.
Baker, Nick, "Arnott's 'Fundamental' Stock Index Beats S&P 500, Sparks Debate", Bloomberg.com, Oct. 18, 2006.
Baker, Nick, "Business: Marketplace by Bloomberg: Around the Markets, Rebuilding Indexes From Ground Up", International Herald Tribune, Oct. 19, 2006.
Baker, Nick, "Financial Post: FP Investing, Manager Adds Twist to Index Investing: Focus on Fundamentals", National Post (Canada), Oct. 19, 2006.
Baker, Nick, et al., "Fundamental' Index Sparks Debate: Arnott's FTSE RAFI US 1000 Beats the S&P 500 With a New Stock Weighting Method", Boomberg Markets Magazine, Feb. 2007.
Banz, Rolf W. et al., "Sample-Dependent Results Using Accounting and Market Data: Some Evidence," The Journal of Finance, vol. 41, No. 4 (Sep. 1986), pp. 779-793.
Barry Critchley, "You learn something new every day: New tricks to make the market work better," National Post (Canada), Jun. 15, 2007.
Bazley, John D., Financial Accounting Concepts and Uses, PWS-Kent Publishing Company, 1988, p. 4.
Beales, Richard, "*Getting Back to Fundamentals*", Financial Times, Feb. 24, 2006.
Bergstresser, Daniel, et al., "Investment Taxation and Portfolio Performance," Preliminary Draft, Boston College Finance Wednesday Seminar and the 2006 UNC Tax Symposium, Apr. 12, 2006.
Berman, David, "Claymore Fundamental Index ETF Among 'New Breed' of ETFs", National Post (Canada), Feb. 1, 2007.
Bernard, Victor et al., "Accounting-Based Stock Price Anomalies: Separating Market Inefficiencies from Risk," 1996 Contemporary Accounting Research Conference, Sep. 1996, pp. 1-57.
Blanchett, David, "Building the Best Index; Equal-Weighting vs. Market Capitalization," Journal of Indexes, Jan./Feb. 2006, pp. 40-42.
Bloomberg News, "Is Jobs' Job Safe Amid Options Scandals?, Business, Analyst Touts 'Fundamentals'", St. Paul Pioneer Press, (St. Paul, Minnesota), Oct. 22, 2006.
Bogle, John C., "'Value' Strategies", Wall Street Journal, Feb. 9, 2007.
Brad Zigler, "Fundamentalism and Asset Allocation," Registered Rep, Apr. 1, 2007.
Brad Zigler, "Fundamentalists at the Gates: The Trouble With Cap-Weighted Indexes," Seeking Alpha, May 31, 2007.
Brandhorst, Eric, "MSCI's Methodology Enhancements: Free-Float and Capitalization Extension," www.ssga.com, Jul. 20, 2001, pp. 1-6.
Brock, Woody, The Role of Pricing Model Uncertainty,:—Resolving Four Paradoxes in Today's Market Behavior, Strategic Economic Decisions, SED Profile May 2008.
Brockman, Joshua, "The New Calculus of Designer ETFs, Financial Engineers Create Enhanced Indexes" Kiplinger.com, Jun. 2006.
Brooke Southall, "Fundamental Differences Over Schwab Funds," Investment News, Apr. 9, 2007.
Brooke Southall, "Malkiel Defends Investing Strategy," Investment News, Feb. 26, 2007.
Brooke Southall, "Merrill Lynch Claymore International Fundamental Index Accelerator Securities, Series 2," Canada Newswire, Feb. 27, 2007.
Burke, Kevin, "The ETF Weighting Game," Registered Rep./www.registeredrep. com, Apr. 2007, pp. 79-88.
Burns, Scott, "As Index Funds Duke It Out, It Pays to Be Skeptical", The Boston Globe Via Boston.com, Nov. 12, 2006.
Burns, Scott, "Indexing Idea Has a Challenger", The Dallas Morning News Via DallasNews.com, Nov. 12, 2006.
Burns, Scott, "Sloth, Passivity Yield Tidy Profit, Index Funds and Broad Asset Class Diversification Keep Investing Simple", Austin-American Statesman, Statesman.com, Personal Finance, Dec. 24, 2006.
Burns, Scott, "The Looming Battle: Fundamental Vs. Traditional Indexing", Scottburns.com, Nov. 11, 2006.
Burr, Barry B., "*Arnott, CFA Ethical Dance*", Pensions & Investments Online, Oct. 17, 2005.
Burr, Barry B., "Fundamental Index Concept Gets Institutional Investors' Attention", Pensions &Investments Online, Sep. 19, 2005.

Burton Malkiel, "Many Happy Returns," Barron's, May 28, 2007.
Burton, Jonathan, "Putting ETFs in Their Place: Vanguard Indexing Guru Gus Sauter on the Best Kind of Exchanged-Traded Fund", MarketWatch.com, Jan. 9, 2007.
Business Wire, Investment Technologies, (IVES), Jan. 6, 1989, p. 1.
Capon, Andrew, "*Beta Boosting*", Institutional Investor, Oct. 2005.
Carpenter, Margie et al., "Rethinking the World: Global Economic Changes Are Demanding a More Sophisticated Evaluation of Your Clients' Portfolio Allocations", Financial Planning Magazine, Dec. 1, 2006.
Carrel, Lawrence, "Exchange-Traded Funds: ETF Focus Index Wars", SmartMoney.com, Aug. 16, 2006.
Carrel, Lawrence, "Exchanging Exchanges", SmartMoney.com, Sep. 20, 2006.
Carrick, Rob, "Report on Business: Globe Investor: Portfolio Strategy, New ETFs Will Whet Your Appetite (Sub-Head) the Products May Satisfy Investors Who Like the Low Cost and Flexibility of These Funds That Trade Like a Stock", The Globe & Mail (Toronto), Nov. 18, 2006.
Carrigan, Bill, "Being in Right Sector Proves Key With ETFs", Toronto Star, Business: Getting Technical, Sep. 15, 2006.
Chan, Louis K.C., et al., "Fundamentals and Stock Returns in Japan," The Journal of Finance, vol. 46, No. 5 (Dec. 1991), pp. 1739-1764.
Chan, Louis K.C., et al., "The Risk and Return from Factors," The Journal of Financial and Quantitative Analysis, vol. 33, No. 2 (Jun. 1998), pp. 159-188.
Chance, Don M., "Six One Way, Half-A-Dozen the Other," www.indexuniverse.com/component/content/article/4035, Trading Places, May/Jun. 2008.
Charles Leary, "The Harsh Light of Day," IndexUniverse.com, Mar. 8, 2007.
Charles Paikert, "AIM Investments® Launches AIM Independence Funds," Yahoo!Finance, Mar. 6, 2007.
Charles Paikert, "Index battle (pg. 2)," Investment News, Jul. 16, 2007.
Charles Paikert, "Oyster Bar powwow no pearl for Street," Investment News, Mar. 5, 2007.
Chernoff, Joel, "A New Look in Benchmarks: Consultant Devises Alternative Based on Country Wealth," Pensions & Investments Online, Issue Date: Apr. 14, 1997.
Christine Ong, "AIM Vies for Lifecycle Edge by Diversification," Ignites.com, Mar. 28, 2007.
Clements, Jonathan, "When Good Index Funds Go Bad: The Case for a 'Fundamental' Strategy", The Wall Street Journal Online, Sep. 21, 2005.
Coggan, Philip, "*A Sound Idea With Solid Backing*", Financial Times, Jul. 18, 2005.
Coggan, Philip, "Report: FT Fund Management, Fundamental Indices Are Proving Their Worth", Financial Times—UK Edition, Aug. 7, 2006.
Conboy, Bill et al., "PowerShares Capital Management Launches Ten New ETF Portfolios on NASDAQ", M2 Presswire, Sep. 20, 2006.
Consuelo Mack, "A message from Consuelo (an email to WealthTrack subscribers from Consuelo Mack)," PBS WealthTrack, May 24, 2007.
Coyle, Thomas, "SunGard Hunts Trust Assets With Overlay Offering," SunGard Managed Account Solutions, www.sungard.com/Managed Accounts, Aug. 30, 2004.
Critchley, Barry, "Financial Post: Off the Record, Merrill (ML), Claymore (C) Steal A March," National Post (Canada), Dec. 19, 2006.
Curran, Greg, "Security Selection for Bond Index Portfolios," Mellon Institutional Asset Management, Standish Mellon, Copyright 2005, publication date unknown.
D. Morris, AIMICPress Conference Presentation—Tokyo, May 29, 1998 (10 pages).
David A. Geracioti, "From Theory to Practice," Registered Rep, Jun. 1, 2007.
David Hoffman, "New ETFs Highlight Belief That Simple Is Good," Investment News, Mar. 5, 2007.
David Hoffman, "Non-Traditional Indexes Gaining Ground in ETF World," Investment News, Feb. 12, 2007.

David Hoffman, "Weightings Ignoring Market Caps Gain in Popularity," Pensions&Investments Online, Feb. 19, 2007.
David Williams, "Want another 5% on top? (Interview with Paul Stewart)," Business Day, Jun. 7, 2007.
Davis, James L., The Cross-Section of Realized Stock Returns: The Pre-Compustat Evidence, The Journal of Finance, vol. 49, No. 5 (Dec. 1994), pp. 1579-1593.
Decision issued Feb. 2, 2009 in related GB application No. 0616163.2.
Decision issued Feb. 19, 2009 in related GB application No. 0222239.6.
Diya Gullapalli, "On Tap: Retirement-Oriented Offerings," The Wall Street Journal, Feb. 22, 2007.
Don Vialoux, "More ways to access Japan: Seven exchange-traded funds now available," National Post (Canada), May 28, 2007.
Donald Jay Korn, "ETF Mania!," Financial Planning, Mar. 1, 2007.
Douglas Appell, "Disputing the superiority of fundamental indexing," Investment News, May 7, 2007.
Douglas Appell, "Fund News (excerpt)," No-Load Fund Investor, May 1, 2007.
Douglas Appell, "Fundamental Indexing Superiority Disputed: Claim of Cap-Weighting's Drag on Return is 'False'," Pensions&Investments Online, Apr. 30, 2007.
Dunstan, Barrie, "News: Managed Funds—A Third Way: Fundamental Indexing (Sub-Head) There Is Fresh Life in the Debate Between Active Share Managers and Index Fund Managers", Independent Financial Review (New Zealand), Nov. 15, 2006.
Dunstan, Barrie, "Supplement: Quarterly Review of Funds, Fundamental Shift Towards Value is Best of Both Worlds", Australian Financial Review on Fundamental Indexation, Nov. 8, 2006.
Editorial Staff, "Marketplace", OnWallStreet, Nov. 1, 2006.
Ellen Roseman, "Canadians spread cash worldwide," Toronto Star, Jun. 20, 2007.
Eric Uhlfelder, "Challenging EAFE: Managers Who Closely Track Market-Cap-Weighted Country Indexes May Miss Opportunities," Financial Advisor Magazine, Mar. 1, 2007.
Eugene F. Fama, Kenneth R. French, "Straight Talk: Nouveau Indexes, Noise and the Nonsense of Active Management," Journal of Indexes, Mar./Apr. 2007.
Farrell, Christopher, Personal Finance, Battle for the Index Investor, Business Week, Oct. 9, 2006.
Fazzi, Raymond, "Surprisingly Few Surprises: Value Funds, International Equities and REITS Remained Strong Last Year", Financial Advisor, Feb. 2007.
Fernholz, Robert, Diversity-Weighted Indexing, Journal of Portfolio Management, Winter 1998, pp. 74-82.
Foster, Mike, "*Playing Poker With the Indices*", Financial News, Jul. 11, 2005.
Fox, Justin, "Fundamentally Okay Index Funds", Time.com, Jan. 29, 2007.
FRC Monitor, Jan. 2001, pp. 1-12.
Gaffen, David A., "SMAs Take on Multiple Personalities," www.registeredrep.com, May 1, 2003.
Gastineau, Gary L., "The Cutting Edge," IndexUniverse.com, Jan. 2007.
Gastineau, Gary, "Is Indexing Ready for the Challenges of the 21st Century?", Journal of Indexes, The Cutting Edge, Mar./Apr. 2006, pp. 32-35.
Goldberg, Steven, "Value Added, Don't Give Up on the S&P 500", Kiplinger.com, Mar. 21, 2006.
Goldberg, Steven, "Wretched Excess Hits ETFs", Kiplinger.com, Aug. 3, 2006.
Gotlieb, Rish, "Why Portfolio Pros by ETFs, Money Managers Who Don't Have the Time to Specialize in Every Market Use the Convenience of Exchange-Traded Funds", Toronto Star, Dec. 7, 2006.
Greenberg, Gregg, "The Brains Behind Fundamental Indexing", TheStreet.com, Jul. 25, 2006.
Haines, Lisa et al., "AP2 Considering Expanding Use of Fundamental Indexation", Financial News (U.K.), Sep. 4, 2006.
Hajim, Corey, "Smart Strategies, A Better Way to Index?", Fortune, Oct. 30, 2006.
Heather Bell, "Fundamental Analysis," IndexUniverse.com, May 8, 2007.

Heather Bell, "News Briefs: Analysts wary of fundamental indexes," Pensions&Investments Online, May 14, 2007.
Hemminki, Julius et al.,"Fundamental Indexation in Europe," Journal of Asset Management, vol. 8, 6, pp. 401-405, www.palgrave-journals.com/jam, Oct. 26, 2007.
Heuer, Max, "All the Rage: Schwab Joins Fundamental Indexers", Institutional Investor Newsletter, Feb. 5, 2007.
Hoffman, David, "ETF Powerhouses Leery of Fundamental Indexing", InvestmentNews.com, Nov. 6, 2006.
Hougan, Matthew, "Life From the Superbowl", IndexUniverse.com, Dec. 7, 2006.
Hsu, Jason C. and Campollo, Carmen, "New Frontiers in Index Investing," Journal of Indexes, Jan./Feb. 2006, pp. 32-34, 36, 37, 58.
Hsu, Jason D., "Cap-Weighted Portfolios are Sub-Optimal Portfolios", Journal of Investment Management, vol. 4, No. 3, Jul. 2006.
Hulbert, Mark, "A Stock Market Riddle, May Have an Answer", The New York Times, Jul. 3, 2005.
International Preliminary Report on Patentability and Written Opinion issued in counterpart International Application No. PCT/US2008/003762, mailed on Oct. 8, 2009.
International Preliminary Report on Patentability issued Mar. 24, 2009 in related PCT/US2006/042430.
International Search Report and Written Opinion from PCT/US2008/003762 mailed Sep. 10, 2008.
International Search Report and Written Opinion issued Dec. 21, 2007 in related Appl. PCT/US2006/042430.
International Search Report and Written Opinion issued in PCT/US2007/018534 mailed Sep. 17, 2008.
International Search Report issued in related PCT/US2005/002345 mailed Dec. 19, 2006.
J. Chernoff, "A New Look in Benchmarks: Consultant Devises Alternative Based on Country Wealth," Pensions & Investments Onling (pionline.com), Apr. 14, 1997 (4 pages).
Jackie Cameron, "New threat for active asset managers," Moneyweb, May 18, 2007.
Jacobius, Arleen, "Acting on Faith: Institutional Investors Are Leaping Into Alternative Investments, But Lack Tools to Assess the Risks", Pensions & Investments, Feb. 5, 2007.
Jaffe, Jeffrey et al., "Earnings Yields, Market Values, and Stock Returns," The Journal of Finance, vol. XLIV, No. 1, Mar. 1989.
James Picerno, "The ETF revolution is looking more speculative by the day," Wealth Manager, May 1, 2007.
Jamieson, Dan, "Money Manager Challenges Cap-Weighted Market Indexes", Investment News, Jul. 18, 2005.
Janet Kidd Stewart, "401(k) options worth looking over: Investors should keep track as firms pitch employers more ETFs," Chicago Tribune, Apr. 15, 2007.
Japanese Office Action issued Oct. 21, 2008 in Japanese Application No. 2003-584862.
Jason Hsu, Jason Chia-Shang Tuan, "Indexing for an inefficient market," IPA, Apr. 1, 2007.
Jeffrey R. Kosnett, "Are Your Stocks Simply a Mishmash?," Kiplinger's Personal Finance, Apr. 1, 2007.
Jesse Emspak, "Exchange-Traded Funds: Fundamental Indexing Fuels PowerShares ETF," Investor's Business Daily, May 23, 2007.
Jesse Emspak, "Exchange-Traded Funds: PowerShares Launches Foreign Index Funds," Investor's Business Daily, Jun. 20, 2007.
Jesse Emspak, "Four New Lyxor ETFs on Fundamental Indices Launched in the XTF Segment," Deutsche Borse Group, May 24, 2007.
Jesse Emspak, "Mutual Funds & Personal Finance: Schwab Focuses on Key Fundamentals," Investors Business Daily, Apr. 2, 2007.
John Authers, "Its time to point the finger at the index," Financial Times, May 26, 2007.
John C. Bogle, "False Promises: Index Funds That Promise to Beat the Market," Journal of Indexes, Mar./Apr. 2007.
John Kimelman, "ETF Pro Says Stocks Aren't Worth the Risk," Barron's, Apr. 20, 2007.
John Kimelman, "Sampling the ETF Smorgasbord," Barron's, Jun. 22, 2007.
John Spence, "Research Affiliates to Sub-Advise Value- and Growth-focused Mandates Based on the Fundamental Index™ Concept for Genworth Financial's AssetMark Asset Allocation Portfolios," Press Releases, Jul. 5, 2007.
John Spence, "Tempest in an index fund: Robert Arnott and John Bogle clash over best indexing strategy," MarketWatch, Jul. 1, 2007.
Jonathan Chevreau, "Hirings: AssetMark Investment Services," Pensions&Investments Online, Jun. 25, 2007.
Jonathan Chevreau, "New U.S. ETFs include Sudan-Free social ETF," Reuters, Jun. 25, 2007.
Jonathan Chevreau, "One in Ten Licensed for ETF Run-Up," National Post (Canada), Jun. 25, 2007.
Jonathan Chevreau, "PowerShares Expands Its Global ETF Initiative Strategy at NYSE," Press Release, Jun. 25, 2007.
Jonathan Chevreau, "PowerShares Launches Four New FTSE RAFI™ International ETFs on NYSE Arca," Press Release, Jun. 25, 2007.
Jonathan Chevreau, "Trading Begins Today on Two New Exchange-Traded Funds From Claymore Investments," National Post (Canada), Feb. 14, 2007.
Jonathan Clements, "Why Aiming for Average Has Its own Genius," The Wall Street Journal, May 6, 2007.
Julia Taylor, "New Funds: Informed Portfolio Management," Financial Times, Jun. 11, 2007.
Julian Harding, "Worth the Weight," Pensions Management, May 15, 2007.
Kalotay, Andrew J. et al., "A Model for Valuing Bonds and Embedded Options," Financial Analysts Journal, May-Jun. 1993, pp. 35-46.
Kaplan, Paul, "Let's Not All Become Fundamental Indexers Just Yet," Journal of Indexes, Jan./Feb. 2009, pp. 34-37.
Karen Dolan, "Morningstar's Take: PIMCO Fundamental IndexPLUS TR D PIXDX," Morningstar, Mar. 28, 2007.
Kathie O'Donnell, "Fundamentals-based index fund has goods, struggles for attention," Investment News, Jun. 18, 2007.
Kathie O'Donnell, "Genworth Financial's AssetMark Introduces New Fundamental Index™ Funds," Press Release, Jun. 18, 2007.
Kathleen M. McBride, "A Better Mousetrap?: Schwab Launches Three Fundamental Index Funds," Investment Advisor Magazine, Apr. 2, 2007.
Kathleen M. McBride, "Catching Up With . . . Jeffrey Mortimer," Investment Advisor Magazine, Apr. 1, 2007.
Kathleen M. McBride, "The IA 25: Robert Arnott," Investment Advisor Magazine, May 1, 2007.
Kathleen Pender, "Changing indexes for funds," San Francisco Chronicle, May 24, 2007.
Kathleen Pender, "Consuelo Mack WealthTrack: An Interview with Rob Arnott (transcript)," PBS WealthTrack, May 25, 2007.
Katie Benner, "Trying to Build a Better Index Fund: Fortune's Guide to Exchange-Traded Funds Based on Fundamental Indexes," CNN Money, Apr. 11, 2007.
Kazuaki Fujita, "Eye on Fundamentals Buoying Japanese Investors (translated)," Nikkei Financial Daily, May 18, 2007.
Kevin Bailey, "New Funds Are Old Hat," Herald Sun (Australia), Jun. 25, 2007.
Kevin Burke, "The ETF Weighting Game," Registered Rep, Apr. 1, 2007.
Kinnel, Russ, "Fund Spy Column: Four Great Funds for 401K's and Iras Only", Morningstar, Jul. 24, 2006.
Kinnel, Russel, "The Five Best New Funds of 2005", Morningstar.com, Nov. 7, 2005.
Kinnel, Russell, "Fund Spy, Great Mutual Funds Go Head to Head, It's Marsico Vs. Janus and Fidelity Vs. Vanguard", Morningstar.com, Oct. 16, 2006.
Kittsley, Dod, "Alternatively Weighted Indexes: Strategy or Benchmark?", Investment News, Op-Ed, Aug. 8, 2006.
Knight , Rebecca et al., "Active Solution Is Within Reach: In the Second Part in a Series, Rebecca Knight and John Authers Say the Asset Class Could Move Beyond the Passive Approach in 2007", Financial Times, Jan. 30, 2007.
Knight, Rebecca, "FT Report: FT Fund Management: The Big Picture", Financial Times, Oct. 2, 2006.
Knight, Rebecca, "FT Wealth: Hands-On Investor, ETFs Start to Look Beyond the Index Model", Financial Times, Sep. 26, 2006.

Korn, Donald Jay, "Beyond Benchmarks, Tracking Alternative Indexes Can Add a Flavor of Active Management to the ETF Menu", Financial Planning, Oct. 1, 2006.
Lakonishok, Josef et al., NBER Working Paper Series, "Contrarian Investment, Extrapolation, and Risk," National Bureau of Economic Research, Working Paper No. 4360, May 1993.
Laura du Preez, "New index investment method promises more," Personal Finance, Jun. 2, 2007.
Lauricella, Tom, et al., "Fund Track, Buyer Beware; Not All Index ETF's Are What They Appear", The Wall Street Journal Europe, Jul. 24, 2006.
Lawrence Carrel, "Godfather of Fundamental Indexing Faces Challenge," TheStreet.com, Jun. 13, 2007.
Leake, Thomas and Morris, David, "Where Next for the Index Business Model? Bringing Low Cost to the World of Active Management," Journal of Indexes, May/Jun. 2006, pp. 22-26.
Lowry, Vincent T., "Fundamentally Better: The case for revenue weighting," Journal of Indexes, Mar./Apr. 2007.
Luxenberg, Stan, "Fundamental 'Indexing", Registered Rep, Jul. 1, 2006.
Lydon, Tom; Wasik, John F., iMoney, "Profitable Exchange-Traded Fund Strategies for Every Investor," Chapter 2, The Art of Indexing Using the iMoney Plan, date unknown.
Makepeace, Mark, "FTSE: Coming to America," Journal of Indexes, Jan./Feb. 2006, pp. 38-39.
Mark Salzinger, "Navigating Choppier Waters With ETFs, Funds & Stocks," No-Load Fund Investor, Jul. 1, 2007.
Markowitz, Harry M., "Market Efficiency: A Theoretical Distinction and So What?" www.cfapubs.org, Financial Analysts Journal, Reflections, CFA Institute, Sep./Oct. 2005, pp. 17-30.
Marla Brill, "Indexing Debate Heats Up," Financial Advisor Magazine, Jun. 1, 2007.
Marla Brill, "The age of investment strategy indices (Roundtable Discussion)," Global Pensions, Jun. 1, 2007.
Matthew Hougan, "ETF Watch: Jun. 7-25," IndexUniverse.com, Jun. 27, 2007.
Matthew Hougan, "International RAFI ETFs List on ARCA," IndexUniverse.com, Jun. 25, 2007.
Matthew Richards, "Get Down to the Fundamental Factors," Financial Times, Feb. 17, 2007.
Maureen Darrigo, "Market Pulse: BNN Market Call—Som Seif," The Globe & Mail (Toronto), Jun. 19, 2007.
Maureen Darrigo, "PowerShares to Launch Four International ETFs Based on FTSE RAFI™ Indexes at the New York Stock Exchange Jun. 25, 2007," Press Release, Jun. 19, 2007.
Max Heuer, "Schwab Looks Up Market," Defined Contribution & Savings Plan Alert, Apr. 9, 2007.
Michael Krause, "S&P 500 Shows Passive Aggressive Side," Yahoo!Finance, Apr. 24, 2007.
Morris, Sonya, "Fund Spy—What's the Right Way to Index? (Sub-Head) Our Take on the Newest Breed of Index Funds", Morningstar.com, Dec. 12, 2006.
Morris, Stephen, "Caress Working Paper #95-13 Speculative Investor Behavior and Learning," Department of Economics, University of Pennsylvania, Philadelphia, PA, May 1995.
Murray Coleman, "New Twist on Indexing: Mutual Funds Meet ETFs," MarketWatch, Apr. 2, 2007.
Nusbaum, Roger, "Personal Finance: ETFs, A Surge of Energy ETFs", TheStreet.com, Oct. 13, 2006.
O'Connor, Cecily, "A Fundamental Change, Research Affiliates, With 55% Gain So Far This Year, Applies Its Index Concept Beyond U.S. Stocks", Pensions & Investments Money Management, Sep. 18, 2006.
O'Connor, Cecily, "At Research Affiliates, A Fundamental Change", Investment News. Sep. 25, 2006.
O'Donnell, Kathie, "One on One With Philip Taylor of AMVESCAP PLC, on New RAFI PowerShares", Investment News, Sep. 25, 2006.
Office Action dated Nov. 25, 2008 issued in related U.S. Appl. No. 10/961,404.
Office Action from related U.S. Appl. No. 10/961,404 mailed Mar. 13, 2008.
Office Action from related U.S. Appl. No. 11/196,509 mailed Mar. 19, 2008.
Office Action issued Jul. 8, 2009 in related U.S. Appl. No. 11/509,002.
Office Action issued Aug. 6, 2009 in related U.S. Appl. No. 10/159,610.
Office Action issued Aug. 19, 2009 in related U.S. Appl. No. 10/961,404.
Office Action issued Dec. 5, 2008 in related CN application No. 200580000459.0.
Office Action issued Nov. 26, 2008 in related Eurasian Patent Appl. No. 200870083/27 (with English translation).
Office Action issued Oct. 3, 2008 in related U.S. Appl. No. 10/159,610.
Office Action Issued Oct. 30, 2008 in U.S. Appl. No. 11/196,509.
Office Action received Apr. 28, 2009 in related EP 05 712 005.7.
Pam Black, "Press Release for 'Index Smackdown' debate between Rob Arnott and Gus Sauter," Financial Planning, Jun. 12, 2007.
Paul J. Lim, "The Indexing Wars," U.S. News & World Report, Apr. 29, 2007.
Pauline Skypala, "Spa ETF's Multi-launch set to expand range of ETF trackers," Financial Times, Jun. 18, 2007.
Pender, Kathleen, "Bogle Shares His Wisdom", San Francisco Chronicle, Oct. 29, 2006.
Peter a. McKay, "More Professors Are Lured Out of Ivory Tower to Street: Demand for New Funds Offers a Chance to Test Theories, Make Money," The Wall Street Journal, Apr. 21, 2007.
Peter A. McKay, "North Dakota Considers Research Affiliates," Money Management Letter, Apr. 23, 2007.
Peter Gibson, Ed Sollbach, Jeff Evans, Elizabeth Leung, "Research Comment: Portfolio Strategy & Quantitative Research," Desjardins Securities, May 7, 2007.
Petruno, Tom, "New Take on Index Fund Concept", Los Angeles Times, Jun. 26, 2005.
Philip Coggan, "Presenting the Portfolio Rebalancing Act: Fundamental Indexation Rejects Weighting Stocks Within a Benchmark by Market Value," Investment Advisor (UK), Apr. 28, 2007.
Plumpton, Emma (Redmayne-Bentley Stockbrokers), "Influence of Geography on the Wane", Aberdeen Press & Journal (UK), Nov. 20, 2006.
Point/Counterpoint, "The Fundamental Debate," Journal of Indexes, Jan./Feb. 2009, pp. 30-33, continued on p. 51.
Prestbo, John, "In Perspective; Weighting it Out," Journal of Indexes, Jan./Feb. 2009, pp. 38-40.
Pruitt, Ron, "A Comprehensive View of After-tax Investing and Tax Efficiency," Placemark Investment, 2002.
Pruitt, Ron, "The Tax Advisor: All Hail the Overlay Manager," Placemark Investments, Investment Advisor, Apr. 2005.
Ransom, Diana et al., "Talk the Talk: Financial Buzz Words of '07", Wall Street Journal, Dec. 26, 2006.
Raub, David, "Rethinking Indexing," www.NorthBaybiz.com, Issue: Apr. 2006.
Ray Turchansky, "Investment Vehicle Lines Get Blurry: Merits of Passive Versus Active Management Debated," Edmonton Journal, Feb. 14, 2007.
Regis Nyamakanga, "Stock index system due to launch in SA," Business Day, May 21, 2007.
Reinhart, Len, "The Bigger Picture: Will Overlay Management Become the New Business Model for Separately Managed Accounts?" Financial-Planning.com, Apr. 1, 2007.
Reinhart, Len, "The Next Big Thing: Unified Managed Accounts Must Mature Some More Before They Are Ready for Prime Time." Financial-Planning.com, Dec. 1, 2003.
Research Affiliates Fundamental Index (TN) Fundamental Index (TN) Enhanced Power Point Presentations.
Research Affiliates Fundamental Index™ Fundamental Index™ Enhanced Power Point Presentations.
Research Affiliates, LLC Fact Sheets on RAFI™-Related—Limited Partnerships.
Retrospectives on Selected Enhanced Fundamental Index™—Strategies.
Riley, Barry, "A Quest for Perpetual Profit Machines", Financial Times, Jan. 15, 2007.
Rinne, Jonas, "Translation From Swedish: The Stock Market's New Fundamentalist", Affarsvarlden, Apr. 19, 2006.

Rob Carrick, "For Your RRSP, Take a Page from the CPP," The Globe & Mail (Toronto), Feb. 24, 2007.
Rob Carrick, "Got high-dollar blues? Currency neutrality can bring peace of mind," The Globe & Mail (Toronto), May 24, 2007.
Rob Carrick, "The case for blending passive, active indexing," The Globe & Mail (Toronto), May 19, 2007.
Rob Wherry, "Enhanced Index Funds Make a Move on Their Older Brethren," SmartMoney.com, May 31, 2007.
Rob Wherry, "Fundamentally Schwab," IndexUniverse.com, Apr. 5, 2007.
Rob Wherry, "New From Morningstar's Conference," SmartMoney.com, Jun. 28, 2007.
Rob Wherry, "Ready for an All-Etf Portfolio? Here Are Some Models," SmartMoney.com, Feb. 13, 2007.
Rob Wherry, "Schwab Launches Fundamental Index™ Mutual Funds," Yahoo!Finance, Apr. 2, 2007.
Rob Wherry, "Schwab Launches Three Funds Similar to Popular ETFs," SmartMoney.com, Apr. 2, 2007.
Rob Wherry, "The Index-Fund Makeover," The Wall Street Journal, Jun. 2, 2007.
Robert Arnott et al., "Fundamental Indexation;" Research Affiliates Oct. 7, 2004, pp. 1-35.
Ron Hylton, "It's the Volatility, Stupid: The Source of Excess Returns in Alternative Index Weighting Schemes," Journal of Indexes, Mar./Apr. 2007.
Rudy Luukko, "Enhanced Indexing Cuts Costs of Funds," Toronto Star, Feb. 24, 2007.
Ryan, Jen, "Ask the Street: So Many ETFs", TheStreet.com, Oct. 4, 2006.
Saler, Tom, "Growing to the Sky", Barrons, Oct. 2, 2006.
Salisbury, Ian, "New ETFs to Weight Stocks by Revenue", Dow Jones, Jan. 4, 2007.
Salisbury, Ian, "PowerShares FTSE RAFI US1000 in Article on Actively Managed ETF's", Wall Street Journal, Jul. 30, 2006.
Salzinger, Mark, "An Indexing Alternative", No Load Fund Investor, Jul. 2006.
Salzinger, Mark, "Feature Interview With Jason Hsu", Investor's ETF Report, Jan. 2007.
Salzinger, Mark, "Interview: Jason Hsu," The Investor's ETF Report, Jan. 2007.
Savage, Steve, et al., "Kiplinger's Personal Finance Investing: Fund Insights, A Better Way of Indexing?", Kiplinger, Aug. 2006.
Schlagheck, Jim, "Exchange Traded Funds, Getting an Edge With 'Fundamental Indices", TheStreet.com., Oct. 5, 2006.
Schoenfeld, Steven A. and Ginis, Robert E., "Worth Weighting for? A Survey and Critique of Alternatively Weighted Indexes," Journal of Indexes, May/Jun. 2006, pp. 10-21.
Scott Burns, "Next-Generation Index Funds Coming," Dallas Morning News, Nov. 26, 2004.
Search Results, TowerGroup, Sep. 25, 2007.
Serwer, Andy, "Brains, Pluck, and Bucks," CNNMoney.com/magazines/fortune/fortune_archives, Jul. 3, 2006.
Shazar, Jonathan, "Taking on a Heavyweight: Two Strategies—With Attendant ETFs—Take Aim At Market-Cap Weighting", Institutional Investor, Jan. 24, 2006.
Siegel, Jeremy J., "Long-term Returns on the Original S&P 500 Components", Financial Analyst Journal, vol. 62, No. 1, Jan. 2006.
Siegel, Jeremy, "Consuelo Mack WealthTrack", PBS TV, Aug. 4, 2006.
Siegel, Jeremy, "The 'Noisy Market' Hypothesis", Wall Street Journal, vol. 62, No. 1, Jun. 2006.
Simon, Ellen, "New Indexes Aim to Beat Old Benchmarks", Associated Press Newswire, Aug. 8, 2006.
Simon, Ellen, "New Indexes Spiceup ETFs", Associated Press, Aug. 12, 2006.
Siracusano, Luciano, "A Fundamental Challenge," The Wisdom Tree, Aug. 9, 2007.
Sivanithy, R., "Companies: Is Fundamental Weighting Better in Nourse Indices?" The Business Times Singapore, Oct. 27, 2006.
Skypala, Pauline, "Stock Market Indices Prove Inefficien", Financial Times—UK Edition, Sep. 12, 2006.
Sonya Morris, "Measuring the Market's Value," Morningstar, Jul. 16, 2007.
Sonya Morris, Editor, "Introducing Model Portfolios," Morningstar ETFInvestor, Mar. 1, 2007.
Sophia Grene, "Dilsaver Reveals Schwab Funds' Biggest Secret," MutualFundWire.com, Jun. 7, 2007.
Sophia Grene, "IPM launches four Fundamental Index™ Funds," Press Release, Jun. 5, 2007.
Sophia Grene, "The fundamental rules apply: Rising interest in wealth weighted indices," Financial Times, Jun. 4, 2007.
Spence, John, "ETF Investing, for These ETFs, The Fundamental Things Apply, Firms, Experts Take Sides in Clash Over Best Investment Strategy", MarketWatch (Boston), Oct. 2, 2006.
Sree Vidya Bhaktavatsalam, "Schwab Offers 'Fundamental' Index Funds to Beat Market Returns," Bloomberg, Apr. 2, 2007.
Steel, Sandra, "FTSE RAFI Indexes to Be Used As Basis for the World's First Fundamentally Weighted Sector ETFs, Ten Fundamental Indexes Out-Perform Domestic Cap Weighted Equivalents", Media Information i.e. Press Release From FTSE the Index Company, Sep. 20, 2006.
Stephen P. Brown, "Actively Managed ETFs: The Next Generation?," Registered Rep, Jun. 1, 2007.
Strauss, Lawrence C., "Too Many ETFs?", Barrons, Jul. 3, 2006.
Susan Trammell, "Applied Science: How to Jump-Start a Quantitative Investment Process," CFA Magazine, Mar./Apr. 2007.
Tamura, Hirmichi, et al., Global Fundamental Indices: Do they outperform market-cap weighted indices on a Global Basis?, Security Analysts Journal, Oct. 2005.
Tamura, Hirmichi, et al., "Global Fundamental Indices: Do they outperform market-cap weighted indices on a Global Basis?", Security Analysts Journal, Oct. 2005.
Tan, Kopin, "Lipper Mutual Fund Quarterly, The Weighting Game", Barron's, Oct. 9, 2006.
Tassell, Tony, "Building on the Fundamentals", Financial Times—U.S. Edition, Feb. 6, 2007.
Tim Middleton, "Don't follow the dumb money," MSN Money, Jun. 26, 2007.
Tim Middleton, "Schwab to Launch Fundamental Index Mutual Funds," Reuters, Mar. 27, 2007.
Tim Middleton, "With Market Reeling, Get More Aggressive," MSN Money, Mar. 27, 2007.
Time Middleton, "Mutual Funds, a Play-It-Safe Portfolio for 2007", MSN Money, Dec. 26, 2006.
Trang Ho, "Exchange-Traded Funds: After an Excellent '06, Fast Start for Telecom," Investor's Business Daily, Feb. 16, 2007.
Trang Ho, "Exchange-Traded Funds: Consumer ETFs Reflect Strong Buying Trends," Investor's Business Daily, Feb. 20, 2007.
Trang Ho, "Foreign ETF Assets Up 24% So Far This Year," Investor's Business Daily, Jul. 11, 2007.
Treynor, Jack, "Perspectives; Why Market-Valuation-Indifferent Indexing Works," Financial Analysts Journal, vol. 61, No. 5, CFA Institute, Sep./Oct. 2005.
Unknown, "Alternative Indices", Financial Times (U.K. Edition), Oct. 13, 2006.
Unknown, "Asset Allocation Basics: Rebalancing", Seeking Alpha, Jul. 10, 2006.
Unknown, "Bettering Fundamentals", IndexUniverse.com, Jan. 4, 2007.
Unknown, "Breaking News, SSgA Goes Fundamental", IndexUniverse.com, Nov. 2, 2006.
Unknown, "Breaking News: PowerShares Spreads the Love", IndexUniverse.com, Sep. 15, 2006.
Unknown, "Canadian Fundamental 100 Income Fund Announces Initial Public Offering", Canada Newswire, Sep. 28, 2005.
Unknown, "Claymore Investments Announces New (RAFI) ETFs, on TSX", Canada Newswire: Claymore Investments, Inc., Sep. 8, 2006.
Unknown, "CRQ, PowerShares Autonomic Allocation ETFs Cited in 'Portfolio Strategy", Toronto Globe & Mail, Jul. 24, 2006.
Unknown, "ETF Versus No-Loads", No-Load Fund Investor, Sep. 19, 2006.
Unknown, "FTSE and Rob Arnott Launch First Fundamental Indexes", Press Release, Jul. 19, 2005.

Unknown, "FTSE RAFI Indexes to Be Used As Basis for World's First Fundamentally Weighted Sector ETF's", PR Newswire, Sep. 20, 2006.
Unknown, "Fundamental Indices Show Resilience", Financial News, Sep. 11, 2006.
Unknown, "Growth-stock Investing Has Required the Patience of Job During the Last Few Years", New York Times, Sep. 3, 2006.
Unknown, "Investing: Throughbred Indexes Work to Sustain Pace", International Herald Tribune, Aug. 7, 2006.
Unknown, "*Letters to the Editor*", Pensions & Investments Online, Oct. 31, 2005.
Unknown, "Merrill Lynch Claymore International Fundamental Index Accelerator Securities, Series 1", Canada NewsWire, Sep. 19, 2006.
Unknown, "New Fundamental Index Series Launched by FTSE Group and Research Affiliates", PressRelease, Nov. 28, 2005.
Unknown, "Nomura Asset Management and Research Affiliates to Launch Products Based on Fundamental Indexation", Press Release, Aug. 19, 2005.
Unknown, "PowerShares FTSE RAFI US1000 ETF Celebrates IPO on the NYSE", NYSE.com, Dec. 19, 2005.
Unknown, "PowerShares Pitches Alt-Weighted ETFs", Fund Action, Sep. 22, 2006.
Unknown, "RA Among Enhanced-Index Managers Approved by Tacoma ERS", Pension & Investment Daily, Dec. 19, 2006.
Unknown, "Recap of No-Load Fund Investor Coverage of PRF, Boroson on Money", Daily Record (Morristown, NJ), Jul. 23, 2006.
Unknown, "Rob on Consuelo Mack WealthTrack", PBS Interview, Sep. 22, 2006.
Unknown, "*San Joaquin Ups Value-Added Real Estate Allocation*", Pensions & Investments Online, Aug. 30, 2005.
Unknown, "*South Dakota Signs on With New Strategy*", Pensions & Investments Online, Jan. 10, 2005.
Unknown, "Ten to Watch 2006", Registered Rep, Aug. 1, 2006.
Unknown, "The Buttonwood Column, Weights and Measures, a Squabble Erupts Over How Best to Create a Stockmarket Index", The Economist Newspaper Limited (London), Dec. 13, 2006.
Unknown, "The most dangerous patent in finance! Is fundamental indexing patently absurd?," Research Comment, Desjardins Securities, May 7, 2007.
Unknown, "XACT—First in Europe With a fundamental ET," Announcing Launch of the Exact FTSE RAFI Fundamental Euro ETF on the Stockholm Stock Exchange, and FTSE Licenses First European ETF on FTSE RAFI Index, XACT, Sep. 11, 2006.
Vernon Wessels, "Plexus scores home run with international partner," Fanews, May 18, 2007.
Vernon Wessels, "Plexus Will Use Arnott's Index to Choose South African Stocks," Bloomberg, May 18, 2007.
Vincent T. Lowry, "Fundamentally Better: The Case for Revenue Weighting," Journal of Indexes, Mar./Apr. 2007.
Voyles, Bennett, "New Kid in Town: The Fundamental Index", OnWallStreet, Nov. 1, 2006.
Waid, Robert, "Fundamentally Active," IndexUniverse.com, www.indexuniverse.com/index, Feb. 8, 2008, pp. 1-6.
Warren Boroson, "A New Strategy for Stock Indexes," Daily Record, Feb. 18, 2007.
Warren Boroson, "Expert predicts volatile market," Daily Record, May 20, 2007.
Warren Boroson, "Having 'fun' in market is costly," Daily Record, Jun. 3, 2007.
Warren Boroson, "New Fundamental Index Fund Listed in Stockholm," XACT, Mar. 26, 2007.
Warren Boroson, "Tough Questions for Smart Manager," Daily Record, Mar. 25, 2007.
Warren Buffet, "Letter to Bershire Hathaway, Inc. Shareholders," pp. 3, 16, 19, 1999.
Watt, James L., CPA/PFS, "Is fundamental Indexing a Better Way to Index?", Fort Collins Coloradoan, Jul. 30, 2006.
Wherry, Rob, "Battle for Index Supremacy, and Centers of Attention: A New Generation of Indexers Want to Replace the S&P 500. Should You Follow Their Lead", SmartMoneySelect.com, Dec. 22, 2006.
Wherry, Rob, "Happy B-Day Vanguard 500", SmartMoney.com, Aug. 31, 2006.
Wherry, Rob, "SmartMoney.com Picks the Best Mutual Fund of 2006", SmartMoney.com, Jan. 5, 2007.
Wood, Paul C., "*Fundamental Profit-Based Equity Indexation*", Journal of Indexes, Second Quarter, 2003.
Woods, Nancy, "Financial Post: FP Weekend: Ask a Broker Column, Working Toward a Balanced Portfolio", National Post (Canada), Dec. 16, 2006.
Wooley, Scott, "The Index Insurgents," Forbes.com, Magazine article, Oct. 30, 2006.
Woolley, Scott, "The Index Insurgents", Forbes.com, Oct. 30, 2006.
Communication from the European Patent Office dated Dec. 3, 2009, issued in related European Patent Application No. 03726210.2.
Office Action from U.S. Appl. No. 12/819,199 mailed Dec. 15, 2011.
EPC Communication from EP 07811461.8, dated Nov. 23, 2010.
EP Office Communication from EP 05712005.7 dated Dec. 23, 2008.
International Search Report for PCT/US 08/03762, dated Sep. 10, 2008.
Examination Communication in EP 06827143.6 mailed Jan. 30, 2012.
Decision of Rejection in JP 2006-552146, mailed Oct. 21, 2011.
Communication in EP 05712005.7, mailed Apr. 28, 2009.
Communication in EP 03726210.2, mailed Dec. 3, 2009.
International Search Report of PCT/US06/42430, dated Dec. 21, 2007.
Third Party Submission in U.S. Appl. No. 10/961,404, dated May 3, 2007.
Third Party Submission in U.S. Appl. No. 10/961,404, dated Oct. 4, 2005, by Matson.
Third Party Submission in U.S. Appl. No. 10/961,404, dated Oct. 4, 2005, by Hemenway.
Asness, Clifford S., "Non-Cap Weighted Indexes," The Q-Group Spring 2007 Seminar, Mar. 25-28, 2007 AQR Capital Management, LLC.
Wood et al., "Fundamental Profit Based Equity Indexation: A Better Way to Hold the Market," 5 pages, Second Quarter 2003 (at http://www.journalofindexes.com).
Author Unknown, "Registration Statement for iShares (R) Trust," pp. 1, 2, 4, 5, 8, 14, 15 of 67, Aug. 18, 2003 (at http://www.sec.gov/Archives/edgar/data/).
Author Unknown, "Dow Jones Indexes to Launch Dividend Index," 2 pages, Oct. 30, 2003 (at http://www.dowjones.com/cgi-bin).
Author Unknown, "Dow Jones Indexes: Dow Jones Select Dividend Index Summary," 5 pages, at least as early as Sep. 30, 2003.
Arnott et al., "Fundamental Indexation," Financial Analysts Journal, vol. 61, No. 2, pp. 83 and 98, Mar./Apr. 2005 (at www.cfapubs.org).
Block, Sandra, "Stock Funds to Go Gourmet to Beat Index," USA Today, Section Money, 2 pages, Mar. 3, 1997.
Author Unknown, "MSCI Press Release: MSCI Develops Enhanced Methodology for its Global Value and Growth Indices," 2 pages, Sep. 25, 2002 (at http://www.msci.com).
Fama, Eugene, Jr., "The New Indexing," 2 pages, Jul. 2000 (at http://www.dfaus.com/).
Arnott et al., "Surprise! Higher Dividends=Higher Earnings Growth," Financial Analysts Journal, pp. 70-72, and 82, Jan./Feb. 2003.
Author Unknown, "CME: Goldman Sachs Commodity Index (GSCI) revises commodity weights for 2003," 1 page, Nov. 6, 2002.
Buffett, Warren, Letter to Berkshire Hathaway, Inc. Shareholders, pp. 3, 16, and 19, at least as early at 1999.
Notice of Preliminary Rejection in KIPO 10-2006-7017949.
Office Action from U.S. Appl. No. 12/619,668 mailed Feb. 13, 2012.
ITG Research, ITG Australia Ltd., "A Quick Guide to Tax Efficient Investment," Nov. 1, 2005.
Exam Report from New Zealand NZ593108 mailed May 31, 2011.
Exam Report in Australia AU2005213293 mailed Aug. 5, 2010.
Canadian Office Action from CA 2,481,506 mailed Feb. 8, 2012.
"ActiveBeta Strategies," Westpeak Global Advisors, L.P., Dec. 15, 2009.
"Portable Alpha: Is a Hedge Fund Index-based Alpha Overlay the Most Appropriate Solution?" Werner Goricki, Dirk Soehnholz, Marcus Storr, Vincent Weber, Jun. 2006.
Notice of Rejection in JP Patent Application No. 2008-547223.

Shigeki Sakakibara, *Shoken Toshi-ron* [Financial Investment Theory], Japan, Nikkei, Apr. 24, 1998, 3rd Edition, pp. 200-201.
Exam Report(GCC/SIPO/637) dated Jan. 19 and 20, 2012 from SIPO Application GCC/CN2011/000412 prepared for GCC Patent Application No. GCC/P/2008/10433.
Office Action in U.S. Appl. No. 12/554,961, dated Dec. 12, 2011.
Office Action in U.S. Appl. No. 12/819,199, dated Feb. 16, 2012.
Office Action issued Jul. 8, 2009 in related application U.S. Appl. No. 11/509,002.
Arnott, Robert D. et al, "The Management and Mismanagement of Taxable Assets," First Quadrant, L.P., Investment Management Reflections, 2000, No. 2.
Hemminki, Julius et al., "Fundamental Indexation in Europe," Journal of Asset Management, vol. 8, 6, pp. 401-405, www.palgrave-journals.com/jam, Oct. 26, 2007.
Author Unknown, "MSCI to Adjust for Free Float and to Increase Coverage to 85%," MSCI Press Release, www.msci.com, Geneva, Dec. 10, 2000, pp. 1-3.
Brock, Woody, The Role of 'Pricing Model Uncertainty,: —Resolving Four Paradoxes in Today's Market Behavior, Strategic Economic Decisions, SED Profile May 2008.
Office Action from related application U.S. Appl. No. 10/961,404 mailed Mar. 13, 2008.
Office Action from related application U.S. Appl. No. 11/196,509 mailed Mar. 19, 2008.
Robert Arnott et ., "Fundamental Indexation;" Research Affiliates Oct. 7, 2004, pp. 1-35.
Sonya Morris, Editor, "Introducing Model Portfolios," Morningstar ETFInvestor, Mar. 1, 2007.
Jesse Emspak, "Mutual Funds & Personal Finance: Schwab Focuses on Key Fundamentals," Investor's Business Daily, Apr. 2, 2007.
Douglas Appel!, "Disputing the superiority of fundamental indexing," Investment News, May 7, 2007.
John Authers, "It's time to point the finger at the index," Financial Times, May 26, 2007.
David Williams, "Want another 5% on top? (Interview with Paul Stewart)," Business Day, Jun. 7, 2007.
John Spence, "Research Affiliates to Sub-Advise Value- and Growth-focused Mandates Based on the Fundamental Index™ Concept for Genworth Financial's AssetMark Asset Allocation Portfolios," Press Releases, Jul. 5, 2007.
Trang Ho, "Foreign ETF Assets Up 24% So Far This Year," Investor's Business Daily, Jul. 11, 2007.
Charles Paikert, "Index battle (p. 2)," Investment News, Jul. 16, 2007.
Arnott, Robert D., "What Cost "Noise"?" Financial Analysts Journal, Editors Corner, CFA Institute, Mar./Apr. 2005, pp. 10-14.
DRM Portion of CalPERS' Presentation Given on Jan. 12, 2001, 4 pages.
D. Morris, AIMIC Press Conference Presentation—Tokyo, May 29, 1998 (10 pages).
"Index Industry Leaders . . . In Their Own Words," Journal of Indexes, Sep./Oct. 2006, pp. 10-21.
"Optimal Value-Weighted Portfolios," Economist's View: Value Weighted Portfolios, Jun. 14, 2006.
"Stock Market Perspective: Better Ways to Index?" http://www.pankin.com/persp062.pdf.
Office Action from U.S. Appl. No. 11/931,913 mailed Jul. 23, 2010.
Office Action from U.S. Appl. No. 10/159,610 mailed May 17, 2010.
Office Action in JP Counterpart Application No. 2006-552146 Dated May 25, 2010.
Australian Examiner's Report for AU Application 2005213293, Dated May 19, 2010.
Supplemental EP Search Report for EP06827143.6 mailed Jul. 2, 2010.
Diversity-Weighted Indexing, Robert Fernholz, Journal of Portfolio Management, Winter 1998, pp. 74-82.
Investing at the edge (investing in non-capitalization weighted index funds), Jarrod W. Wilcox, Journal of Portfolio Management, New York, Spring 1998, vol. 24, Iss. 3; 16 pages.
Arnott, Robert D., "An Overwrought Orthodoxy," Institutional Investor Magazine, Dec. 2006, https://www.rallc.com/ideas/pdf/Institutional_Investor_Dec_2006_An_Overwrought_Orthodoxy.pdf.
Burke, Kevin, ETF Special Report, Apr. 1, 2007, www.wealthmanagement.com, http://wealthmanagement.com/archive/etf-special-report-3, "Robert Jones at Goldman Sachs Asset Management is said to be the first to reweight the S&P based on adjusted operating earnings. He managed the firm's equity portfolios on this basis and beat the S&P 500 by 1 percentage per year between 1990 and 1996. But the funds didn't attract much in assets."
Dow Jones Select Dividend Indexes, Overview Brochure, Jan. 2012, http://www.djindexes.com/mdsidx/downloads/brochure_info/Dow_Jones_Select_Dividend_Indexes_Overview.pdf, "Dow Jones Indexes pioneered the category of dividend indexing with its 2003 launch of the Dow Jones U.S. Select Dividend IndexSM."
"Memorandum of Points and Authorities in Support of Unopposed Motion for Leave to File Second Amended Answer, Affirmative Defenses and Counterclaims," in Case No. SACV11-01846 Doc (ANx), Jul. 24, 2012.
"Notice of Unopposed Motion and Unopposed Motion for Leave to File Second Amended Answer,Affirmative Defenses and Counterclaims," in Case No. SACV11-01846 Doc (ANx), Jul. 24, 2012.
"Proposed Order Granting Motion for Leave to Amend," in Case No. SACV11-01846 Doc (ANx), Jul. 24, 2012.
"Proof of Service," in Case No. SACV11-01846 Doc (ANx), Jul. 24, 2012.
"Exhibit A to Second Amended Answer, Affirmative Defenses and Counterclaims," in Case No. SACV11-01846 Doc (ANx), Jul. 24, 2012.
"Declaration of Peter J. Wied in Support of Motion for Leave to File Second Amended Answer, Affirmative Defenses and Counterclaims," in Case No. SACV11-01846 Doc (ANx), Jul. 24, 2012.
European Search Report from EP 08727072.4, Dec. 30, 2011.
iShares, SEC Form N-1A Registration Statement under the Securities Act of 1933 and Investment company act of 1940, Aug. 18, 2003, 1-52.
Robert C. Jones, "Earnings Basis for Weighting Stock Portfolios," GSAM, Pensions & Investments, Aug. 05, 1990, pp. 1-2.
Jones, R. C. ,"Quantitative Equity Earnings Weighted Index," 1990, pp. 1-22.
Wood and Evans, "Fundamental Profit Based Equity Indexation," Journal of Indexing, 2003, pp. 1-8.
"Rules for the Management of the FTSE Global Wealth Allocation (GWA) Index Series," FTSE, Oct. 2007, pp. 1-15.
AIMIC Press Conference, Tokyo, Japan, May 29, 1998, pp. 1-8.
Chernoff, J., "A New Look in Benchmarks: Consultant Devises Alternative Based on Country Wealth," Apr. 15, 1997 pp. 1-4.
"About the America's Fastest Growing Companies Family of Stock Indexes," America's Fastest Growing Companies, Individual Investor Group, Inc., www.afgc.com, Methodology, Jan. 24, 2002, pp. 1-11.
MSCI Global Value and Growth Index Series, Index Construction Objectives and Methodology for the MSCI Global Value and Growth Index Series, May 11, 2004, pp. 1-28.
S&P MidCap 400 Registration Statement, Jan. 19, 1996, pp. 1-87.
StreetTracks Prospectus, Fortune e-50 Index Fund, Sep. 25, 2000, pp. 1-36.
Haugen and Baker, "The efficient market inefficiency of capitalization-weighted stock portfolios," The Journal of Portfolio Management, Spring 1991, pp. 1-6.
Interrogatory in JP Appeal 2012-4715 of Counterpart JP Application No. 2006-552146, Sep. 2012.
Nonfinal Rejection in U.S. Appl. No. 13/216,238 mailed Dec. 12, 2012.
Decision of Rejection in JP 2008-547223, Oct. 30, 2012.
Notice of Preliminary Rejection in KR Counterpart KR 10-2008-7017731, Oct. 29, 2012.

* cited by examiner

NON-CAPITALIZATION WEIGHTED INDEXING SYSTEM, METHOD AND COMPUTER PROGRAM PRODUCT

CROSS-REFERENCE TO RELATED APPLICATIONS

The present application is a Continuation-in-part of U.S. patent application Ser. No. 11/931,913, filed Oct. 31, 2007, which itself (i) claims the benefit of U.S. Patent Application No. 60/896,867, filed Mar. 23, 2007, and (ii) is a continuation-in-part of and claims the benefit of Ser. No. 11/509,002 filed Aug. 24, 2006, the contents of all of which are incorporated herein by reference in their entirety and are of common assignee, to the present invention.

This application is a Continuation-in-part of, and also claims the benefit of U.S. patent application Ser. No. 11/509,002, filed Aug. 24, 2006, which itself claims the benefit of (i) U.S. Patent Application No. 60/751,212, filed Dec., 19, 2005, and (ii) U.S. patent application Ser. No. 11/196,509, filed Aug. 4, 2005, issued Nov. 17, 2009 as U.S. Pat. No. 7,620,577, the contents of both of which are incorporated herein by reference in their entirety, and are of common assignee to the present invention.

This application is a Continuation-in-part of and also claims the benefit of U.S. patent application Ser. No. 11/196,509 filed on Aug. 4, 2005, issued Nov. 17, 2009 as U.S. Pat. No. 7,620,577, the contents of which are incorporated herein by reference in its entirety, and is of common assignee to the present invention. U.S. patent application Ser. No. 11/196,509 is (i) a Continuation-in-part of U.S. patent application Ser. No. 10/159,610 filed on Jun. 3, 2002, and (ii) a Continuation-in-part of U.S. patent application Ser. No. 10/961,404 filed on Oct. 12, 2004, the contents of both of which are incorporated herein by reference in its entirety and are of common assignee to the present invention. U.S. patent application Ser. No. 10/961,404 claims the benefit of U.S. Provisional Application 60/541,733 filed on Feb. 4, 2004, the contents of which are incorporated herein by reference in its entirety, and are of common assignee to the present invention.

This Application is also a Continuation-in-part of, and also claims the benefit of U.S. patent application Ser. No. 12/554,961 filed on Sep. 7, 2009, the contents of which are incorporated herein by reference in its entirety, and are of common assignee to the present invention. U.S. patent application Ser. No. 12/554,961 is a Continuation-in-part of U.S. patent application Ser. No. 11/509,003, filed Aug. 24, 2006, issued Sep. 8, 2009 as U.S. Pat. No. 7,587,352, the contents of which are incorporated herein by reference in its entirety, and are of common assignee to the present invention. U.S. patent application Ser. No. 11/509,003 is (i) a Continuation-in-part of U.S. patent application Ser. No. 10/252,761, filed Sep. 23, 2002, issued Oct. 3, 2006 as U.S. Pat. No. 7,117,175 and (ii) claims the benefit of U.S. Provisional Application 60/371,662 filed on Apr. 10, 2002, the contents of which are incorporated herein by reference in their entirety, and are of common assignee to the present invention. U.S. patent application Ser. No. 12/554,961 is also (i) a Continuation-in-part of Ser. No. 11/931,913, filed Oct. 31, 2007, (ii) a Continuation-in-part of Ser. No. 11/196,509, filed Aug. 4, 2005, and (iii) a Continuation-in-part of Ser. No. 11/509,002, filed Aug. 24, 2006, the contents of all of which are incorporated herein by reference in their entirety, and are of common assignee to the present invention.

BACKGROUND OF THE INVENTION

1. Field of the Invention

This invention pertains generally to securities investing and more specifically to construction and use of passive portfolios and indexes.

2. Related Art

Conventionally, there are various broad categories of securities portfolio management. One conventional securities portfolio management category is active management wherein the securities are selected for a portfolio individually based on economic, financial, credit, and/or business analysis; on technical trends; on cyclical patterns; etc. Another conventional category is passive management, also called indexing, wherein the securities in a portfolio duplicate those that make up an index. The securities in a passively managed portfolio are conventionally weighted by relative market capitalization weighting or equal weighting. Another middle ground conventional category of securities portfolio management is called enhanced indexing, in which a portfolio's characteristics, performance and holdings are substantially dominated by the characteristics, performance and holdings of the index, albeit with modest active management departures from the index.

The present invention relates generally to the passive and enhanced indexing categories of portfolio management. A securities market index, by intent, reflects an entire market or a segment of a market. A passive portfolio based on an index may also reflect the entire market or segment. Often every security in an index is held in the passive portfolio. Sometimes statistical modeling is used to create a portfolio that duplicates the profile, risk characteristics, performance characteristics, and securities weightings of an index, without actually owning every security included in the index. (Examples could be portfolios based on the Wilshire 5000 Equity Index or on the Lehman Aggregate Bond Index.) Sometimes statistical modeling is used to create the index itself such that it duplicates the profile, risk characteristics, performance characteristics, and securities weightings of an entire class of securities. (The Lehman Aggregate Bond Index is an example of this practice.)

Indexes are generally all-inclusive of the securities within their defined markets or market segments. In most cases indexes may include each security in the proportion that its market capitalization bears to the total market capitalization of all of the included securities. The only common exceptions to market capitalization weighting are equal weighting of the included securities (for example the Value Line index or the Standard & Poors 500 Equal Weighted Stock Index, which includes all of the stocks in the S&P 500 on a list basis; each stock given equal weighting as of a designated day each year) and share price weighting, in which share prices are simply added together and divided by some simple divisor (for example, the Dow Jones Industrial Average). Conventionally, passive portfolios are built based on an index weighted using one of market capitalization weighting, equal weighting, and share price weighting.

Most commonly used stock market indices are constructed using a methodology that is based upon either the relative share prices of a sample of companies (such as the Dow Jones Industrial Average) or the relative market capitalization of a sample of companies (such as the S&P 500 Index or the FTSE 100 Index). The nature of the construction of both of these types of indices means that if the price or the market capitalization of one company rises relative to its peers it is accorded a larger weighting in the index. Alternatively, a company whose share price or market capitalization declines relative to the other companies in the index is accorded a smaller index weighting. This can create a situation where the index, index funds, or investors who desire their funds to closely track an index, are compelled to have a higher weighting in companies whose share prices or market capitalizations have already risen and a lower weighting in companies that have seen a decline in their share price or market capitalization.

Advantages of passive investing include: a low trading cost of maintaining a portfolio that has turnover only when an index is reconstituted, typically once a year; a low management cost of a portfolio that requires no analysis of individual securities; and no chance of the portfolio suffering a loss—relative to the market or market segment the index reflects—because of misjudgments in individual securities selection.

Advantages of using market capitalization weighting as the basis for a passive portfolio include that the index (and therefore a portfolio built on it) remains continually 'in balance' as market prices for the included securities change, and that the portfolio performance participates in (i.e., reflects) that of the securities market or market segment included in the index.

The disadvantages of market capitalization weighting passive indexes, which can be substantial, center on the fact that any under-valued securities are underweighted in the index and related portfolios, while any over-valued securities are over weighted. Also, the portfolio based on market capitalization weighting follows every market (or segment) bubble up and every market crash down. Finally, in general, portfolio securities selection is not based on a criteria that reflects a better opportunity for appreciation than that of the market or market segment overall.

Price or market capitalization based indices can contribute to a 'herding' behavior on the behalf of investors by effectively compelling any of the funds that attempt to follow these indices to have a larger weighting in shares as their price goes up and a lower weighting in shares that have declined in price. This creates unnecessary volatility, which is not in the interests of most investors. It may also lead to investment returns that have had to absorb the phenomenon of having to repeatedly increase weightings in shares after they have risen and reduce weightings in them after they have fallen.

SUMMARY OF THE INVENTION

An exemplary embodiment of the present invention is directed to a new method, system and computer program product for passive investing that is based on indexes which are built with metrics other than market capitalization weighting, share price weighting or equal weighting. Among these metrics are various financial data of the company issuing securities, including but not limited to book value, sales, revenue, earnings, earnings per share, income, income growth rate, dividends, dividends per share, earnings before interest, tax, depreciation and amortization, etc. In another exemplary embodiment, other nonfinancial and non-market capitalization metrics can be used as the basis for compiling an index, such as, e.g., but not limited to, an index of companies with chief executive officers (CEOs) having graduated from a particular university.

A common element included in an exemplary embodiment of the present invention, which is entirely missing from conventionally available forms of index construction, is that the indexes of the present invention are "valuation-indifferent." That is, conventional indexes do not take account of classical valuation ratios, which causes the conventional indexes to create a natural tendency to over-weight the over-valued and under-weight the under-valued securities in the conventional indexes and portfolios based on them. While this cause also holds true for equal weighting, we exclude that as an already-extant (and trivial) exception.

The use of these non-market capitalization metrics according to the exemplary embodiment of the present invention, allows the construction of indexes and resulting passive portfolios that better reflect the economic scale and/or long-term growth potential of the individual securities within a market or market segment than do conventional capitalization weighting, share price weighting, or equal weighting. The non-market capitalization metrics according to an exemplary embodiment of the present invention, allow construction of indexes and resulting passive portfolios that offer to an investor who wishes to participate in a market or market segment a choice of passive portfolio alternatives with different risk characteristics. The indexes and portfolios based on them according to the exemplary embodiment of the present invention, also provide these additional advantages while maintaining the conventional benefits of passive investing. In historical testing, these non-market capitalization metrics are found to outperform the conventional capitalization-weighted indexes over extended periods of time, with similar or lower portfolio risk.

Overall, the availability of non-market capitalization indexes, and the passive and enhanced index portfolios based on them, have the potential to reduce investment costs through more widespread use of low-cost passive and enhanced-index investing. The present invention has the potential to improve investment returns versus the securities markets through the use of a securities weighting framework which is not subject to a natural tendency to overemphasize over-valued securities and underemphasize under-valued securities. The present invention also has the potential to reduce portfolio volatility through the use of securities weighting criteria that are less reflective of 'irrational exuberance.' An exemplary embodiment of the present invention also has the potential to offer 'customized' passive portfolios as each metric may have its own specific performance and risk characteristics.

An exemplary embodiment of the present invention sets forth a system, method, and computer program product for constructing a non-capitalization weighted portfolio of assets. In an exemplary embodiment, the method may include: (a) gathering data about a plurality of assets; (b) selecting a plurality of assets to create the index of assets; and (c) weighting each of the plurality of assets selected in the index based on an objective measure of scale of each of the plurality of assets, wherein the weighting may include: (i) weighting at least one of the plurality of assets; and (ii) weighting other than weighting based on market capitalization, equal weighting, and/or share price weighting.

In one exemplary embodiment, (c) may include weighting each of the plurality of assets, where each of the assets may include a stock; a commodity; a futures contract; a bond; a mutual fund; a hedge fund; a fund of funds; an exchange traded fund (ETF); a derivative; or a negative weighting on any asset.

In one exemplary embodiment, (c) may include weighting each of the plurality of assets, where each of the assets may include a stock.

In one exemplary embodiment, (c) may include weighting each of the plurality of assets, where each of the assets may include a commodity.

In one exemplary embodiment, (c) may include weighting each of the plurality of assets, where each of the assets may include a futures contract.

In one exemplary embodiment, (c) may include weighting each of the plurality of assets, wherein each of the assets may include a bond.

In one exemplary embodiment, (c) may include weighting each of the plurality of assets, where each of the assets may include a mutual fund.

In one exemplary embodiment, (c) may include weighting each of the plurality of assets, where each of the assets may include a hedge fund.

In one exemplary embodiment, (c) may include weighting each of the plurality of assets, where each of the assets may include a fund of funds.

In one exemplary embodiment, (c) may include weighting each of the plurality of assets, where each of the assets may include an exchange traded fund (ETF).

In one exemplary embodiment, (c) may include weighting each of the plurality of assets, where each of the assets may include a derivative.

In one exemplary embodiment, (c) may include a negative weighting on any asset.

In one exemplary embodiment, the negative weighting may be performed for purposes of establishing, or measuring, performance for any security, a portfolio of assets, a hedge fund, and/or a long/short position.

In one exemplary embodiment, (c) may include weighting based on the objective measure of scale, where the objective measure of scale may include a measure of company size associated with each of the plurality of assets.

In one exemplary embodiment, the measure of company size may include one or more of: gross revenue, sales, income, earnings before interest and tax (EBIT), earnings before interest, taxes, depreciation and amortization (EBITDA), number of employees, book value, assets, liabilities, and/or net worth.

In one exemplary embodiment, (c) may include weighting based on the objective measure of scale, where the objective measure of scale includes a measure relating to an underlying asset itself.

In one exemplary embodiment, the asset may include a municipality, a municipality issuing bonds, or a commodity.

In one exemplary embodiment, the objective measure of scale associated with the asset may include one or more of: revenue, profitability, sales, total sales, foreign sales, domestic sales, net sales, gross sales, profit margin, operating margin, retained earnings, earnings per share, book value, book value adjusted for inflation, book value adjusted for replacement cost, book value adjusted for liquidation value, dividends, assets, tangible assets, intangible assets, fixed assets, property, plant, equipment, goodwill, replacement value of assets, liquidation value of assets, liabilities, long term liabilities, short term liabilities, net worth, research and development expense, accounts receivable, earnings before interest, taxes, dividends, and amortization (EBITDA), accounts payable, cost of goods sold (CGS), debt ratio, budget, capital budget, cash budget, direct labor budget, factory overhead budget, operating budget, sales budget, inventory method, type of stock offered, liquidity, book income, tax income, capitalization of earnings, capitalization of goodwill, capitalization of interest, capitalization of revenue, capital spending, cash, compensation, employee turnover, overhead costs, credit rating, growth rate, tax rate, liquidation value of company, capitalization of cash, capitalization of earnings, capitalization of revenue, cash flow, and/or future value of expected cash flow.

In one exemplary embodiment, (c) may include weighting each of the assets in the index based on the objective measure of scale, where the objective measure may include a ratio of any combination of the objective measures of scale of the asset other than ratios based on weighting the assets based on market capitalization, equal weighting, or share-price weighting.

In one exemplary embodiment, the ratio of any combination of the objective measures of scale may include one or more of: current ratio, debt ratio, overhead expense as a percent of sales, and/or debt service burden ratio.

In one exemplary embodiment, the objective measure of scale may include a demographic measure of the asset.

In one exemplary embodiment, the demographic measure of scale may include one or more of: employees, floor space, office space, location, and/or other demographics of an asset.

In one exemplary embodiment, the measure of company size may include one or more demographic measure of the asset.

In one exemplary embodiment, the demographic measure of the asset may include one or more of a non-financial metric, a non-market related metric, a number of employees, floor space, office space, and/or other demographics of the asset.

In one exemplary embodiment, (c) may include weighting based on the objective measure of scale, where the objective measure of scale may include a geographic metric.

In one exemplary embodiment, the geographic metric may include a geographic metric other than gross domestic product (GDP) weighting.

In one exemplary embodiment, the method may include a passive investing method that may include: constructing the portfolio of assets according to the index.

In one exemplary embodiment, the portfolio of assets may include one or more of: a fund; a mutual fund; a fund of funds; an asset account; an exchange traded fund (ETF); a separate account, a pooled trust; and/or a limited partnership.

In one exemplary embodiment, the method may further include: selecting a plurality of assets for trading according to the index; and trading one or more of the plurality of assets based on the weighting of the index.

In one exemplary embodiment, the trading may include: rebalancing the portfolio based on the index.

In one exemplary embodiment, rebalancing may include: rebalancing on a periodic basis.

In one exemplary embodiment, rebalancing may include: rebalancing based on the assets reaching a threshold.

In one exemplary embodiment, the method may further include applying rules associated with the index.

In one exemplary embodiment, the method of constructing the non-market capitalization weighted portfolio may be used for one or more of: investment management, and/or investment portfolio benchmarking.

In one exemplary embodiment, the method may include an enhanced index investing method. The method may include constructing the portfolio of assets in a fashion in which at least one of holdings, performance, or characteristics, are substantially similar to the index.

In one exemplary embodiment, the method may be a computer-implemented method and (a) may include: gathering data using computerized databases.

In one exemplary embodiment, (c) may include weighting based on a non-market capitalization financial metric associated with each of the plurality of assets, and a non-financial metric associated with each of the plurality of assets.

In another exemplary embodiment, a system for constructing a non-capitalization weighted portfolio of assets may include: means for gathering data about a plurality of assets; means for selecting a plurality of assets to create the index of assets; and weighting means for weighting each of the plurality of assets selected in the index based on an objective measure of scale of the each of the plurality of assets, wherein the weighting means may include: means for weighting at least one of the plurality of assets; and means for weighting other than weighting based on at least one of market capitalization, equal weighting, or share price weighting.

In yet another exemplary embodiment, a non-capitalization weighted portfolio of assets construction system, may include: a processor adapted to gather data about a plurality of assets; adapted to select a plurality of assets to create the index of assets; adapted to weight each of the plurality of assets selected in the index based on an objective measure of scale of the each of the plurality of assets; adapted to weight at least one of the plurality of assets; and adapted to weight other than based on at least one of market capitalization, equal weighting, or share price weighting.

In another exemplary embodiment, a machine readable medium that provides instructions which when executed by a computing platform, cause the computing platform to perform operations may include a method of constructing a non-capitalization weighted portfolio of assets, the method may include: (a) gathering data about a plurality of assets; (b) selecting a plurality of assets to create the index of assets; and (c) weighting each of the plurality of assets selected in the index based on an objective measure of scale of the each of the plurality of assets, wherein the weighting may include: (i) weighting at least one of the plurality of assets; and (ii) weighting other than weighting based on at least one of market capitalization, equal weighting, or share price weighting.

Further features and advantages of the invention, as well as the structure and operation of various embodiments of the invention, are described in detail below with reference to the accompanying drawings.

In another exemplary embodiment, a computer implemented method of constructing an index of assets (I), the method performed by at least one processor operable to perform the method, the method may include: (a) accessing by the at least one processor of one or more databases storing and permitting retrieval of data (D) about a plurality of entities (E) and a plurality of corresponding assets (A) each issued by or having been issued by at least one of the plurality of entities (E); (b) selecting by the at least one processor a universe (U) of the plurality of entities (E) based on any measure of size (SZ) of the entities; (c) receiving by the at least one processor at least one objective measure of scale (O) regarding one or more of the plurality of entities (E) associated with the corresponding assets (A); (d) retrieving by the at least one processor one or more of the data (D) about a plurality of the entities (E) and the corresponding assets (A); (e) selecting by the at least one processor a subset of the universe (SU) may include the one or more data (D) to be a quantitative data (Q) reflecting the amount of the at least one objective measure of scale (O) associated with each of the entities (E), wherein the selecting of the subset of the universe (SU) may include: selecting the entities (E) of the subset of the universe (SU) based on the received at least one objective measure of scale (O) wherein the at least one objective measure of scale (O) (i) is substantially independent of the market prices (P) of any of the assets (A); and (ii) is substantially independent of the market capitalization (MC) of any of the entities (E), wherein the at least one objective measure of scale (O) may include a measure of the size (SZ) of each the entity (E) associated with each the given asset (A), and wherein the measure of the size (SZ) of each the entity (E) corresponding to each the asset (A) may include at least one of: gross revenue of the entity (E) associated with the asset (A), sales of the entity (E) associated with the asset (A), debt to equity adjusted sales of the entity (E), earnings of the entity (E) associated with the asset (A), income of the entity (E) associated with the asset (A), earnings before interest and tax (EBIT) of the entity (E) associated with the asset (A), earnings before interest, taxes, depreciation and amortization (EBITDA) of the entity (E) associated with the asset (A), number of employees of the entity (E) associated with the asset (A), book value of the entity (E) associated with the asset (A), cumulative retained cashflow of the entity (E), assets of the entity (E) associated with the asset (A), liabilities of the entity (E) associated with the asset (A), net worth of the entity (E) associated with the asset (A), cashflow of the entity (E) associated with the asset (A), any dividends of the entity (E) associated with the asset (A), any distribution to asset (A) holders by the entity (E), any asset (A) buybacks by the entity (E), an attribute relating to employees of the entity (E) associated with the asset (A), an attribute relating to floor space of a said entity (E) associated with the asset (A), an attribute relating to office space of the entity (E) associated with the asset (A), an attribute relating to location of the entity (E) associated with the asset (A), a demographic measure (DM) of the entity (E) associated with the asset (A), or a measure relating to a demographic attribute of the entity (E) associated with the asset (A); wherein the selecting by the at least one processor of the subset of the universe (SU) may include: (i) ranking by the at least one processor the entities (E) of the universe (U) based upon the quantitative data (Q) associated with the at least one objective measure of scale (O) of each of the entities (E); and (ii) selecting the subset (SU) by the at least one processor based on the ranking wherein the subset (SU) may include an index of assets (I) of the entities (E) to comprise the plurality of constituent index assets (IA) may include the index of assets (I); and (f) calculating by the at least one processor percentage weights for the index of assets (I) to be objective measure of scale weights (OW) substantially independent of (i) any of the market prices (P) of any of the assets (A); and (ii) any of the market capitalization (MC) of any of the entities (E), wherein the calculating may include: (i) adding the quantitative data (Q) of each of the at least one objective measure of scale (O) for all of the constituent index assets (IA) to yield a sum total quantitative data (SUMQ) for the at least one objective measure of scale; and (ii) dividing the quantitative data (Q) of the at least one objective measure of scale (O) for each the constituent index asset (IA) by the sum total quantitative data (SUMQ) to yield the objective measure of scale weight (OW) of each of the constituent index assets (IA) may include the index of assets (I), wherein the at least one objective measure of scale (O) may include a measure of the size (SZ) of each the entity (E) associated with each the given constituent index asset (IA), and wherein the measure of the size (SZ) of each the entity (E) corresponding to each the constituent index asset (IA) may include at least one of: gross revenue of the entity (E) associated with the constituent index asset (IA), sales of the entity (E) associated with the constituent index asset (IA), debt to equity adjusted sales of the constituent index asset (IA), earnings of the entity (E) associated with the constituent index asset (IA), income of the entity (E) associated with the constituent index asset (IA), earnings before interest and tax (EBIT) of the entity (E) associated with the constituent index asset (IA), earnings before interest, taxes, depreciation and amortization (EBITDA) of the entity (E) associated with the constituent index asset (IA), number of employees of the entity (E) associated with the constituent index asset (IA), book value of the entity (E) associated with the constituent index asset (IA), cumulative retained cashflow of the entity (E) associated with the constituent index asset (IA), assets of the entity (E) associated with the constituent index asset (IA), liabilities of the entity (E) associated with the constituent index asset (IA), net worth of the entity (E) associated with the constituent index asset (IA), cashflow of the entity (E) associated with the constituent index asset (IA), any dividends of the entity (E) associated with the constituent index asset (IA), any distribution to asset (A) holders by the entity (E) associated with the constituent index asset (IA), any asset (A) buybacks by the entity (E) associated with the constituent index asset (IA), an attribute relating to employees of the entity (E) associated with the constituent index asset (IA), an attribute relating to floor space of the entity (E) associated with the constituent index asset (IA), an attribute relating to office space of the entity (E) associated with the constituent index asset (IA), an attribute relating to location of the entity (E) associated with the constituent index asset (IA), a demographic measure (DM) of the entity (E) associated with the constituent index asset (IA), or a measure relating to a demographic attribute of the entity (E) associated with the constituent index asset (IA).

In another exemplary embodiment, the computer implemented method may include the method where the each of the assets may include at least one of a stock (S); a commodity (CO); a futures contract (FC); a bond (B); a municipal bond (MB); a corporate bond (CB); a mutual fund (MF); a hedge fund (HF); a fund of funds (FF); an exchange traded fund (ETF); or a derivative (DE).

In another exemplary embodiment, the computer implemented method may include the method where each of the assets may include a stock (S).

In another exemplary embodiment, the computer implemented method may include the method where each of the assets may include a commodity (CO).

In another exemplary embodiment, the computer implemented method may include the method where each of the assets may include a futures contract (FC).

In another exemplary embodiment, the computer implemented method may include the method where each of the assets may include a bond (B).

In another exemplary embodiment, the computer implemented method may include the method where each of the assets may include a mutual fund (MF).

In another exemplary embodiment, the computer implemented method may include the method where each of the assets may include a hedge fund (HF).

In another exemplary embodiment, the computer implemented method may include the method where each of the assets may include a fund of funds (FF).

In another exemplary embodiment, the computer implemented method may include the method where each of the assets may include an exchange traded fund (ETF).

In another exemplary embodiment, the computer implemented method may include the method where each of the assets may include a derivative (DE).

In another exemplary embodiment, the computer implemented method may include the method where the (h) may include weighting may include performing a negative weighting on any of the assets (NW).

In another exemplary embodiment, the computer implemented method may include the method where the negative weighting (NW) is performed for purposes of at least one of: establishing or measuring performance, for at least one of: any security (S); a portfolio of assets (PA); a hedge fund (HF); or at least one of: a long or a short position.

In another exemplary embodiment, the computer implemented method may include the method where the at least one objective measure of scale (O) may include a measure relating to at least one of an underlying attribute of one or more of the assets (A), or the entity (E) associated with the asset (A).

In another exemplary embodiment, the computer implemented method may include the method where (i) wherein the sales may include at least one of: total sales, foreign sales, domestic sales, net sales, net revenue or gross sales, (ii) wherein the book value may include at least one of: a value adjusted for inflation, a value adjusted for replacement or a value adjusted for liquidation value, (iii) wherein the cash flow may include at least one of: the entity associated with the asset, or future value of expected cash flow of the entity associated with the asset, and (iv) wherein the at least one objective measure of scale (O) associated with any the assets may include at least one of: profitability of the company associated with the asset; profit margin of the company associated with the asset; operating margin of the company associated with the asset; retained earnings of the company associated with the asset; earnings per share of the company associated with the asset; reported profits of the entity associated with the asset; reported pre-exceptional profits of the entity associated with the asset; value of an expected cash flow of the entity associated with the asset; dividends of the company associated with the asset; assets of the company associated with the asset; tangible assets of the company associated with the asset; intangible assets of the company associated with the asset; fixed assets of the company associated with the asset; property of the company associated with the asset; plant of the company associated with the asset; equipment of the company associated with the asset; goodwill of the company associated with the asset; replacement value of assets of the company associated with the asset; liquidation value of assets of the company associated with the asset; liabilities of the company associated with the asset; long term liabilities of the company associated with the asset; short term liabilities of the company associated with the asset; net worth of the company associated with the asset; research and development expense of the company associated with the asset; accounts receivable of the company associated with the asset; accounts payable of the company associated with the asset; cost of goods sold (CGS) of the company associated with the asset; debt ratio of the company associated with the asset; budget of the company associated with the asset; capital budget of the company associated with the asset; cash budget of the company associated with the asset; direct labor budget of the company associated with the asset; factory overhead budget of the company associated with the asset; operating budget of the company associated with the asset; sales budget of the company associated with the asset; inventory method of the company associated with the asset; type of stock offered of the company associated with the asset; liquidity of the company associated with the asset; book income of the company associated with the asset; tax income of the company associated with the asset; capitalization of earnings of the company associated with the asset; capitalization of goodwill of the company associated with the asset; capitalization of interest of the company associated with the asset; capitalization of revenue of the company associated with the asset; capital spending of the company associated with the asset; cash of the company associated with the asset; compensation of the company associated with the asset; employee turnover of the company associated with the asset; overhead costs of the company associated with the asset; credit rating of the company associated with the asset; growth rate of the company associated with the asset; tax rate of the company associated with the asset; liquidation value of entity of the company associated with the asset; capitalization of cash of the company associated with the asset; capitalization of earnings of the company associated with the asset; capitalization of revenue of the company associated with the asset; or value of expected measure of scale of the entity associated with the asset.

In another exemplary embodiment, the computer implemented method may include the method where the at least one objective measure of scale (O) may include a ratio of any combination of objective measures of scale (O) relating to one or more of the assets (A) and the ratio is not based on any one of: weighting the one or more assets based on market capitalization; equal weighting; or weighting in proportion to the market price of the one or more assets.

In another exemplary embodiment, the computer implemented method may include the method where the ratio of any combination of the objective measures of scale may include at least one of: current ratio, debt ratio, overhead expense as a percent of sales, or debt service burden ratio.

In another exemplary embodiment, the computer implemented method may include the method where the at least one objective measure of scale (O) may include the demographic measure (DM) of the entity (E) of the asset (A), and wherein the demographic measure (DM) may include at least one of a financial attribute, an accounting data attribute, a non-financial attribute, a non-accounting data attribute.

In another exemplary embodiment, the computer implemented method may include the method where the measure of size may include a demographic measure may include any accounting data appearing in an annual report of the entity (E).

In another exemplary embodiment, the computer implemented method may include the method where the demographic measure may include at least one of: a financial metric; a non-financial metric; a non-market related metric; a number of employees; a floor space; or an office space.

In another exemplary embodiment, the computer implemented method may include the method where (g) may include weighting based on the at least one objective measure of scale (O), wherein the at least one objective measure of scale (O) may include an economic indicator (EI).

In another exemplary embodiment, the computer implemented method may include the method where the at least one objective measure of scale (O) may include a measure tied to a particular geography (G) associated with at least one of the assets (A) or the entity (E).

In another exemplary embodiment, the computer implemented method may include the method where the method may include constructing a portfolio of assets (PA) based upon the index of assets (I).

In another exemplary embodiment, the computer implemented method may include the method where the portfolio of assets (PA) may include at least one of: a fund (F); a mutual fund (MF); a fund of funds (FF); an asset (A) account; an exchange traded fund (ETF); a separate account; a comingled account; a pooled trust; a limited liability company; or a limited partnership.

In another exemplary embodiment, the computer implemented method may include the method where selecting the portfolio of assets (PA) for trading according to the index of assets (I); and trading one or more of the assets (A) may include the portfolio of assets (PA) based on the method of constructing an index of assets (I).

In another exemplary embodiment, the computer implemented method may include the method where the trading may include: rebalancing the portfolio of assets (PA) based on the index of assets (I).

In another exemplary embodiment, the computer implemented method may include the method where rebalancing is performed on a periodic basis.

In another exemplary embodiment, the computer implemented method may include the method where the rebalancing is based upon the constituent assets (IA) reaching a threshold value.

In another exemplary embodiment, the computer implemented method may include the method further may include: applying one or more rules associated with the index of assets (I).

In another exemplary embodiment, the computer implemented method may include the method where the method of constructing the non-capitalization weighted index (I) is used for at least one of: investment management; or investment portfolio benchmarking.

In another exemplary embodiment, the computer implemented method may include the method further may include an enhanced index (EI) investing method, may include: constructing a portfolio of assets in a fashion in which at least one of: holdings; performance; or characteristics, are substantially similar to the index of assets (I).

In another exemplary embodiment, the computer implemented method may include the method further may include: gathering data about the plurality of assets (A) by an index (I) construction manager device may include computerized databases.

In another exemplary embodiment, the computer implemented method may include the method where at least one objective measure of scale (O) may include at least one of a financial metric, or a non-financial metric.

In another exemplary embodiment, the computer implemented method may include the method where the (b) may include at least one of: (i) selecting a group of the entities (E) having at least a minimum measure of size (SZ) above a first threshold value; (ii) selecting a group of the entities (E) having at least a minimum level of liquidity surpassing a second threshold value; or (iii) selecting a group of the entities (E) having at least a minimum number of tradable assets outstanding above a predetermined third threshold value.

In another exemplary embodiment, the computer implemented method may include the method where the universe (U) may include at least one of: a sector; a market; a market sector; an industry sector; a geographic sector; an international sector; a sub-industry sector; a government issue; or a tax exempt financial object.

In another exemplary embodiment, the computer implemented method may include the method where plurality of entities (E) may include all publicly traded companies.

In another exemplary embodiment, the computer implemented method may include the method where the plurality of entities (E) may include the universe (U) may include all publicly traded companies.

In another exemplary embodiment, the computer implemented method may include the method where plurality of entities (E) may include the subset (SU) may include all publicly traded companies.

In another exemplary embodiment, the computer implemented method may include the method further may include: selecting a subset of the subset (SSU) based on any measure of size (SZ) of the entities (E).

In another exemplary embodiment, the computer implemented method may include the method where further may include: selecting a subset of the subset (SSU) based on at least one of: a growth based measure; a value based measure; a large capitalization based measure; a small capitalization based measure; a mid capitalization based measure; a high price to earnings ratio based measure; or a low price to earnings ratio based measure.

In another exemplary embodiment, the computer implemented method may include a method of constructing an index of assets (I), the method performed by at least one processor operable to perform the method, the method may include: (a) accessing by the at least one processor of one or more databases storing and permitting retrieval of data (D) about a plurality of entities (E) and a plurality of corresponding assets (A) each issued by or having been issued by at least one of the plurality of entities (E); (b) selecting by the at least one processor a universe (U) of the plurality of entities (E) based on any measure of size (SZ) of the entities; (c) receiving by the at least one processor at least one objective measure of scale (O) regarding one or more of the plurality of entities (E) associated with the corresponding assets (A); (d) retrieving by the at least one processor one or more of the data (D) about a plurality of the entities (E) and the corresponding assets (A); (e) selecting by the at least one processor a subset of the universe (SU) may include the one or more data (D) to be a quantitative data (Q) reflecting the amount of the at least one objective measure of scale (O) associated with each of the entities (E), wherein the selecting of the subset of the universe (SU) may include: selecting the entities (E) of the subset of the universe (SU) based on the received at least one objective measure of scale (O) wherein the at least one objective measure of scale (O) (i) is substantially independent of the market prices (P) of any of the assets (A); and (ii) is substantially independent of the market capitalization (MC) of any of the entities (E), wherein the at least one objective measure of scale (O) may include a measure of the size (SZ) of each the entity (E) associated with each the given asset (A), and wherein the measure of the size (SZ) of each the entity (E) corresponding to each the asset (A) may include at least one of: gross revenue of the entity (E) associated with the asset (A), sales of the entity (E) associated with the asset (A), earnings of the entity (E) associated with the asset (A), income of the entity (E) associated with the asset (A), earnings before interest and tax (EBIT) of the entity (E) associated with the asset (A), earnings before interest, taxes, depreciation and amortization (EBITDA) of the entity (E) associated with the asset (A), number of employees of the entity (E) associated with the asset (A), book value of the entity (E) associated with the asset (A), assets of the entity (E) associated with the asset (A), liabilities of the entity (E) associated with the asset (A), net worth of the entity (E) associated with the asset (A), cashflow of the entity (E) associated with the asset (A), any dividends of the entity (E) associated with the asset (A), any asset (A) buybacks by the entity (E), an attribute relating to employees of the entity (E) associated with the asset (A), an attribute relating to floor space of the entity (E) associated with the asset (A), an attribute relating to office space of the entity (E) associated with the asset (A), an attribute relating to location of the entity (E) associated with the asset (A), a demographic measure (DM) of the entity (E) associated with the asset (A), or a measure relating to a demographic attribute of the entity (E) associated with the asset (A); wherein the selecting by the at least one processor of the subset of the universe (SU) may include: (i) ranking by the at least one processor the entities (E) of the universe (U) based upon the quantitative data (Q) associated with the at least one objective measure of scale (O) of each of the entities (E); and (ii) selecting the subset (SU) by the at least one processor based on the ranking wherein the subset (SU) may include an index of assets (I) of the entities (E) to comprise the plurality of constituent index assets (IA) may include the index of assets (I); and (f) calculating by the at least one processor percentage weights for the index of assets (I) not based on at least one of: (i) market capitalization weighting; (ii) equal weighting; or (iii) minimum variance weighting.

In another exemplary embodiment, the computer implemented method may include the method where the weighting may include mathematical blending.

In another exemplary embodiment, the computer implemented method may include the method where the weighting may include mathematical averaging.

In another exemplary embodiment, the computer implemented method may include the method where the mathematical averaging is performed on at least one of: a 1-year period, a 3-year period, a 4-year period, a 5-year period, a 6-year period, a 7-year period, a 8-year period or a 9-year period.

In another exemplary embodiment, the computer implemented method may include the method where the mathematical averaging is performed on a period less than a quarter.

In another exemplary embodiment, the computer implemented method may include the method where the mathematical averaging is performed on a period greater than a quarter.

In another exemplary embodiment, the computer implemented method may include the method where the mathematical averaging is independent of at least a current quarter.

In another exemplary embodiment, the computer implemented method may include the method where the mathematical averaging is performed so as to reduce price correlation.

In another exemplary embodiment, the computer implemented method may include the method further may include eliminating another subset (AS) of the entities (E) based on an illiquidity measure of the AS.

In another exemplary embodiment, the computer implemented method may include the method where partitioning of the subset (SU) to generate one or more partitioned subsets (PU).

In another embodiment, creating the stock market index may include selecting stocks and/or other financial objects from a set of entities having a publicly available periodic financial reports, such as, annual and/or quarterly reports. In another exemplary embodiment, the set of companies is not substantially equivalent to any one of the S&P 500 Index, and/or the Dow Jones Industrial Average. According to one exemplary embodiment, a universe of financial objects may be chosen based on a minimum size (by any conventional measure such as, e.g., but not limited to market capitalization, number of shares outstanding, etc.), a minimum number of shares outstanding, or other minimum cutoff, so as to ensure adequate liquidity. From such a universe then, according to an exemplary embodiment, a subset may be selected based on a metric which is substantially independent of price and/or market capitalization. In one exemplary embodiment, the universe may be a set. In another exemplary embodiment, a subset of the universe may be a set, and a subset may be selected from the set. In another embodiment, selecting may include, e.g., but not limited to: selecting a subset from the set, wherein the set may include, e.g., but not limited to, a universe, a subset of the universe, all stocks, all financial objects, a subset of all stocks, a subset of all financial objects, at least one of substantially all of the companies having a publicly available periodic financial report, and/or a plurality of subsets of the set. In another embodiment, the set may include a collection of a plurality of partitioned subsets of financial objects. In another embodiment, the index may include a collection of a plurality of partitioned subindexes. In another embodiment, the index may be partitioned into subindexes based on any criterion (including any of various well known indicators, such as, e.g., but not limited to, growth/value, large cap/mid cap/small cap, high P/E, low P/E, large company/small company/midsize company, etc.). In another embodiment, the set may include a group of entities greater than, e.g., but not limited to, 100 companies, 500 companies, 1000 companies, 1,000 companies, 5,000 companies, etc. In another embodiment, the set may include substantially all entities having publicly available periodic financial reports.

In another exemplary embodiment, the computer implemented method may include the method where partitioning of the index (I) into a plurality of partitioned sub-indexes (PI).

In another exemplary embodiment, the computer implemented method may include the method where the partitioning is based on any criterion.

In another exemplary embodiment, the computer implemented method may include the method further may include using a statistical technique to at least one: of mimic or substantially minor a performance of the index (I).

In another exemplary embodiment, the computer implemented method may include the method where the subset (SU) includes a group of entities (E) greater than 500.

In another exemplary embodiment, the computer implemented method may include the method where the plurality of entities (E) may include substantially all entities (E) having publicly available periodic financial reports.

In another exemplary embodiment, the computer implemented method may include the method where the (e) may include eliminating from the universe (U) a secondary subset (SSU) of any of the entities.

In another exemplary embodiment, the computer implemented method may include the method where the (f) may include weighting the remaining entities (E) left after the eliminating.

In another exemplary embodiment, the computer implemented method may include the method where the eliminating may include eliminating based on illiquidity of the eliminated entities (E). In another exemplary embodiment, the computer implemented method may include the method where the assets (A) comprise at least one of: a liability; a tracking portfolio; a financial instrument or a security, wherein the financial instrument or the security denotes a debt, an equity interest, or a hybrid; a derivatives contract, including at least one of: a future, a forward, a put, a call, an option, a swap, or any other transaction relating to a fluctuation of an underlying asset, notwithstanding the prevailing value of the contract, and notwithstanding whether such contract, for purposes of accounting, is considered an asset or liability; a commodity; a financial position; a currency position; a trust, a real estate investment trust (REIT), a real estate operating company (REOC), or a portfolio of trusts; a debt instrument may include at least one of: a bond, a debenture, a subordinated debenture, a mortgage bond, a collateral trust bond, a convertible bond, an income bond, a guaranteed bond, a serial bond, a deep discount bond, a zero coupon bond, a variable rate bond, a deferred interest bond, a commercial paper, a government security, a certificate of deposit, a Eurobond, a corporate bond, a government bond, a municipal bond, a treasury-bill, a treasury bond, a foreign bond, an emerging market bond, a high yield bond, a developed market bond, a junk bond, a collateralized instrument, an exchange traded note (ETN), or other agreements between a borrower and a lender; a fund; or an investment entity or account of any kind, including an interest in, or rights relating to: a hedge fund, an exchange traded fund (ETF), a fund of funds, a mutual fund, a closed end fund, an investment vehicle, or any other pooled or separately managed investment account, trust, or other investment vehicle.

In another exemplary embodiment, the computer implemented method may include the method where the assets (A) are held by, or on behalf of, one or a plurality of investors.

In another exemplary embodiment, the computer implemented method may include the method where the (f) is performed based on at least one of: (i) a current fundamental accounting measure, (ii) a past fundamental accounting measure, (iii) a forecasted fundamental accounting measure, (iv) a ratio of current, past or forecasted fundamental accounting measures; or (v) a mathematical blend of at least two of the (i) through the (iv).

In another exemplary embodiment, the computer implemented method may include the method where the (f) is performed based on taking a mathematical transformation of at least one of: (i) a current fundamental accounting measure, (ii) a past fundamental accounting measure, (iii) a forecasted fundamental accounting measure, (iv) a ratio of current, past or forecasted fundamental accounting measures; or (v) a mathematical blend of at least two of the (i) through the (iv).

In another exemplary embodiment, the computer implemented method may include the method where the mathematical transformation may include calculating a square root of at least one of the fundamental accounting measures.

In another exemplary embodiment, the computer implemented method may include the method where the objective measure of scale may include at least one of: reported profits of the entity associated with the asset; reported pre-exceptional profits of the entity associated with the asset; value of an expected cash flow of the entity associated with the asset; or value of expected measure of scale of the entity associated with the asset.

In another exemplary embodiment, the computer implemented method may include the method where the objective measure of scale may include at least one of: reported profits of the entity associated with the asset; reported pre-exceptional profits of the entity associated with the asset; a value of an expected cash flow of the entity associated with the asset; a value of expected measure of scale of the entity associated with the asset; a forecasted earning of the entity associated with the asset; a forecasted dividend of the entity associated with the asset; a forecasted sales of the entity associated with the asset; a forecasted revenue of the entity associated with the asset; a forecasted cashflow of the entity associated with the asset; a forecasted cumulative retained cashflow of the entity associated with the asset; a forecasted distribution of the entity to a holder of the asset; a forecasted buyback associated with the asset; a forecasted metric of the entity associated with the asset; or a forecasted fundamental accounting measure of the entity associated with the asset.

In yet another exemplary embodiment, a computer implemented method of constructing a non-capitalization weighted index of assets, may include: (a) gathering data by at least one computer about a plurality of assets and entities associated with the assets; (b) selecting a subset of the plurality of the assets by the at least one computer to create the index of assets based upon at least one objective measure of scale about the entities associated with the assets, wherein the subset of the plurality of assets may include constituent assets of the index of assets, wherein the selecting is substantially independent of a market price of the assets and is substantially independent of a market capitalization of the entities, wherein the at least one objective measure of scale may include at least one objective measure of size of the entities, and wherein the at least one objective measure of size may include at least one of: gross revenue of the entity associated with the asset, sales of the entity associated with the asset, debt to equity adjusted sales of the entity associated with the asset, earnings of the entity associated with the asset, income of the entity associated with the asset, earnings before interest and tax (EBIT) of the entity associated with the asset, earnings before interest, taxes, depreciation and amortization (EBITDA) of the entity associated with the asset, number of employees of the entity associated with the asset, book value of the entity associated with the asset, cumulative retained cashflow of the entity, assets of the entity associated with the asset, liabilities of the entity associated with the asset, net worth of the entity associated with the asset, cashflow of the entity associated with the asset, any dividends of the entity associated with the asset, any distribution to asset holders by the entity, any asset buybacks by the entity, an attribute relating to employees of the entity associated with the asset, an attribute relating to floor space of the entity associated with the asset, an attribute relating to office space of the entity associated with the asset, an attribute relating to location of the entity associated with the asset, a demographic measure (DM) of the entity associated with the asset, or a measure relating to a demographic attribute of the entity associated with the asset; and (c) weighting the constituent assets of the index of assets by the at least one computer to obtain constituent weightings of each of the constituent assets based on at least one objective measure of scale regarding the entities associated with the assets, (i) wherein the weighting is substantially independent of the market price of the assets and is substantially independent of a market capitalization of the entities; (ii) wherein the weighting is substantially independent of: equal weighting; weighting in proportion to the market price of the assets; and weighting in proportion to market capitalization of the entities associated with the assets; and (iii) wherein the weighting is based on the at least one objective measure of scale regarding the entities, wherein the at least one objective measure of scale may include at least one objective measure of size, and wherein the at least one objective measure of size may include at least one of: gross revenue of the entity associated with the asset, sales of the entity associated with the asset, debt to equity adjusted sales of the entity associated with the asset, earnings of the entity associated with the asset, income of the entity associated with the asset, earnings before interest and tax (EBIT) of the entity associated with the asset, earnings before interest, taxes, depreciation and amortization (EBITDA) of the entity associated with the asset, number of employees of the entity associated with the asset, book value of the entity associated with the asset, cumulative retained cashflow of the entity, assets of the entity associated with the asset, liabilities of the entity associated with the asset, net worth of the entity associated with the asset, cashflow of the entity associated with the asset, any dividends of the entity associated with the asset, any distribution to asset holders by the entity, any asset buybacks by the entity, an attribute relating to employees of the entity associated with the asset, an attribute relating to floor space of the entity associated with the asset, an attribute relating to office space of the entity associated with the asset, an attribute relating to location of the entity associated with the asset, a demographic measure (DM) of the entity associated with the asset, or a measure relating to a demographic attribute of the entity associated with the asset.

In another exemplary embodiment, the computer implemented method may include the method where each of the assets may include at least one of: a stock; a commodity; a futures contract; a bond; a municipal bond; a corporate bond; a mutual fund; a hedge fund; a fund of funds; an exchange traded fund (ETF); or a derivative.

In another exemplary embodiment, the computer implemented method may include the method where each of the assets may include a stock.

In another exemplary embodiment, the computer implemented method may include the method where each of the assets may include a commodity.

In another exemplary embodiment, the computer implemented method may include the method where each of the assets may include a futures contract.

In another exemplary embodiment, the computer implemented method may include the method where each of the assets may include a bond.

In another exemplary embodiment, the computer implemented method may include the method where each of the assets may include a mutual fund.

In another exemplary embodiment, the computer implemented method may include the method where each of the assets may include a hedge fund.

In another exemplary embodiment, the computer implemented method may include the method where each of the assets may include a fund of funds.

In another exemplary embodiment, the computer implemented method may include the method where each of the assets may include an exchange traded fund (ETF).

In another exemplary embodiment, the computer implemented method may include the method where each of the assets may include a derivative.

In another exemplary embodiment, the computer implemented method may include the method where the (c) may include weighting may include performing at least one of a negative, a zero, or a percentage weighting on any of the assets.

In another exemplary embodiment, the computer implemented method may include the method where the negative weighting is performed for purposes of at least one of: establishing or measuring performance, for at least one of: any security; a portfolio of assets; a hedge fund; or at least one of: a long or a short position.

In another exemplary embodiment, the computer implemented method may include the method where the objective measure of scale may include a measure relating to at least one of an underlying attribute of one of the assets, or the entity associated with the asset.

In another exemplary embodiment, the computer implemented method may include the method where the entity may include at least one of: a entity; a municipality; a municipality issuing bonds; a country; or an issuer of the asset.

In another exemplary embodiment, the computer implemented method may include the method where (A) wherein the sales may include at least one of: total sales, foreign sales, domestic sales, net sales, net revenue or gross sales, (B) wherein the book value may include at least one of: a value adjusted for inflation, a value adjusted for replacement or a value adjusted for liquidation value, (C) wherein the cash flow may include at least one of: the entity associated with the asset, or future value of expected cash flow of the entity associated with the asset, and (D) wherein the objective measure of size further may include at least one of: profitability of the entity associated with the asset; profit margin of the entity associated with the asset; operating margin of the entity associated with the asset; retained earnings of the entity associated with the asset; earnings per share of the entity associated with the asset; reported profits of the entity associated with the asset; reported pre-exceptional profits of the entity associated with the asset; value of an expected cash flow of the entity associated with the asset; dividends of the entity associated with the asset; assets of the entity associated with the asset; tangible assets of the entity associated with the asset; intangible assets of the entity associated with the asset; fixed assets of the entity associated with the asset; property of the entity associated with the asset; plant of the entity associated with the asset; equipment of the entity associated with the asset; goodwill of the entity associated with the asset; replacement value of assets of the entity associated with the asset; liquidation value of assets of the entity associated with the asset; liabilities of the entity associated with the asset; long term liabilities of the entity associated with the asset; short term liabilities of the entity associated with the asset; net worth of the entity associated with the asset; research and development expense of the entity associated with the asset; accounts receivable of the entity associated with the asset; accounts payable of the entity associated with the asset; cost of goods sold (CGS) of the entity associated with the asset; debt ratio of the entity associated with the asset; budget of the entity associated with the asset; capital budget of the entity associated with the asset; cash budget of the entity associated with the asset; direct labor budget of the entity associated with the asset; factory overhead budget of the entity associated with the asset; operating budget of the entity associated with the asset; sales budget of the entity associated with the asset; inventory method of the entity associated with the asset; type of stock offered of the entity associated with the asset; liquidity of the entity associated with the asset; book income of the entity associated with the asset; tax income of the entity associated with the asset; capitalization of earnings of the entity associated with the asset; capitalization of goodwill of the entity associated with the asset; capitalization of interest of the entity associated with the asset; capitalization of revenue of the entity associated with the asset; capital spending of the entity associated with the asset; cash of the entity associated with the asset; compensation of the entity associated with the asset; employee turnover of the entity associated with the asset; overhead costs of the entity associated with the asset; credit rating of the entity associated with the asset; growth rate of the entity associated with the asset; tax rate of the entity associated with the asset; liquidation value of entity of the entity associated with the asset; capitalization of cash of the entity associated with the asset; capitalization of earnings of the entity associated with the asset; capitalization of revenue of the entity associated with the asset; or value of expected measure of scale of the entity associated with the asset.

In another exemplary embodiment, the computer implemented method may include the method where the objective measure of scale may include a ratio of any combination of objective measures of scale relating to one or more of the assets and the ratio is not based on any one of: weighting the one or more assets based on market capitalization; equal weighting; or weighting in proportion to the market price of the one or more assets.

In another exemplary embodiment, the computer implemented method may include the method where the ratio of any combination of the objective measures of scale may include at least one of: current ratio, debt ratio, overhead expense as a percent of sales, or debt service burden ratio.

In another exemplary embodiment, the computer implemented method may include the method where the demographic measure (DM) may include at least one of: a financial metric; a non-financial metric; a non-market related metric; a number of employees; a floor space; or an office space.

In another exemplary embodiment, the computer implemented method may include the method where the (c) may include weighting based on the objective measure of scale, wherein the objective measure of scale may include an economic indicator.

In another exemplary embodiment, the computer implemented method may include the method where the objective measure of scale may include a measure tied to a particular geography associated with the assets or the entities associated with the assets.

In another exemplary embodiment, the computer implemented method may include the method further may include constructing by the at least one computer a portfolio of assets based upon the index of assets.

In another exemplary embodiment, the computer implemented method may include the method where the portfolio of assets may include at least one of: a fund; a mutual fund; a fund of funds; an asset account; an exchange traded fund (ETF); a separate account; a pooled trust; a comingled account; a limited liability company; or a limited partnership.

In another exemplary embodiment, the computer implemented method may include the method where selecting by the at least one computer the portfolio of assets for trading according to the index of assets; and trading by the at least one computer one or more of the portfolio of assets based on the selecting or the weighting of the constituent assets of the index.

In another exemplary embodiment, the computer implemented method may include the method where the trading may include: rebalancing by the at least one computer the portfolio of assets based on the index of assets.

In another exemplary embodiment, the computer implemented method may include the method where the rebalancing is performed on a periodic basis.

In another exemplary embodiment, the computer implemented method may include the method where the rebalancing is based upon the constituent assets reaching a threshold value.

In another exemplary embodiment, the computer implemented method may include the method further may include: applying one or more rules associated with the index of assets.

In another exemplary embodiment, the computer implemented method may include the method where the method of constructing the non-capitalization weighted index is used for at least one of: investment management; or investment portfolio benchmarking.

In another exemplary embodiment, the computer implemented method may include the method where the method further may include an enhanced index investing method, may include: constructing by the at least one computer a portfolio of assets in a fashion in which at least one of: holdings; performance; or characteristics, are substantially similar to the index of assets.

In another exemplary embodiment, the computer implemented method may include the method where the (a) may include: gathering by the at least one computer data about the plurality of assets by an index construction manager device may include computerized databases.

In another exemplary embodiment, the computer implemented method may include the method where the objective measure of scale may include a non-financial metric.

In another exemplary embodiment, an exemplary system for constructing a non-capitalization weighted index of assets, may include: means for processing, may include: means for gathering data about a plurality of assets and entities associated with the assets; means for selecting a subset of the plurality of the assets to create the index of assets based upon at least one objective measure of scale about the entities associated with the assets, wherein the subset of the plurality of assets comprise constituent assets of the index of assets, wherein the selecting is substantially independent of a market price of the assets and is substantially independent of a market capitalization of the entities, wherein the at least one objective measure of scale may include at least one objective measure of size of the entities, and wherein the at least one objective measure of size may include at least one of: gross revenue of the entity associated with the asset, sales of the entity associated with the asset, debt to equity adjusted sales of the entity associated with the asset, earnings of the entity associated with the asset, income of the entity associated with the asset, earnings before interest and tax (EBIT) of the entity associated with the asset, earnings before interest, taxes, depreciation and amortization (EBITDA) of the entity associated with the asset, number of employees of the entity associated with the asset, book value of the entity associated with the asset, cumulative retained cashflow of the entity, assets of the entity associated with the asset, liabilities of the entity associated with the asset, net worth of the entity associated with the asset, cashflow of the entity associated with the asset, any dividends of the entity associated with the asset, any distribution to asset holders by the entity; any asset buybacks by the entity; an attribute relating to employees of the entity associated with the asset, an attribute relating to floor space of the entity associated with the asset, an attribute relating to office space of the entity associated with the asset, an attribute relating to location of the entity associated with the asset, a demographic measure (DM) of the entity associated with the a asset, or a measure relating to a demographic attribute of the entity associated with the asset; and weighting means for weighting the constituent assets of the index of assets to obtain constituent weightings of each of the constituent assets based on at least one objective measure of scale regarding the entities associated with the assets, (i) wherein the weighting is substantially independent of the market price of the assets and is substantially independent of a market capitalization of the entities; (ii) wherein the weighting is substantially independent of: equal weighting; weighting in proportion to the market price of the assets; and weighting in proportion to market capitalization of the entities associated with the assets; and (iii) wherein the weighting is based on the at least one objective measure of scale regarding the entities, wherein the at least one objective measure of scale may include at least one objective measure of size, and wherein the at least one objective measure of size may include at least one of: gross revenue of the entity associated with the asset, sales of the entity associated with the asset, debt to equity adjusted sales of the entity associated with the asset, earnings of the entity associated with the asset, income of the entity associated with the asset, earnings before interest and tax (EBIT) of the entity associated with the asset, earnings before interest, taxes, depreciation and amortization (EBITDA) of the entity associated with the asset, number of employees of the entity associated with the asset, book value of the entity associated with the asset, cumulative retained cashflow of the entity, assets of the entity associated with the asset, liabilities of the entity associated with the asset, net worth of the entity associated with the asset, cashflow of the entity associated with the asset, any dividends of the entity associated with the asset, any distribution to asset holders by the entity, any asset buybacks by the entity, an attribute relating to employees of the entity associated with the asset, an attribute relating to floor space of the entity associated with the asset, an attribute relating to office space of the entity associated with the asset, an attribute relating to location of the entity associated with the asset, a demographic measure (DM) of the entity associated with the asset, or a measure relating to a demographic attribute of the entity associated with the asset.

In an exemplary embodiment, a computer-implemented non-capitalization weighted portfolio of assets construction system, may include: at least one processor gathering data about a plurality of assets and entities associated with the assets; the at least one processor selecting a subset of the plurality of the assets to create the index of assets based upon at least one objective measure of scale about the entities associated with the assets, wherein the subset of the plurality of assets comprise constituent assets of the index of assets, wherein the selecting is substantially independent of a market price of the assets and is substantially independent of a market capitalization of the entities, wherein the at least one objective measure of scale may include at least one objective measure of size of the entities, and wherein the at least one objective measure of size may include at least one of: gross revenue of the entity associated with the asset, sales of the entity associated with the asset, debt to equity adjusted sales of the entity associated with the asset, earnings of the entity associated with the asset, income of the entity associated with the asset, earnings before interest and tax (EBIT) of the entity associated with the asset, earnings before interest, taxes, depreciation and amortization (EBITDA) of the entity associated with the asset, number of employees of the entity associated with the asset, book value of the entity associated with the asset, cumulative retained cashflow of the entity, assets of the entity associated with the asset, liabilities of the entity associated with the asset, net worth of the entity associated with the asset, cashflow of the entity associated with the asset, any dividends of the entity associated with the asset, any distribution to asset holders by the entity, any asset buybacks by the entity, an attribute relating to employees of the entity associated with the asset, an attribute relating to floor space of the entity associated with the asset, an attribute relating to office space of the entity associated with the asset, an attribute relating to location of the entity associated with the asset, a demographic measure (DM) of the entity associated with the asset, or a measure relating to a demographic attribute of the entity associated with the asset; the at least one processor weighting the constituent assets of the index of assets to obtain constituent weightings of each of the constituent assets based on at least one objective measure of scale regarding the entities associated with the assets; the at least one processor performing the weighting such that the weighting is substantially independent of the market price of the assets; is substantially independent of: weighting based on market capitalization, equal weighting, and weighting in proportion to the market price of the assets; and is based on the at least one objective measure of scale regarding the entities, wherein the at least one objective measure of scale may include at least one objective measure of size, and wherein the at least one objective measure of size may include at least one of: gross revenue of the entity associated with the asset, sales of the entity associated with the asset, debt to equity adjusted sales of the entity associated with the asset, earnings of the entity associated with the asset, income of the entity associated with the asset, earnings before interest and tax (EBIT) of the entity associated with the asset, earnings before interest, taxes, depreciation and amortization (EBITDA) of the entity associated with the asset, number of employees of the entity associated with the asset, book value of the entity associated with the asset, cumulative retained cashflow of the entity, assets of the entity associated with the asset, liabilities of the entity associated with the asset, net worth of the entity associated with the asset, cashflow of the entity associated with the asset, any dividends of the entity associated with the asset, any distribution to asset holders by the entity, any asset buybacks by the entity, an attribute relating to employees of the entity associated with the asset, an attribute relating to floor space of the entity associated with the asset, an attribute relating to office space of the entity associated with the asset, an attribute relating to location of the entity associated with the asset, a demographic measure (DM) of the entity associated with the asset, or a measure relating to a demographic attribute of the entity associated with the asset.

In another exemplary embodiment, a machine readable medium that provides instructions which when executed by a at least one computing platform, cause the at least one computing platform to perform operations may include a method of constructing a non-capitalization weighted index of assets, the method may include: (a) gathering data about a plurality of assets and entities associated with the assets; (b) selecting a subset of the plurality of the assets to create the index of assets based upon at least one objective measure of scale about the entities associated with the assets, wherein the subset of the plurality of assets comprise constituent assets of the index of assets, wherein the selecting is substantially independent of a market price of the assets and is substantially independent of a market capitalization of the entities, wherein the at least one objective measure of scale may include at least one objective measure of size of the entities, and wherein the at least one objective measure of size may include at least one of: gross revenue of the entity associated with the asset, sales of the entity associated with the asset, debt to equity adjusted sales of the entity associated with the asset, earnings of the entity associated with the asset, income of the entity associated with the asset, earnings before interest and tax (EBIT) of the entity associated with the asset, earnings before interest, taxes, depreciation and amortization (EBITDA) of the entity associated with the asset, number of employees of the entity associated with the asset, book value of the entity associated with the asset, cumulative retained cashflow of the entity, assets of the entity associated with the asset, liabilities of the entity associated with the asset, net worth of the entity associated with the asset, cashflow of the entity associated with the asset, any dividends of the entity associated with the asset, any distribution to asset holders by the entity, any asset buybacks by the entity, an attribute relating to employees of the entity associated with the asset, an attribute relating to floor space of the entity associated with the asset, an attribute relating to office space of the entity associated with the asset, an attribute relating to location of the entity associated with the asset, a demographic measure (DM) of the entity associated with the asset, or a measure relating to a demographic attribute of the entity associated with the asset; and (c) weighting the constituent assets of the index of assets to obtain constituent weightings of each of the constituent assets based on at least one objective measure of scale regarding the entities associated with the assets, (i) wherein the weighting is substantially independent of the market price of the assets and is substantially independent of a market capitalization of the entities; (ii) wherein the weighting is substantially independent of: equal weighting; weighting in proportion to market price of the assets; and weighting in proportion to market capitalization of the entities associated with the assets; and (iii) wherein the weighting is based on the at least one objective measure of scale regarding the entities, wherein the at least one objective measure of scale may include at least one objective measure of size, and wherein the at least one objective measure of size may include at least one of: gross revenue of the entity associated with the asset, sales of the entity associated with the asset, debt to equity adjusted sales of the entity associated with the asset, earnings of the entity associated with the asset, income of the entity associated with the asset, earnings before interest and tax (EBIT) of the entity associated with the asset, earnings before interest, taxes, depreciation and amortization (EBITDA) of the entity associated with the asset, number of employees of the entity associated with the asset, book value of the entity associated with the asset, cumulative retained cashflow of the entity, assets of the entity associated with the asset, liabilities of the entity associated with the asset, net worth of the entity associated with the asset, cashflow of the entity associated with the asset, any dividends of the entity associated with the asset, any distribution to asset holders by the entity, any asset buybacks by the entity, an attribute relating to employees of the entity associated with the asset, an attribute relating to floor space of the entity associated with the asset, an attribute relating to office space of the entity associated with the asset, an attribute relating to location of the entity associated with the asset, a demographic measure (DM) of the entity associated with the asset, or a measure relating to a demographic attribute of the entity associated with the asset.

In another exemplary embodiment, a computer-implemented method for construction and management of a stock market index and at least one stock market index fund containing a portfolio of stocks based on the index, the method may include: selecting constituent stocks of the stock market index, by at least one computer, from publicly traded stocks, based upon at least one accounting data about entities associated with the stocks, wherein the selecting is substantially independent of a market share price of the stocks and is substantially independent of a market capitalization of the entities, wherein the at least one accounting data may include a measure of scale of the entities, wherein the accounting data may include a measure of size, and wherein the measure of size may include at least one of: gross revenue of the entity associated with the stock, sales of the entity associated with the stock, debt to equity adjusted sales of the entity associated with the asset, earnings of the entity associated with the asset, income of the entity associated with the stock, earnings before interest and tax (EBIT) of the entity associated with the stock, earnings before interest, taxes, depreciation and amortization (EBITDA) of the entity associated with the stock, number of employees of the entity associated with the stock, book value of the entity associated with the stock, cumulative retained cashflow of the entity, assets of the entity associated with the stock, liabilities of the entity associated with the stock, net worth of the entity associated with the stock, cashflow of the entity associated with the stock, any dividends of the entity associated with the stock, any distribution to asset holders by a said entity, any asset buybacks by a said entity, an attribute relating to employees of a said entity associated with a said stock, an attribute relating to floor space of a said entity associated with said asset, an attribute relating to office space of a said entity associated with a said stock, an attribute relating to location of a said entity associated with a said stock, a demographic measure (DM) of a said entity associated with a said stock, or a measure relating to a demographic attribute of a said entity associated with a said stock; and weighting the constituent stocks of the stock market index, by the at least one computer, to obtain constituent weightings based upon at least one accounting data regarding the entities associated with the stocks, wherein said weighting is substantially independent of a market share price of the entities associated with the stocks, and wherein said weighting is substantially independent of equal weighting, weighting in proportion to market share price of the stocks of the entities, and weighting in proportion to market capitalization of the entities associated with the stocks, wherein said at least one objective measure of size may include at least one of: gross revenue of a said entity associated with a said asset, sales of a said entity associated with a said asset, debt to equity adjusted sales of a said entity associated with a said asset, earnings of a said entity associated with a said asset, income of a said entity associated with a said asset, earnings before interest and tax (EBIT) of a said entity associated with a said asset, earnings before interest, taxes, depreciation and amortization (EBITDA) of a said entity associated with a said asset, number of employees of a said entity associated with a said asset, book value of a said entity associated with a said asset, cumulative retained cashflow of a said entity, assets of a said entity associated with a said asset, liabilities of a said entity associated with a said asset, net worth of a said entity associated with a said asset, cashflow of a said entity associated with a said asset, any distribution to asset holders by a said entity, any asset buybacks by a said entity, an attribute relating to employees of a said entity associated with a said asset, an attribute relating to floor space of a said entity associated with a said asset, an attribute relating to office space of a said entity associated with a said asset, an attribute relating to location of a said entity associated with a said asset, a demographic measure (DM) of a said entity associated with a said asset, or a measure relating to a demographic attribute of a said entity associated with a said asset.

In another exemplary embodiment, the computer implemented method may include the method where the stock market index, and weightings are based upon any one of: a ratio, or any manipulation of fundamental accounting data, that are respectively contained within a standard entity annual report and accounts.

In another exemplary embodiment, the computer implemented method may include the method where the computer-implemented method may include: altering the relative weightings of the stocks within the stock market index fund as the fundamental data concerning the entities associated with one or more stocks changes.

In another exemplary embodiment, the computer implemented method may include the method where the altering may include at least one of: altering based on at least one of: changes in relative weightings of stocks in the index; or changes in the stocks that are members of the index outside one or more sample changes; or altering at the time of at least one of: when, or after at least one of the entities associated with a stock of the index reports its accounting information.

In another exemplary embodiment, a computer implemented method may include: (a) gathering data by at least one computer about a plurality of assets and entities associated with said assets by the at least one computer; (b) selecting a subset of said plurality of assets to create an index by the at least one computer, based upon at least one objective measure of scale about said entities associated with the assets, wherein said subset of said plurality of assets comprise constituent assets of the index of assets, wherein said selecting is substantially independent of a market price of the assets and is substantially independent of a market capitalization of said entities, wherein said at least one objective measure of scale may include at least one objective measure of size of said entities, and wherein said at least one objective measure of size may include at least one of: gross revenue of a said entity associated with a said asset, sales of a said entity associated with a said asset, debt to equity adjusted sales of a said entity associated with a said asset, earnings of a said entity associated with a said asset, income of a said entity associated with a said asset, earnings before interest and tax (EBIT) of a said entity associated with a said asset, earnings before interest, taxes, depreciation and amortization (EBITDA) of a said entity associated with a said asset, number of employees of a said entity associated with a said asset, book value of a said entity associated with a said asset, cumulative retained cashflow of a said entity, assets of a said entity associated with a said asset, liabilities of a said entity associated with a said asset, net worth of a said entity associated with a said asset, cashflow of a said entity associated with a said asset, any dividends of a said entity associated with a said asset, any distribution to asset holders by a said entity, any asset buybacks by a said entity, an attribute relating to employees of a said entity associated with a said asset, an attribute relating to floor space of a said entity associated with a said asset, an attribute relating to office space of a said entity associated with a said asset, an attribute relating to location of a said entity associated with a said asset, a demographic measure (DM) of a said entity associated with a said asset, or a measure relating to a demographic attribute of a said entity associated with a said asset; and (c) weighting, by the at least one computer, the constituent assets selected in the index to obtain constituent weightings of each of the constituent assets based on at least one objective measure of scale regarding the entities associated with the assets, wherein said weighting is substantially independent of the market price of the assets and said weighting is substantially independent of weighting based on market capitalization, equal weighting, and weighting in proportion to the market price of the assets and said weighting is based on said at least one objective measure of scale regarding the entities, wherein said at least one objective measure of scale may include at least one objective measure of size, and wherein said at least one objective measure of size may include at least one of: gross revenue of a said entity associated with a said asset, sales of a said entity associated with a said asset, debt to equity adjusted sales of a said entity associated with a said asset, earnings of a said entity associated with a said asset, income of a said entity associated with a said asset, earnings before interest and tax (EBIT) of a said entity associated with a said asset, earnings before interest, taxes, depreciation and amortization (EBITDA) of a said entity associated with a said asset, number of employees of a said entity associated with a said asset, book value of a said entity associated with a said asset, cumulative retained cashflow of a said entity, assets of a said entity associated with a said asset, liabilities of a said entity associated with a said asset, net worth of a said entity associated with a said asset, cashflow of a said entity associated with a said asset, any dividends of a said entity associated with a said asset, any distribution to asset holders by a said entity, any asset buybacks by a said entity, an attribute relating to employees of a said entity associated with a said asset, an attribute relating to floor space of a said entity associated with a said asset, an attribute relating to office space of a said entity associated with a said asset, an attribute relating to location of a said entity associated with a said asset, a demographic measure (DM) of a said entity associated with a said asset, or a measure relating to a demographic attribute of a said entity associated with a said asset.

In another exemplary embodiment, the computer implemented method may include the method where the method may include at least one of: a passive investing method; an active investing method; or an enhanced type of active investing method.

In another exemplary embodiment, the computer implemented method may include the method where the market price of the assets may include a per share price for stocks.

In another exemplary embodiment, the computer implemented method may include the method where each of the entities may include any one or more of: a company, an entity; or a sovereign state.

In another exemplary embodiment, the computer implemented method may include the method where the objective measure of scale may include at least one of a gross domestic product (GDP) of the geography of the entity, or a geographic metric other than GDP weighting.

In another exemplary embodiment, the computer implemented method may include the method where the entities are entities, wherein the assets are stocks, wherein the objective measure of scale is an accounting based data, and wherein the market price of the assets may include a per share price for the stocks.

In another exemplary embodiment, the computer implemented method may include the method further may include basing the constituent weightings of the stocks upon at least one of: a ratio or a manipulation of the accounting data.

In another exemplary embodiment, the computer implemented method may include the method where the constituent weightings of the stocks within the stock market index fund are altered as the accounting data concerning the entities in or outside the index changes.

In another exemplary embodiment, the computer implemented method may include the method where the constituent weightings of the stocks within the fund are altered when at least one of: one or more of the entities report their quarterly or annual accounting information; or at a pre-determined time after which the majority of the entities in the index have reported their quarterly or annual accounting data.

In another exemplary embodiment, the computer implemented method may include the method where the accounting data includes data found within at least one of an annual report, a generally accepted accounting principles (GAAP) annual report, or a standard U.S. GAAP entity annual report and accounts (GAAP reports).

In another exemplary embodiment, the computer implemented method may include the method where the accounting data includes at least one of: relative size of profit of a entity, or pre-exceptional profits, sales, assets, cash flow, shareholders' equity, or a return on investment of the entity.

In another exemplary embodiment, the computer implemented method may include the method where the accounting data comprise: a weighted combination of sales, cash flow, and any other generally accepted accounting data.

In another exemplary embodiment, the computer implemented method may include the method where the data may include at least one of any dividends, revenues, profit, assets or ratios pertaining thereto.

In another exemplary embodiment, the computer implemented method may include the method where the accounting data may include at least one of any dividends, profit, assets, and any fundamental accounting item, or ratio pertaining thereto.

In another exemplary embodiment, the computer implemented method may include the method where the basing the constituent weightings upon at least one of a ratio or a manipulation of the accounting data may include basing the constituent weightings on at least one of: a relative size of the return on assets of the selected entities, the return on investment thereof, or the return on capital thereof compared to the cost of capital thereof.

In another exemplary embodiment, the computer implemented method may include the method where the creating may include calculating the constituent weightings based upon the at least one accounting data.

In another exemplary embodiment, the computer implemented method may include the method where the calculating is performed by an index construction manager device.

In another exemplary embodiment, a computer implemented method for trading a plurality of assets, the method performed by at least one processor operable to perform the method, method may include enabling the at least one processor to perform: (A) selecting by the at least one processor a portfolio of assets (PA) for trading according to an index of assets (I); and (B) trading by the at least one processor one or more of the portfolio of assets (A), the index of assets (I) being constructed based on a method of constructing the index of assets (I) operable to be performed by the at least one processor, the method of constructing the index of assets (I) may include enabling the at least one processor to perform: (a) accessing by the at least one processor of one or more databases storing and permitting retrieval of data (D) about a plurality of entities (E) and a plurality of corresponding assets (A) each issued by or having been issued by at least one of the plurality of entities (E); (b) receiving by the at least one processor at least one criterion of the index of assets (I); (c) receiving by the at least one processor at least one objective measure of scale (O) regarding one or more of the plurality of entities (E) associated with the corresponding assets (A); (d) retrieving by the at least one processor one or more of the data (D) about a plurality of the entities (E) and the corresponding assets (A); (e) selecting a subset of the data (d) by the at least one processor the one or more data (D) to be a quantitative data (Q) reflecting the amount of the at least one objective measure of scale (O) associated with each of the entities entities (E), wherein the objective measure of scale (O) is substantially independent of: (i) the market prices (P) of any of the assets (A); and (ii) the market capitalization (MC) of any of the entities (E), wherein the at least one objective measure of scale (O) may include a measure of the size (SZ) of each the entity (E) associated with each the given asset (A), and wherein the measure of the size (SZ) of each the entity (E) corresponding to each the asset (A) may include at least one of: gross revenue of the entity (E) associated with the asset (A), sales of the entity (E) associated with the asset (A), debt to equity adjusted sales of the entity (E), earnings of the entity (E) associated with the asset (A), income of the entity (E) associated with the asset (A), earnings before interest and tax (EBIT) of the entity (E) associated with the asset (A), earnings before interest, taxes, depreciation and amortization (EBITDA) of the entity associated with the asset (A), number of employees of the entity (E) associated with the asset (A), book value of the entity (E) associated with the asset (A), cumulative retained cashflow of the entity (E), assets of the entity (E) associated with the asset (A), liabilities of the entity (E) associated with the asset (A), net worth of the entity (E) associated with the asset (A), cashflow of the entity (E) associated with the asset (A), any dividends of the entity (E) associated with the asset (A), any distribution to asset (A) holders by the entity (E), any asset (A) buybacks by the entity (E), an attribute relating to employees of the entity (E) associated with the asset (A), an attribute relating to floor space of the entity (E) associated with the asset (A), an attribute relating to office space of the entity (E) associated with the asset (A), an attribute relating to location of the entity (E) associated with the asset (A), a demographic measure (DM) of the entity (E) associated with the asset (A), or a measure relating to a demographic attribute of the entity (E) associated with the asset (A); (f) ranking by the at least one processor the entities (E) based upon the quantitative data (Q) associated with the at least one objective measure of scale (O) of each of the entities (E); (g) selecting by the at least one processor a subset based on the at least one criterion of the index of assets (I) of the entities (E) meeting the at least one criterion of the quantitative data (Q) to comprise the plurality of constituent index assets (IA) exclusively may include the index of assets (I); and (h) calculating by the at least one processor percentage weights for the index of assets (I) to be objective measure of scale weights (OW) substantially independent of (i) any of the market prices (P) of any of the assets (A); and (ii) any of the market capitalization (MC) of any of the entities (E), wherein the calculating may include: (i) adding the quantitative data (Q) of each of the at least one objective measure of scale (O) for all of the constituent index assets (IA) to yield a sum total quantitative data (SUMQ) for the at least one objective measure of scale; and (ii) dividing the quantitative data (Q) of the at least one objective measure of scale (O) for each the constituent index asset (IA) by the sum total quantitative data (SUMQ) to yield the objective measure of scale weight (OW) of each of the constituent index assets (IA) may include the index of assets (I), wherein the at least one objective measure of scale (O) may include a measure of the size (SZ) of each the entity (E) associated with each the given constituent index asset (IA), and wherein the measure of the size (SZ) of each the entity (E) corresponding to each the constituent index asset (IA) may include at least one of: gross revenue of the entity (E) associated with the constituent index asset (IA), sales of the entity (E) associated with the constituent index asset (IA), debt to equity adjusted sales of the entity (E) associated with the asset (A), earnings of the entity (E) associated with the asset (A), income of the entity (E) associated with the constituent index asset (IA), earnings before interest and tax (EBIT) of the entity (E) associated with the constituent index asset (IA), earnings before interest, taxes, depreciation and amortization (EBITDA) of the entity (E) associated with the constituent index asset (IA), number of employees of the entity (E) associated with the constituent index asset (IA), book value of the entity (E) associated with the constituent index asset (IA), cumulative retained cashflow of the entity (E), assets of the entity (E) associated with the constituent index asset (IA), liabilities of the entity (E) associated with the constituent index asset (IA), net worth of the entity (E) associated with the constituent index asset (IA), cashflow of the entity (E) associated with the constituent index asset (IA), any dividends of the entity (E) associated with the constituent index asset (IA), any distribution to asset (A) holders by the entity (E), any asset (A) buybacks by the entity (E), an attribute relating to employees of the entity (E) associated with the constituent index asset (IA), an attribute relating to floor space of the entity (E) associated with the constituent index asset (IA), an attribute relating to office space of the entity (E) associated with the constituent index asset (IA), an attribute relating to location of the entity (E) associated with the constituent index asset (IA), a demographic measure (DM) of the entity (E) associated with the constituent index asset (IA), or a measure relating to a demographic attribute of the entity (E) associated with the constituent index asset (IA).

In another exemplary embodiment, the computer implemented method may include the method where the portfolio of assets (PA) may include at least one of: a fund (F); a mutual fund (MF); a fund of funds (FF); an asset (A) account; an exchange traded fund (ETF); a separate account; a comingled account; a pooled trust; a limited liability company; or a limited partnership.

In another exemplary embodiment, the computer implemented method may include the method where the method further may include: rebalancing the portfolio of assets (PA) based on the index of assets (I).

In another exemplary embodiment, the computer implemented method may include the method where the rebalancing is performed on a periodic basis.

In another exemplary embodiment, the computer implemented method may include the method where the rebalancing is based upon the constituent assets (IA) reaching a threshold value.

In another exemplary embodiment, a computer processor implemented method of constructing an index of stocks (I), the method performed by at least one processor operable to perform the method, the method may include enabling the at least one processor to perform: (a) accessing by the at least one processor of one or more databases storing and permitting retrieval of data (D) about a plurality of entities (E) and a plurality of corresponding stocks (S) each issued by or having been issued by at least one of the plurality of entities (E); (b) receiving by the at least one processor at least one criterion of the index of stocks (S); (c) receiving by the at least one processor at least one objective measure of scale (O) regarding one or more of the plurality of entities (E) associated with the corresponding stocks (S); (d) retrieving by the at least one processor one or more of the data (D) about a plurality of the entities (E) and the corresponding stocks (S); (e) selecting by the at least one processor the one or more data (D) to be a quantitative data (Q) reflecting the amount of the at least one objective measure of scale (O) associated with each of the entities (E), wherein the objective measure of scale is substantially independent of: (i) the market prices (P) of any of the stocks (S); and (ii) the market capitalization (MC) of any of the entities (E), wherein the at least one objective measure of scale (O) may include a measure of the size (SZ) of each the entity (E) associated with each the given stock (S), and wherein the measure of the size (SZ) of each the entity (E) corresponding to each the stock (S) may include at least one of: gross revenue of the entity (E) associated with the stock (S), sales of the entity (E) associated with the stock (S), debt to equity adjusted sales of the entity (E), earnings of the entity (E) associated with the asset (A), income of the entity (E) associated with the stock (S), earnings before interest and tax (EBIT) of the entity (E) associated with the stock (S), earnings before interest, taxes, depreciation and amortization (EBITDA) of the entity (E) associated with the stock (S), number of employees of the entity (E) associated with the stock (S), book value of the entity (E) associated with the stock (S), cumulative retained cashflow of the entity (E), assets of the entity (E) associated with the stock (S), liabilities of the entity (E) associated with the stock (S), net worth of the entity (E) associated with the stock (S), cashflow of the entity (E) associated with the stock (S), any dividends of the entity (E) associated with the stock (S), any distribution to asset (A) holders by the entity (E), any asset (A) buybacks by the entity (E), an attribute relating to employees of the entity (E) associated with the stock (S), an attribute relating to floor space of the entity (E) associated with the stock (S), an attribute relating to office space of the entity (E) associated with the stock (S), an attribute relating to location of the entity (E) associated with the stock (S), a demographic measure (DM) of the entity (E) associated with the stock (S), or a measure relating to a demographic attribute of the entity (E) associated with the stock (S); (f) ranking by the at least one processor the entities (E) based upon the quantitative data (Q) associated with the at least one objective measure of scale (O) of each of the entities (E); (g) selecting by the at least one processor a subset of the index based on the at least one criterion of the index of stocks (I) of the entities (E) meeting the at least one criterion of the quantitative data (Q) to comprise the plurality of individual index stocks (IS) exclusively may include the index of stocks (I); and (h) calculating by the at least one processor percentage weights for the index of stocks (I) to be objective measure of scale weights (OW) substantially independent of (i) the market prices (P) of any of the stocks (S); and (ii the market capitalization (MC) of any of the entities (E), wherein the calculating may include: (iii) adding the quantitative data (Q) of each of the at least one objective measure of scale (O) for all of the constituent index stocks (IS) to yield a sum total quantitative data (SUMQ) for the at least one objective measure of scale; and (iv) dividing the quantitative data (Q) of the at least one objective measure of scale (O) for each the constituent index stock (IS) by the sum total quantitative data (SUMQ) to yield the objective measure of scale weight (OW) of each of the constituent index stocks (IS) may include the index of stocks (I), wherein the at least one objective measure of scale (O) may include a measure of the size (SZ) of each the entity (E) associated with each the given constituent index stocks, and wherein the measure of the size (SZ) of each the entity (E) corresponding to each the constituent index stocks (IS) may include at least one of: gross revenue of the entity (E) associated with the constituent index stocks (IS), sales of the entity (E) associated with the constituent index stocks (IS), debt to equity adjusted sales of the entity (E) associated with the asset (A), earnings of the entity (E) associated with the asset (A), income of the entity (E) associated with the constituent index stocks (IS), earnings before interest and tax (EBIT) of the entity (E) associated with the constituent index stocks (IS), earnings before interest, taxes, depreciation and amortization (EBITDA) of the entity (E) associated with the constituent index stocks (IS), number of employees of the entity (E) associated with the constituent index stocks (IS), book value of the entity (E) associated with the constituent index stocks (IS), cumulative retained cashflow of the entity (E), assets of the entity (E) associated with the constituent index stocks (IS), liabilities of the entity (E) associated with the constituent index stocks (IS), net worth of the entity (E) associated with the constituent index stocks (IS), cashflow of the entity (E) associated with the constituent index stocks (IS), any dividends of the entity (E) associated with the constituent index stocks (IS), any distribution to asset (A) holders by the entity (E), any asset (A) buybacks by the entity (E), an attribute relating to employees of the entity (E) associated with the constituent index stocks (IS), an attribute relating to floor space of the entity (E) associated with the constituent index stocks (IS), an attribute relating to office space of the entity (E) associated with the constituent index stocks (IS), an attribute relating to location of the entity (E) associated with the constituent index stocks (IS), a demographic measure (DM) of the entity (E) associated with the constituent index stocks (IS), or a measure relating to a demographic attribute of the entity (E) associated with the constituent index stocks (IS).

In another exemplary embodiment, a computer system, may include: at least one processor; one or more storage devices, readable by the at least one processor, tangibly embodying at least one program of instructions executable by the at least one processor to conduct a method for constructing an index of assets (I), the method may include: (a) accessing by the at least one processor of one or more databases storing and permitting retrieval of data (D) about a plurality of entities (E) and a plurality of corresponding assets (A) each issued by or having been issued by at least one of the plurality of entities (E); (b) receiving by the at least one processor at least one criterion of the index of assets (I); (c) receiving by the at least one processor at least one objective measure of scale (O) regarding one or more of the plurality of entities (E) associated with the corresponding assets (A); (d) retrieving by the at least one processor one or more of the data (D) about a plurality of the entities (E) and the corresponding assets (A); (e) selecting by the at least one processor the one or more data (D) to be a quantitative data (Q) reflecting the amount of the at least one objective measure of scale (O) associated with each of the entities (E), wherein the objective measure of scale (O) is substantially independent of: (i) the market prices (P) of any of the assets (A); and (ii) the market capitalization (MC) of any of the entities (E), wherein the at least one objective measure of scale (O) may include a measure of the size (SZ) of each the entity (E) associated with each the given asset (A), and wherein the measure of the size (SZ) of each the entity (E) corresponding to each the asset (A) may include at least one of: gross revenue of the entity (E) associated with the asset (A), sales of the entity (E) associated with the asset (A), debt to equity adjusted sales of the entity (E), earnings of the entity (E) associated with the asset (A), income of the entity (E) associated with the asset (A), earnings before interest and tax (EBIT) of the entity (E) associated with the asset (A), earnings before interest, taxes, depreciation and amortization (EBITDA) of the entity (E) associated with the asset (A), number of employees of the entity (E) associated with the asset (A), book value of the entity (E) associated with the asset (A), cumulative retained cashflow of the entity (E), assets of the entity (E) associated with the asset (A), liabilities of the entity (E) associated with the asset (A), net worth of the entity (E) associated with the asset (A), cashflow of the entity (E) associated with the asset (A), any dividends of the entity (E) associated with the asset (A), any distribution to asset (A) holders by the entity (E), any asset (A) buybacks by the entity (E), an attribute relating to employees of the entity (E) associated with the asset (A), an attribute relating to floor space of the entity (E) associated with the asset (A), an attribute relating to office space of the entity (E) associated with the asset (A), an attribute relating to location of the entity (E) associated with the asset (A), a demographic measure (DM) of the entity (E) associated with the asset (A), or a measure relating to a demographic attribute of the entity (E) associated with the asset (A); (f) ranking by the at least one processor the entities (E) based upon the at least one criterion, and the quantitative data (Q) associated with the at least one objective measure of scale (O) of each of the entities (E); (g) selecting by the at least one processor a subset of the plurality of entities of the index of assets (I) of the entities (E) meeting the at least one criterion of the quantitative data (Q) to comprise the plurality of constituent index assets (IA) exclusively may include the index of assets (I); and (h) calculating percentage weights by the at least one processor for the index of assets (I) to be objective measure of scale weights (OW) substantially independent of (i) the market prices (P) of any of the assets (A); and (ii) the market capitalization (MC) of any of the entities (E), wherein the calculating may include: (i) adding the quantitative data (Q) of each of the at least one objective measure of scale (O) for all of the constituent index assets (IA) to yield a sum total quantitative data (SUMQ) for the at least one objective measure of scale; and (ii) dividing the quantitative data (Q) of the at least one objective measure of scale (O) for each the constituent index asset (IA) by the sum total quantitative data (SUMQ) to yield the objective measure of scale weight (OW) of each of the constituent index assets (IA) may include the index of assets (I), wherein the at least one objective measure of scale (O) may include a measure of the size (SZ) of each the entity (E) associated with each the given constituent index asset (IA), and wherein the measure of the size (SZ) of each the entity (E) corresponding to each the constituent index asset (IA) may include at least one of: gross revenue of the entity (E) associated with the constituent index asset (IA), sales of the entity (E) associated with the constituent index asset (IA), debt to equity adjusted sales of the entity (E) associated with the asset (A), earnings of the entity (E) associated with the asset (A), income of the entity (E) associated with the constituent index asset (IA), earnings before interest and tax (EBIT) of the entity (E) associated with the constituent index asset (IA), earnings before interest, taxes, depreciation and amortization (EBITDA) of the entity (E) associated with the constituent index asset (IA), number of employees of the entity (E) associated with the constituent index asset (IA), book value of the entity (E) associated with the constituent index asset (IA), cumulative retained cashflow of the entity (E), assets of the entity (E) associated with the constituent index asset (IA), liabilities of the entity (E) associated with the constituent index asset (IA), net worth of the entity (E) associated with the constituent index asset (IA), cashflow of the entity (E) associated with the constituent index asset (IA), any dividends of the entity (E) associated with the constituent index asset (IA), any distribution to asset (A) holders by the entity (E), any asset (A) buybacks by the entity (E), an attribute relating to employees of the entity (E) associated with the constituent index asset (IA), an attribute relating to floor space of the entity (E) associated with the constituent index asset (IA), an attribute relating to office space of the entity (E) associated with the constituent index asset (IA), an attribute relating to location of the entity (E) associated with the constituent index asset (IA), a demographic measure (DM) of the entity (E) associated with the constituent index asset (IA), or a measure relating to a demographic attribute of the entity (E) associated with the constituent index asset (IA).

In another exemplary embodiment, the computer implemented system may include the method where the each of the assets (A) may include at least one of a stock (S); a commodity (CO); a futures contract (FC); a bond (B); a municipal bond (MB); a corporate bond (CB); a mutual fund (MF); a hedge fund (HF); a fund of funds (FF); an exchange traded fund (ETF); or a derivative (DE).

In another exemplary embodiment, a computer system, may include: at least one processor; one or more storage devices, readable by the at least one processor, tangibly embodying at least one program of instructions executable by the at least one processor to conduct a method for constructing a non-capitalization weighted index of assets, the method may include: (a) gathering data by the at least one processor about a plurality of assets; (b) selecting by the at least one processor a plurality of the assets to create the index of assets based upon at least one objective measure of scale about one or more entities associated with the assets, wherein the selecting is substantially independent of a market price of the assets and a market capitalization of the entities, wherein the at least one objective measure of scale may include a measure of the size of each the entity associated with each the given asset, and wherein the measure of the size of each the entity corresponding to each the asset may include at least one of: gross revenue of the entity associated with the asset, sales of the entity associated with the asset, debt to equity adjusted sales of the entity, earnings of the entity associated with the asset, income of the entity associated with the asset, earnings before interest and tax (EBIT) of the entity associated with the asset, earnings before interest, taxes, depreciation and amortization (EBITDA) of the entity associated with the asset, number of employees of the entity associated with the asset, book value of the entity associated with the asset, cumulative retained cashflow of the entity, assets of the entity associated with the asset, liabilities of the entity associated with the asset, net worth of the entity associated with the asset, cashflow of the entity associated with the asset, any dividends of the entity associated with the asset, any distribution to asset holders by the entity, any asset buybacks by the entity, an attribute relating to employees of the entity associated with the asset, an attribute relating to floor space of the entity associated with the asset, an attribute relating to office space of the entity associated with the asset, an attribute relating to location of the entity associated with the asset, a demographic measure of the entity associated with the asset, or a measure relating to a demographic attribute of the entity associated with the asset; and (c) weighting by the at least one processor the constituent assets of the index of assets to obtain constituent weightings based on at least one objective measure of scale regarding the entities associated with the assets, wherein the at least one objective measure of scale may include a measure of the size of each the entity associated with each the asset, and wherein the measure of the size of each the entity corresponding to each the asset may include at least one of: gross revenue of the entity associated with the asset, sales of the entity associated with the asset, debt to equity adjusted sales of the entity associated with the asset, earnings of the entity associated with the asset, income of the entity associated with the asset, earnings before interest and tax (EBIT) of the entity associated with the asset, earnings before interest, taxes, depreciation and amortization (EBITDA) of the entity associated with the asset, number of employees of the entity associated with the asset, book value of the entity associated with the asset, cumulative retained cashflow of the entity, assets of the entity associated with the asset, liabilities of the entity associated with the asset, net worth of the entity associated with the asset, cashflow of the entity associated with the asset, any dividends of the entity associated with the asset, any distribution to asset holders by the entity, any asset buybacks by the entity, an attribute relating to employees of the entity associated with the asset, an attribute relating to floor space of the entity associated with the asset, an attribute relating to office space of the entity associated with the asset, an attribute relating to location of the entity associated with the asset, a demographic measure of the entity associated with the asset, or a measure relating to a demographic attribute of the entity associated with the asset; and (i) wherein the weighting is substantially independent of the market price of the assets and a market capitalization of the entities; and (ii) wherein the weighting is substantially independent of: equal weighting; weighting in proportion to the market price of the assets; and weighting in proportion to market capitalization of the entities associated with the assets.

In another exemplary embodiment, the computer implemented system may include the system where each of the assets may include at least one of a stock; a commodity; a futures contract; a bond; a municipal bond; a corporate bond; a mutual fund; a hedge fund; a fund of funds; an exchange traded fund (ETF); or a derivative.

In another exemplary embodiment, a computer implemented method for trading a plurality of assets, the method performed by at least one processor operable to perform the method, method may include enabling the at least one processor to perform: (A) selecting by the at least one processor a portfolio of assets (PA) for trading according to an index of assets (I); and (B) trading by the at least one processor one or more of the portfolio of assets, the index of assets being constructed based on a method of constructing the index of assets operable to be performed by the at least one processor, the method of constructing the index of assets may include enabling the at least one processor to perform: (a) gathering data by the at least one processor about the plurality of assets; (b) selecting by the at least one processor a plurality of the assets to create the index of assets based upon at least one objective measure of scale about one or more entities associated with the assets, wherein the selecting is substantially independent of a market price of the assets and a market capitalization of the entities, wherein the at least one objective measure of scale may include a measure of the size of each the entity associated with each the given asset, and wherein the measure of the size of each the entity corresponding to each the asset may include at least one of: gross revenue of the entity associated with the asset, sales of the entity associated with the asset, debt to equity adjusted sales of the entity associated with the asset, earnings of the entity associated with the asset, income of the entity associated with the asset, earnings before interest and tax (EBIT) of the entity associated with the asset, earnings before interest, taxes, depreciation and amortization (EBITDA) of the entity associated with the asset, number of employees of the entity associated with the asset, book value of the entity associated with the asset, cumulative retained cashflow of the entity, assets of the entity associated with the asset, liabilities of the entity associated with the asset, net worth of the entity associated with the asset, cashflow of the entity associated with the asset, any dividends of the entity associated with the asset, any distribution to asset holders by the entity, any asset buybacks by the entity, an attribute relating to employees of the entity associated with the asset, an attribute relating to floor space of the entity associated with the asset, an attribute relating to office space of the entity associated with the asset, an attribute relating to location of the entity associated with the asset, a demographic measure (DM) of the entity associated with the asset, or a measure relating to a demographic attribute of the entity associated with the asset; and (c) weighting by the at least one processor the constituent assets of the index of assets to obtain constituent weightings based on at least one objective measure of scale regarding the entities associated with the assets, wherein the at least one objective measure of scale may include a measure of the size of each the entity associated with each the asset, and wherein the measure of the size of each the entity corresponding to each the asset may include at least one of: gross revenue of the entity associated with the asset, sales of the entity associated with the asset, debt to equity adjusted sales of the entity associated with the asset, earnings of the entity associated with the asset, income of the entity associated with the asset, earnings before interest and tax (EBIT) of the entity associated with the asset, earnings before interest, taxes, depreciation and amortization (EBITDA) of the entity associated with the asset, number of employees of the entity associated with the asset, book value of the entity associated with the asset, cumulative retained cashflow of the entity, assets of the entity associated with the asset, liabilities of the entity associated with the asset, net worth of the entity associated with the asset, cashflow of the entity associated with the asset, any dividends of the entity associated with the asset, any distribution to asset holders by the entity, any asset buybacks by the entity, an attribute relating to employees of the entity associated with the asset, an attribute relating to floor space of the entity associated with the asset, an attribute relating to office space of the entity associated with the asset, an attribute relating to location of the entity associated with the asset, a demographic measure (DM) of the entity associated with the asset, or a measure relating to a demographic attribute of the entity associated with the asset; and (i) wherein the weighting is substantially independent of the market price of the assets and a market capitalization of the entities; and (ii) wherein the weighting is substantially independent of: equal weighting; weighting in proportion to the market price of the assets; and weighting in proportion to market capitalization of the entities associated with the assets.

In another exemplary embodiment, the computer implemented method may include the method where the portfolio of assets (PA) may include at least one of: a fund (F); a mutual fund (MF); a fund of funds (FF); an asset account; an exchange traded fund (ETF); a separate account; a comingled account; a pooled trust; a limited liability company; or a limited partnership.

In another exemplary embodiment, the computer implemented method may include the method where the method further may include: rebalancing the portfolio of assets based on the index of assets.

In another exemplary embodiment, the computer implemented method may include the method where the rebalancing is performed on a periodic basis.

In another exemplary embodiment, the computer implemented method may include the method where the rebalancing is based upon the constituent assets reaching a threshold value.

In another exemplary embodiment, an index construction manager (ICM) device-implemented method for the construction and management of a stock market index and a stock market index fund containing a portfolio of stocks based on the stock market index, the method may include: creating, by an index construction manager device, may include at least one processor, a stock market index, or at least one stock market index fund including a portfolio of stocks, wherein the creating may include: selecting constituent stocks of the stock market index, by the index construction manager device may include the at least one processor, based upon at least one accounting data about the entities associated with the stocks, wherein the selecting is substantially independent of a market price, wherein the at least one accounting data may include a measure of the size of each the entity associated with each the given stock, and wherein the measure of the size of each the entity corresponding to each the stock may include at least one of: gross revenue of the entity associated with the stock, sales of the entity associated with the stock, debt to equity adjusted sales of the entity associated with the stock, earnings of the entity associated with the stock, income of the entity associated with the stock, earnings before interest and tax (EBIT) of the entity associated with the stock, earnings before interest, taxes, depreciation and amortization (EBITDA) of the entity associated with the stock, number of employees of the entity associated with the stock, book value of the entity associated with the stock, cumulative retained cashflow of the entity, assets of the entity associated with the stock, liabilities of the entity associated with the stock, net worth of the entity associated with the stock, cashflow of the entity associated with the stock, any distribution to stockholders by the stock, any stock buybacks by the stock, an attribute relating to employees of the entity associated with the stock, an attribute relating to floor space of the entity associated with the stock, an attribute relating to office space of the entity associated with the stock, an attribute relating to location of the entity associated with the stock, a demographic measure of the entity associated with the stock, or a measure relating to a demographic attribute of the entity associated with the stock; and weighting the constituent stocks of the stock market index, by the index construction manager device may include the at least one processor, to obtain constituent weightings based upon at least one accounting data regarding the entities associated with the stocks, wherein the weighting is substantially independent of market price of the entities associated with the stocks, and wherein the weighting is substantially independent of equal weighting, weighting in proportion to market share price of the stocks of the entities, and weighting in proportion to market capitalization of the entities associated with the stocks, wherein the at least one accounting data may include a measure of the size of each the entity associated with each the given stock, and wherein the measure of the size of each the entity corresponding to each the stock may include at least one of: gross revenue of the entity associated with the stock, sales of the entity associated with the stock, income of the entity associated with the stock, debt to equity adjusted sales of the entity associated with the stock, earnings of the entity associated with the stock, earnings before interest and tax (EBIT) of the entity associated with the stock, earnings before interest, taxes, depreciation and amortization (EBITDA) of the entity associated with the stock, number of employees of the entity associated with the stock, book value of the entity associated with the stock, cumulative retained cashflow of the entity, assets of the entity associated with the stock, liabilities of the entity associated with the stock, net worth of the entity associated with the stock, cashflow of the entity associated with the stock, any dividends of the entity associated with the stock, any distribution to stockholders by the stock, any stock buybacks by the stock, an attribute relating to employees of the entity associated with the stock, an attribute relating to floor space of the entity associated with the stock, an attribute relating to office space of the entity associated with the stock, an attribute relating to location of the entity associated with the stock, a demographic measure of the entity associated with the stock, or a measure relating to a demographic attribute of the entity associated with the stock.

In another exemplary embodiment, the computer implemented method may include the method further may include basing, by the index construction manager device, the constituent weightings of the stocks upon at least one of: a ratio or a manipulation of the accounting data.

In another exemplary embodiment, the computer implemented method may include the method where the constituent weightings of the stocks within the stock market index fund are altered, by the index construction manager device, as the accounting data concerning the entities in or outside the index changes.

In another exemplary embodiment, the computer implemented method may include the method where the constituent weightings of the stocks within the fund are altered, by the index construction manager device, when at least one of: one or more of the entities report their quarterly or annual accounting information; or at a pre-determined time after which the majority of the entities in the index have reported their quarterly or annual accounting data.

In another exemplary embodiment, the computer implemented method may include the method where the accounting data includes data, electronically obtained by the index construction manager device, the data found within a standard U.S. generally accepted accounting principles (GAAP) entity annual report and accounts (GAAP reports).

In another exemplary embodiment, the computer implemented method may include the method where the accounting data, electronically obtained by the index construction manager device, includes at least one of: relative size of profit of a entity, or pre-exceptional profits, sales, assets, cash flow, shareholders' equity, or a return on investment of the entity.

In another exemplary embodiment, the computer implemented method may include the method where the accounting data comprise: a weighted combination of sales, cash flow, and any other generally accepted accounting data, wherein the weighted combination is electronically obtained by the index construction manager device.

In another exemplary embodiment, the computer implemented method may include the method where the data, electronically obtained by the index construction manager device, may include at least one of any dividends, profit, assets or ratios pertaining thereto.

In another exemplary embodiment, the computer implemented method may include the method where the another accounting data, electronically obtained by the index construction manager device, may include at least one of any dividends, profit, assets, revenue, cashflow, book value, or any fundamental accounting item, or ratio pertaining thereto.

In another exemplary embodiment, the computer implemented method may include the method where the basing the constituent weightings upon at least one of a ratio or a manipulation of the accounting data may include basing the constituent weightings, obtained by the index construction manager device, on at least one of: a relative size of the return on assets of the selected entities, the return on investment thereof, or the return on capital thereof compared to the cost of capital thereof.

In another exemplary embodiment, the computer implemented method may include the method where the creating may include calculating, electronically by the index construction manager device, the constituent weightings based upon the at least one accounting data.

In another exemplary embodiment, the computer implemented method may include the method where the calculating is performed by an index construction manager device being operated by an index manager.

In another exemplary embodiment, a system for construction and management of a financial index and a portfolio based on the financial index, wherein the financial index is generated, by an index construction manager device may include at least one processor, based on accounting data, the system may include: a computer may include the index construction manager device configured to create the financial index and at least one portfolio based on the financial index, wherein constituent weightings, obtained by the index construction manager device, of constituents of the portfolio are weighted based upon at least one accounting data regarding entity entities associated with each of the constituents of the portfolio, the selection of the constituents of the financial index, being obtained by the index construction manager device, based upon at least one accounting data about the entities substantially independent of a market price of the constituents and a market capitalization of the entities, wherein the at least one accounting data may include an objective measure of scale of the entity associated with the constituent, and wherein the objective measure of scale may include an objective measure of size of the entity associated with the constituent, wherein the at least one accounting data may include at least one of: gross revenue of the entity associated with the constituent, sales of the entity associated with the constituent, debt to equity adjusted sales of the entity associated with the constituent, earnings of the entity associated with the constituent, income of the entity associated with the constituent, earnings before interest and tax (EBIT) of the entity associated with the constituent, earnings before interest, taxes, depreciation and amortization (EBITDA) of the entity associated with the constituent, number of employees of the entity associated with the constituent, book value of the entity associated with the constituent, cumulative retained cashflow of the entity, assets of the entity associated with the constituent, liabilities of the entity associated with the constituent, net worth of the entity associated with the constituent, cashflow of the entity associated with the constituent, any dividend yield of the entity associated with the constituent, any distribution to constituent holders by the entity, any constituent buybacks by the entity, an attribute relating to employees of the entity associated with the constituent, an attribute relating to floor space of the entity associated with the constituent, an attribute relating to office space of the entity associated with the constituent, an attribute relating to location of the entity associated with the constituent, a demographic measure of the entity associated with the a constituent, or a measure relating to a demographic attribute of the entity associated with the constituent, and wherein the constituent weightings, obtained by the index construction manager device, are substantially independent of a market price of the constituent entities and wherein the constituent weightings are substantially independent of equal weighting, weighting in proportion to market price of the constituent, and weighting in proportion to market capitalization of the entity, wherein the at least one accounting data may include an objective measure of scale of the entity associated with the constituent, and wherein the objective measure of scale may include an objective measure of size of the entity associated with the constituent, wherein the at least one accounting data may include at least one of: gross revenue of the entity associated with the constituent, sales of the entity associated with the constituent, income of the entity associated with the constituent, debt to equity adjusted sales of the entity associated with the constituent, earnings of the entity associated with the constituent, earnings before interest and tax (EBIT) of the entity associated with the constituent, earnings before interest, taxes, depreciation and amortization (EBITDA) of the entity associated with the constituent, number of employees of the entity associated with the constituent, book value of the entity associated with the constituent, cumulative retained cashflow of the entity, assets of the entity associated with the constituent, liabilities of the entity associated with the constituent, net worth of the entity associated with the constituent, cashflow of the entity associated with the constituent, any dividends of the entity associated with the constituent, any distribution to constituent holders by the entity, any constituent buybacks by the entity, an attribute relating to employees of the entity associated with the constituent, an attribute relating to floor space of the entity associated with the constituent, an attribute relating to office space of the entity associated with the constituent, an attribute relating to location of the entity associated with the constituent, a demographic measure of the entity associated with the constituent, or a measure relating to a demographic attribute of the entity associated with the constituent.

In another exemplary embodiment, the computer implemented method may include the method where the accounting based data, obtained by the index construction manager device, may include at least one of: any dividends or ratios related thereto.

In another exemplary embodiment a computer readable medium embodying program logic which when executed by a computer performs an index construction manager (ICM) device-implemented method may include: creating by the index construction manager device may include at least one processor a financial index, and at least one portfolio based on the financial index, wherein constituent weightings of constituents of the portfolio are, obtained by the index construction manager device, based upon at least one accounting data regarding one or more entities associated with each of the constituents of the portfolio, the creating may include: selecting by the index construction manager device constituents of the financial index, based upon at least one accounting data about the entities substantially independent of a market price of the constituents and a market capitalization of the entities, wherein the at least one accounting data may include an objective measure of scale of the entity associated with the constituent, and wherein the objective measure of scale may include an objective measure of size of the entity associated with the constituent, wherein the at least one accounting data may include at least one of: gross revenue of the entity associated with the constituent, sales of the entity associated with the constituent, debt to equity adjusted sales of the entity associated with the constituent, earnings of the entity associated with the constituent, income of the entity associated with the constituent, earnings before interest and tax (EBIT) of the entity associated with the constituent, earnings before interest, taxes, depreciation and amortization (EBITDA) of the entity associated with the constituent, number of employees of the entity associated with the constituent, book value of the entity associated with the constituent, cumulative retained cashflow of the entity, assets of the entity associated with the constituent, liabilities of the entity associated with the constituent, net worth of the entity associated with the constituent, cashflow of the entity associated with the constituent, any dividends of the entity associated with the constituent, any distribution to constituent holders by the entity, any constituent buybacks by the entity, an attribute relating to employees of the entity associated with the constituent, an attribute relating to floor space of the entity associated with the constituent, an attribute relating to office space of the entity associated with the constituent, an attribute relating to location of the entity associated with the constituent, a demographic measure (DM) of the entity associated with the constituent, or a measure relating to a demographic attribute of the entity associated with the constituent, and weighting by the index construction manager device the constituents, based on at least one accounting data substantially independent of a market price of the constituents entities to obtain constituent weightings, wherein the constituent weightings are substantially independent of equal weighting, weighting in proportion to market price of the constituents, and weighting in proportion to market capitalization of the entity, wherein the at least one accounting data may include an objective measure of scale of the entity associated with the constituents, and wherein the objective measure of scale may include an objective measure of size of the entity associated with the constituents, wherein the at least one accounting data may include at least one of: gross revenue of the entity associated with the constituent, sales of the entity associated with the constituent, debt to equity adjusted sales of the entity associated with the constituent, earnings of the entity associated with the constituent, income of the entity associated with the constituent, earnings before interest and tax (EBIT) of the entity associated with the constituent, earnings before interest, taxes, depreciation and amortization (EBITDA) of the entity associated with the constituent, number of employees of the entity associated with the constituent, book value of the entity associated with the constituent, cumulative retained cashflow of the entity, assets of the entity associated with the constituent, liabilities of the entity associated with the constituent, net worth of the entity associated with the constituent, cashflow of the entity associated with the constituent, any dividends of the entity associated with the constituent, any distribution to constituent holders by the entity, any constituent buybacks by the entity, an attribute relating to employees of the entity associated with the constituent, an attribute relating to floor space of the entity associated with the constituent, an attribute relating to office space of the entity associated with the constituent, an attribute relating to location of the entity associated with the constituent, a demographic measure (DM) of the entity associated with the constituent, or a measure relating to a demographic attribute of the entity associated with the constituent.

In another exemplary embodiment, the computer readable medium may include the method where the ICM device-implemented method further may include: creating the financial index, and the at least one portfolio, by the index construction manager device, wherein the at least one accounting data may include at least one of: any dividends or ratios pertaining thereto.

In another exemplary embodiment, the medium may include where the another accounting data, electronically obtained by the index construction manager device, may include at least one of: any dividends or ratios pertaining thereto.

In another exemplary embodiment, the readable medium may include the method where the accounting data, obtained by the index construction manager device, may include at least one of: any dividends or ratios pertaining thereto.

In another exemplary embodiment, the computer readable medium may include the method where the accounting data, obtained by the index construction manager device, may include at least one of: any dividends or ratios pertaining thereto.

In another exemplary embodiment, an index construction manager (ICM) device-implemented method for constructing a stock market index, wherein the stock market index is based on accounting data, the method may include: creating by the index construction manager device may include at least one processor a stock market index, may include: selecting by the index construction manager device constituent stocks of the stock market index, based upon at least one accounting data regarding the entities associated with the stocks, wherein the selecting is substantially independent of a market price of the stock and market capitalization of the entities, wherein the at least one accounting data may include an objective measure of scale of the entity associated with the stock, and wherein the objective measure of scale may include an objective measure of size of the entity associated with the stock, wherein the at least one accounting data may include at least one of: gross revenue of the entity associated with the stock, sales of the entity associated with the stock, debt to equity adjusted sales of the entity associated with the constituent, earnings of the entity associated with the constituent, income of the entity associated with the stock, earnings before interest and tax (EBIT) of the entity associated with the stock, earnings before interest, taxes, depreciation and amortization (EBITDA) of the entity associated with the stock, number of employees of the entity associated with the stock, book value of the entity associated with the stock, cumulative retained cashflow of the entity, assets of the entity associated with the stock, liabilities of the entity associated with the stock, net worth of the entity associated with the stock, cashflow of the entity associated with the stock, any dividends of the entity associated with the stock, any distribution to constituent holders by the entity, any constituent buybacks by the entity, an attribute relating to employees of the entity associated with the stock, an attribute relating to floor space of the entity associated with the stock, an attribute relating to office space of the entity associated with the stock, an attribute relating to location of the entity associated with the stock, a demographic measure (DM) of the entity associated with the stock, or a measure relating to a demographic attribute of the entity associated with the stock, and weighting by the index construction manager device the constituent stocks, based upon at least one accounting data regarding the entities associated with the stocks to obtain constituent weightings, wherein the weighting is substantially independent of a market price of the stock entities, and wherein the weighting is not based on any of equal weighting, weighting in proportion to market price of the stock, or weighting in proportion to market capitalization of the entity, wherein the at least one accounting data may include an objective measure of scale of the entity associated with the stock, and wherein the objective measure of scale may include an objective measure of a size of the entity associated with the stock, wherein the at least one accounting data may include at least one of: gross revenue of the entity associated with the stock, sales of the entity associated with the stock, income of the entity associated with the stock, debt to equity adjusted sales of the entity associated with the constituent, earnings of the entity associated with the constituent, earnings before interest and tax (EBIT) of the entity associated with the stock, earnings before interest, taxes, depreciation and amortization (EBITDA) of the entity associated with the stock, number of employees of the entity associated with the stock, book value of the entity associated with the stock, cumulative retained cashflow of the entity, assets of the entity associated with the stock, liabilities of the entity associated with the stock, net worth of the entity associated with the stock, cashflow of the entity associated with the stock, any dividends of the entity associated with the stock, any distribution to constituent holders by the entity, any constituent buybacks by the entity, an attribute relating to employees of the entity associated with the stock, an attribute relating to floor space of the entity associated with the stock, an attribute relating to office space of the entity associated with the stock, an attribute relating to location of the entity associated with the stock, a demographic measure (DM) of the entity associated with the stock, or a measure relating to a demographic attribute of the entity associated with the stock.

In another exemplary embodiment, an index construction manager (ICM) device-implemented method for constructing a stock market index fund, by the index construction manager device, containing a portfolio of stocks based on a stock market index, the method may include: creating by the index construction manger device, may include at least one processor, a stock market index fund, including a portfolio of stocks based on the stock market index wherein the stock market index is created by: selecting by the index construction manger device constituent stocks of the stock market index, based upon at least one accounting data about the entities substantially independent of a market price of the stock and a market capitalization of the entities, wherein the at least one accounting data may include an objective measure of scale of the entity associated with the stock, and wherein the objective measure of scale may include an objective measure of size of the entity associated with the stock, wherein the at least one accounting data may include at least one of: gross revenue of the entity associated with the stock, sales of the entity associated with the stock, debt to equity adjusted sales of the entity associated with the stock, earnings of the entity associated with the stock, income of the entity associated with the stock, earnings before interest and tax (EBIT) of the entity associated with the stock, earnings before interest, taxes, depreciation and amortization (EBITDA) of the entity associated with the stock, number of employees of the entity associated with the stock, book value of the entity associated with the stock, cumulative retained cashflow of the entity, assets of the entity associated with the stock, liabilities of the entity associated with the stock, net worth of the entity associated with the stock, cashflow of the entity associated with the stock, any dividends of the entity associated with the stock, any distribution to stockholders by the stock, any stock buybacks by the stock, an attribute relating to employees of the entity associated with the stock, an attribute relating to floor space of the entity associated with the stock, an attribute relating to office space of the entity associated with the stock, an attribute relating to location of the entity associated with the stock, a demographic measure (DM) of the entity associated with the stock, or a measure relating to a demographic attribute of the entity associated with the stock, and weighting by the index construction manager device the constituent stocks of the stock market index based upon at least one accounting data regarding the entities whose stocks are in the stock market index, wherein the weighting is substantially independent of a market price of the stock entities, and wherein the weighting is substantially independent of equal weighting, weighting in proportion to market price of the stock, and weighting in proportion to market capitalization of the entity, wherein the at least one accounting data may include an objective measure of scale of the entity associated with the stock, and wherein the objective measure of scale may include an objective measure of size of the entity associated with the stock, wherein the at least one accounting data may include at least one of: gross revenue of the entity associated with the stock, sales of the entity associated with the stock, debt to equity adjusted sales of the entity associated with the stock, earnings of the entity associated with the stock, income of the entity associated with the stock, earnings before interest and tax (EBIT) of the entity associated with the stock, earnings before interest, taxes, depreciation and amortization (EBITDA) of the entity associated with the stock, number of employees of the entity associated with the stock, book value of the entity associated with the stock, cumulative retained cashflow of the entity, assets of the entity associated with the stock, liabilities of the entity associated with the stock, net worth of the entity associated with the stock, cashflow of the entity associated with the stock, any dividends of the entity associated with the stock, any distribution to stockholders by the stock, any stock buybacks by the stock, an attribute relating to employees of the entity associated with the stock, an attribute relating to floor space of the entity associated with the stock, an attribute relating to office space of the entity associated with the stock, an attribute relating to location of the entity associated with the stock, a demographic measure (DM) of the entity associated with the stock, or a measure relating to a demographic attribute of the entity associated with the stock.

In another exemplary embodiment, the computer implemented method may include the method where the stock market index fund is held by, or on behalf of, at least one investor.

In another exemplary embodiment, the computer implemented method may include the method where the selecting, by the index construction manager device, may include selecting based upon at least one of: a ratio of the accounting data; or a manipulation of the accounting data.

In another exemplary embodiment, the computer implemented method may include the method where the accounting data, electronically obtained by the index construction manager device, may include any generally accepted accounting data.

In another exemplary embodiment, the computer implemented method may include the method where the creating the stock market index, by the index construction manager device, may include selecting stocks from a set of entities having a publicly available periodic financial report.

In another exemplary embodiment, the computer implemented method may include the method where the set of entities is not substantially equivalent to any one of the S&P 500 Index, or the Dow Jones Industrial Average.

In another exemplary embodiment, the computer implemented method may include the method where the selecting may include: selecting, by the index construction manager device, a subset from the set, wherein the set may include at least one of substantially all of the entities having a publicly available periodic financial report, or a plurality of subsets of the set.

In another exemplary embodiment, the computer implemented method may include the method where the stocks include U.S. stocks.

In another exemplary embodiment, the computer implemented method may include the method where the accounting data includes data, electronically obtained by the index construction manager device, the data found within a standard U.S. generally accepted accounting principles (GAAP) entity annual report and accounts (GAAP reports).

BRIEF DESCRIPTION OF THE DRAWINGS

The foregoing and other features and advantages of the invention will be apparent from the following, more particular description of exemplary embodiments of the invention, as illustrated in the accompanying drawings. In the drawings, like reference numbers generally indicate identical, functionally similar, and/or structurally similar elements. The drawing in which an element first appears is indicated by the leftmost digits in the corresponding reference number. A preferred exemplary embodiment is discussed below in the detailed description of the following drawings.

DETAILED DESCRIPTION OF EXEMPLARY EMBODIMENTS OF THE PRESENT INVENTION

Various exemplary embodiments of the invention are discussed in detail below including a preferred embodiment. While specific implementations are discussed, it should be understood that this is done for illustration purposes only. A person skilled in the relevant art can recognize that other components and configurations may be used without parting from the spirit and scope of the invention.

Figure 1:
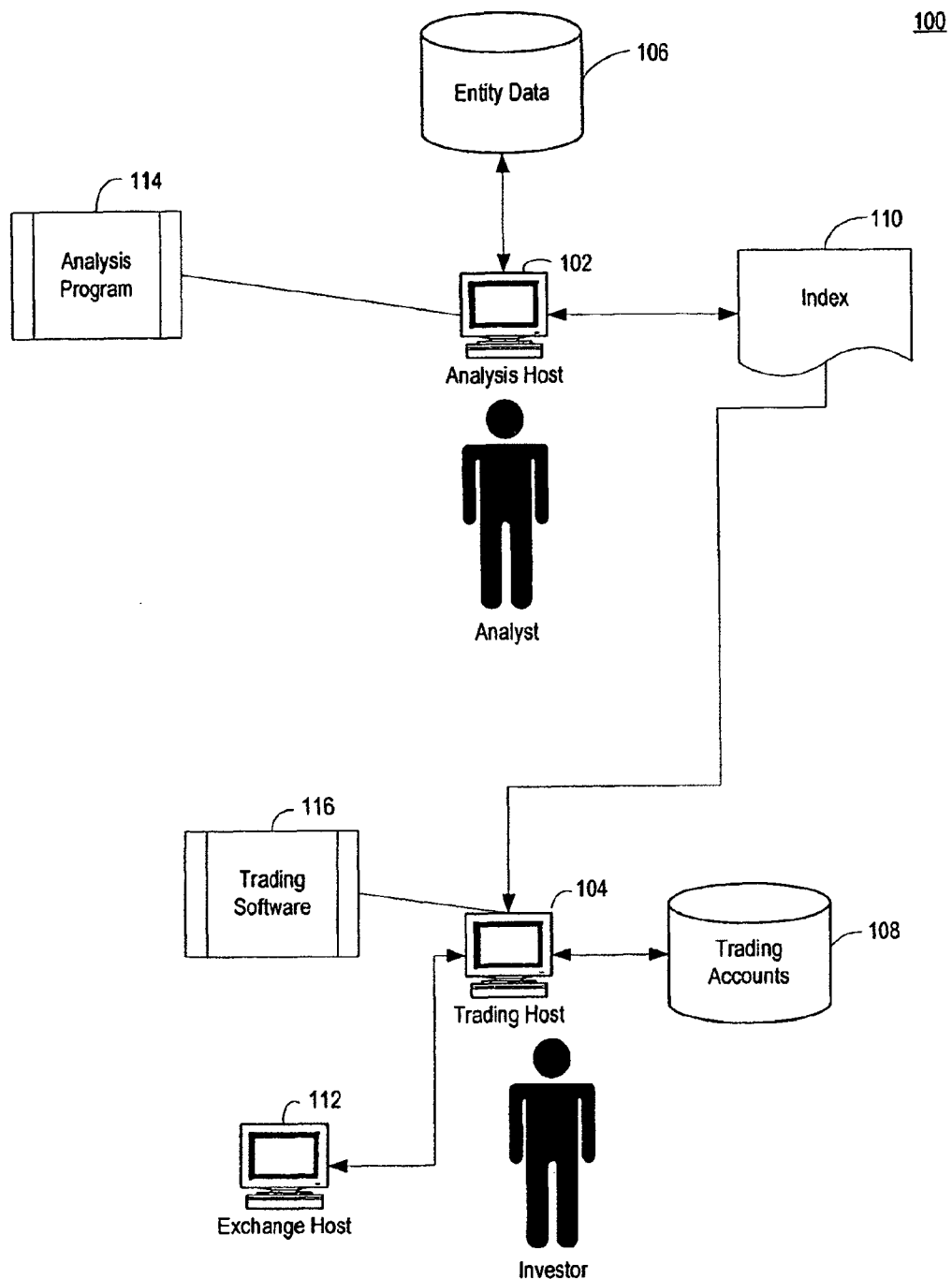
FIG. 1 is a deployment diagram of an index generation and use process in accordance with an exemplary embodiment of the present invention.

FIG. 1 depicts an exemplary deployment diagram of an index generation and use process in accordance with an exemplary embodiment of the present invention. According to the exemplary embodiment, an analyst may use a computer system to generate an index. The analyst may do so by using analysis software to examine data about entities offering different kinds of securities that may be traded by investors. An example of an entity that may be offering securities may be a publicly held company whose shares trade on an exchange.

However, the present invention also applies to any entity that may have any type of security that may be traded where information about the entity and/or its security is available (or capable of being made available) for analysis.

In an exemplary embodiment, once an index has been generated by an analyst using the entity date, the index may be used to build investment portfolios. An investor, advisor, manager or broker may then manage the purchased securities as a mutual fund for a plurality of individual and institutional investors. Alternatively, the purchased securities may be managed for one or more investors. In the latter case, securities may be purchased based on the index for inclusion in an individual or an institutional investor's portfolio.

Figure 2:
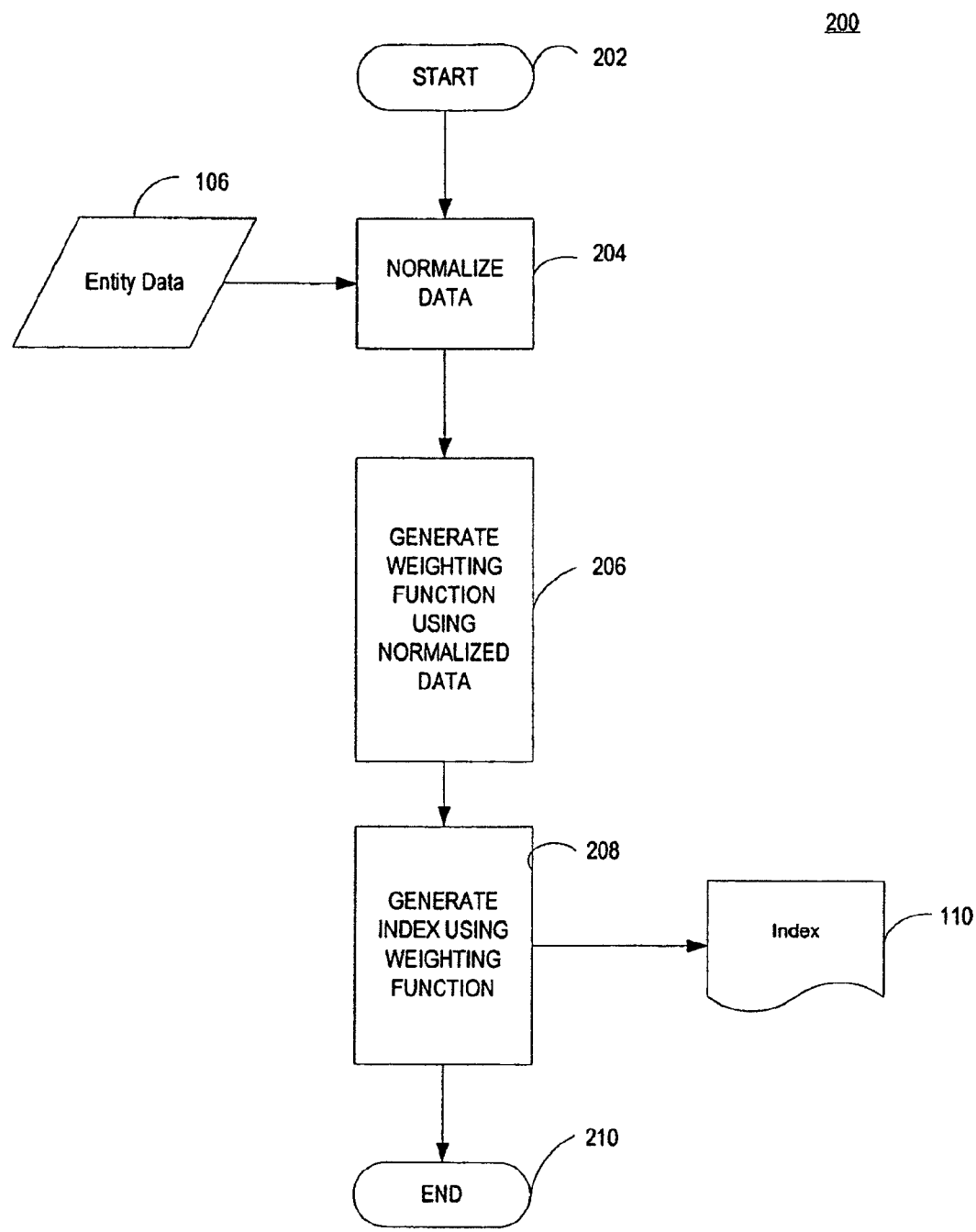
FIG. 2 is a process flow diagram of an index generation process in accordance with an exemplary embodiment of the present invention.

FIG. 2 depicts an exemplary process flow diagram of an index generation process in accordance with an exemplary embodiment of the present invention. In an exemplary embodiment, to generate an index, an analyst using analysis software may access entity data about various entities that have securities that are traded. For example, publicly traded companies must disclose information about certain financial aspects of their operations. This information may be aggregated for a plurality of entities. Market sectors and corresponding indices may then be identified and generated using the aggregate data.

In slightly more detail, an index may be generated by normalizing entity data for a particular non-market capitalization metric. The normalized entity data may be used to generate a weighting function describing the contribution of each entity to a business sector as defined by the metric, in an exemplary embodiment. An index may be generated using the weighting function. Once an index is generated, according to an exemplary embodiment, the index may be used to track the business sector defined by the metric or to create a portfolio of securities offered by the entities whose information was used to generate the index.

For example, in an exemplary embodiment of the invention a method of constructing a non-capitalization weighted portfolio of assets may include, e.g., gathering data about various assets; selecting a group of assets to create the index of assets; and weighting each of the group of assets selected in the index based on an objective measure of scale of each member of the group of assets, where the weighting may include weighting all or a subset of the group of assets, and weighting based on other than market capitalization, equal weighting, or share price weighting.

In one exemplary embodiment, the weighting of each member of the group of assets, may include weighting assets of any of various types. Examples of various types of assets may include, e.g., but not limited to, a stock type; a commodity type; a futures contract type; a bond type; a mutual fund type; a hedge fund type; a fund of funds type; an exchange traded fund (ETF) type; and a derivative type assets. The weighting may also include, e.g., but not limited to, a negative weighting on any of the various types of assets.

According to exemplary embodiments of the present invention, the index may be weighted based on an objective measure of scale, where the objective measure of scale may include a measure relating to an underlying asset itself. The asset may include a municipality, a municipality issuing bonds, or a commodity. An objective measure of scale associated with the asset may include any combination of: revenue, profitability, sales, total sales, foreign sales, domestic sales, net sales, gross sales, profit margin, operating margin, retained earnings, earnings per share, book value, book value adjusted for inflation, book value adjusted for replacement cost, book value adjusted for liquidation value, dividends, assets, tangible assets, intangible assets, fixed assets, property, plant, equipment, goodwill, replacement value of assets, liquidation value of assets, liabilities, long term liabilities, short term liabilities, net worth, research and development expense, accounts receivable, earnings before interest, taxes, dividends, and amortization (EBITDA), accounts payable, cost of goods sold (CGS), debt ratio, budget, capital budget, cash budget, direct labor budget, factory overhead budget, operating budget, sales budget, inventory method, type of stock offered, liquidity, book income, tax income, capitalization of earnings, capitalization of goodwill, capitalization of interest, capitalization of revenue, capital spending, cash, compensation, employee turnover, overhead costs, credit rating, growth rate, tax rate, liquidation value of company, capitalization of cash, capitalization of earnings, capitalization of revenue, cash flow, and/or future value of expected cash flow.

Ratios too may be used. In an exemplary embodiment, the weighting of assets in the index based on objective measures of scale, may include a ratio of any combination of the objective measures of scale of the asset other than ratios based on weighting the assets based on market capitalization, equal weighting, or share-price weighting. For example, the ratio of any combination of the objective measures of scale may include, e.g., but not limited to, current ratio, debt ratio, overhead expense as a percent of sales, or debt service burden ratio.

In an exemplary embodiment, the portfolio of assets may include, e.g., but not limited to, one or more of, a fund; a mutual fund; a fund of funds; an asset account; an exchange traded fund (ETF); a separate account, a pooled trust; or a limited partnership.

In an exemplary embodiment, a measure of company size may include one of, or a combination of one or more of gross revenue, sales, income, earnings before interest and tax (EBIT), earnings before interest, taxes, depreciation and amortization (EBITDA), number of employees, book value, assets, liabilities, or net worth.

In one exemplary embodiment, the measure of company size may include a demographic measure of the asset. The demographic measure of the asset may include, e.g., one of, or any combination of one or more of a non-financial metric, a non-market related metric, a number of employees, floor space, office space, or other demographics of the asset.

In an exemplary embodiment, weighting may be based on the objective measure of scale, where the measure may include a geographic metric. The geographic metric in an exemplary embodiment may include a geographic metric other than gross domestic product (GDP) weighting.

Figure 3:
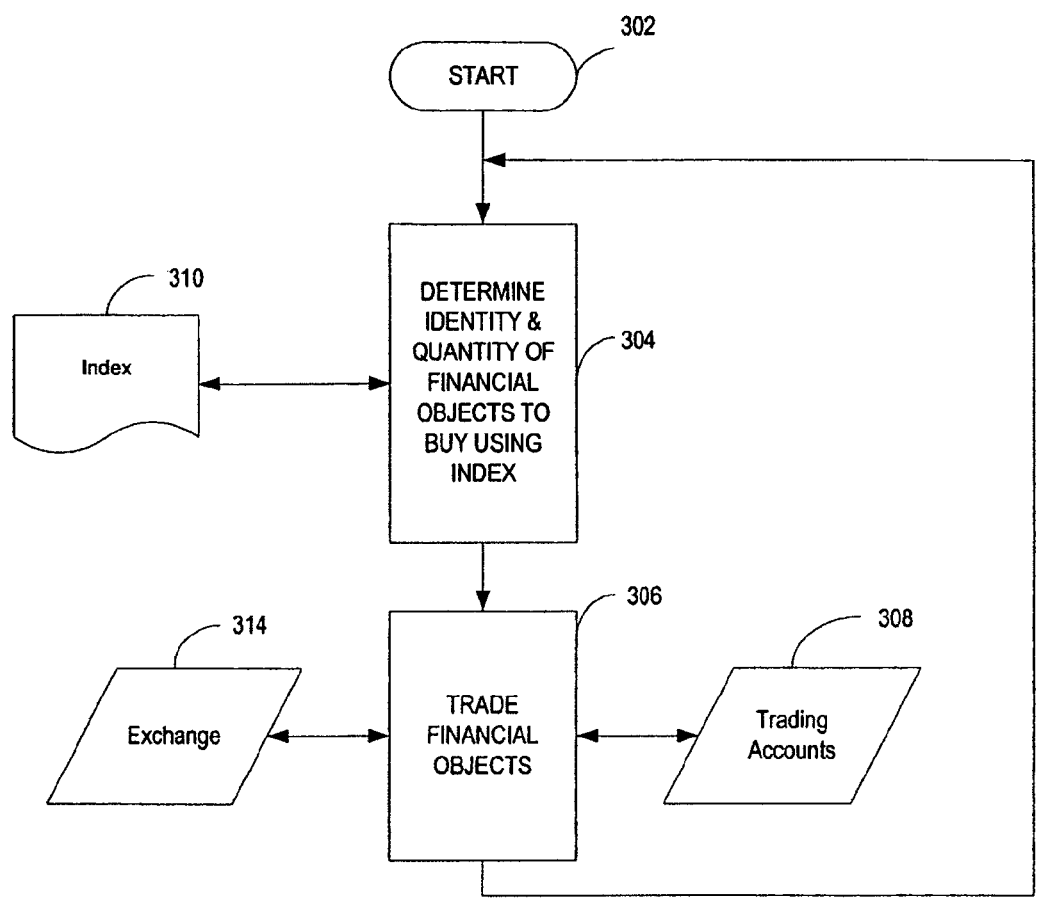
FIG. 3 is a process flow diagram of an index use process in accordance with an exemplary embodiment of the present invention.

FIG. 3 depicts an exemplary process flow diagram of an index use process in accordance with an exemplary embodiment of the present invention. An index may be received from an index generation process and may be used to determine the identity and quantity of securities to purchase for a portfolio, according to an exemplary embodiment. The securities may be purchased from an exchange or other market and may be held on account for an investor or group of investors. The index may be updated on, e.g., but not limited to, a periodic basis and may be used as a basis to rebalance the portfolio, according to an exemplary embodiment. According to another exemplary embodiment, the portfolio can be rebalanced when, e.g., a pre-determined threshold is reached. In this way, a portfolio may be created and maintained based on a non-market capitalization index.

Rebalancing can be based on assets reaching a threshold condition or value. For example, but not limited to, rebalancing may occur upon reaching a threshold such as, e.g., 'when the portfolio of assets increases in market value by 20%,' or 'when the assets on a sub-category within the portfolio exceed 32% of the size of the portfolio,' or 'when a U.S. President is elected from a different party than the incumbent,' etc.

The present invention, in an exemplary embodiment may be used the non-market capitalization weighted portfolio may be used for investment management, or investment portfolio benchmarking.

An exemplary embodiment of the invention may be implemented on a computing device(s), processor(s), computer(s) and/or communications device(s).

The computer, in an exemplary embodiment, may comprise one or more central processing units (CPUs) or processors, which may be coupled to a bus. The processor may, e.g., access main memory with bus. The computer may be coupled to an input/output (I/O) subsystem such as, e.g., but not limited to, a network interface card (NIC), or a modem for access to a network. The computer may also be coupled to a secondary memory directly via bus, or via a main memory, for example. Secondary memory may include, e.g., but not limited to, a disk storage unit or other storage medium. Exemplary disk storage units may include, but are not limited to, a magnetic storage device such as, e.g., a hard disk, an optical storage device such as, e.g., a write once read many (WORM) drive, or a compact disc (CD), or a magneto optical device. Another type of secondary memory may include a removable disk storage device, which may be used in conjunction with a removable storage medium, such as, e.g. a CD-ROM, or a floppy diskette. In general, the disk storage unit may store an application program for operating the computer system referred to commonly as an operating system. The disk storage unit may also store documents of a database (not shown). The computer may interact with the I/O subsystems and disk storage unit via bus. The bus may also be coupled to a display for output, and input devices such as, but not limited to, a keyboard and a mouse or other pointing/selection device.

In this document, the terms "computer program medium" and "computer readable medium" may be used to generally refer to media such as, e.g., but not limited to removable storage drive, a hard disk installed in hard disk drive, and signals, etc. These computer program products may provide software to computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Another Exemplary Embodiment of the Present Invention is a Fundamental Stock Market Index and Index Fund or Funds.

This embodiment utilizes a new series of fundamental stock market indices in which the index weightings are determined by company fundamentals such as: the relative size of a company's profits, or its pre exceptional profits, or sales, or return on investment or any fundamental accounting item, or ratio, may help to address some of the issues raised above. An index that determines its weightings based on company fundamentals, rather than the share price, or market capitalization, has a stabilizing element within it that can help to remove excess volatility generated by indices constructed on the basis of price or market capitalization alone. Over the medium to longer term, such fundamentally based indices have the potential to outperform price or market capitalization-based indices, and may do so with less volatility.

The inventive method creates a new class of stock market indices and index funds that may be implemented on, but not limited to, a computing device or a processor, or as a computer software or hardware, or as an algorithm. This new class of stock market indices bases its weightings on the fundamentals of the companies that make up that index. One possible version of a fundamentally based stock market index would be an index that is based on the relative size of a sample of the companies' pre exceptional profits. If the chosen sample of companies was determined to be one hundred and the fundamental criteria that the index manager decided to use was to be 'largest pre exceptional profits,' then the index may contain the one hundred largest companies as defined by the size of their pre exceptional profits. As an example, if the total pre exceptional profits of the largest one hundred companies, as measured by their pre exceptional profits, was 100 pounds in a defined time period (such as a quarter or year) and in the same time period the pre exceptional profits of theoretical company 'A' were 2 pounds, then theoretical company A would be allocated a 2% weighting in the fundamental index.

If theoretical company B had pre exceptional profits of 1.5 pounds in over the same time period then it would have a weighting of 1.5% in the fundamental index.

The index weightings are managed based on how the fundamentals of the companies within, or outside, the chosen index sample change. As an example, the index manager could choose to rebalance the weightings either quarterly, as company pre exceptional profits change, or on an annual basis and enter their choice into a computing device. If, for instance, by the time of the next rebalancing period the total pre exceptional profits of the largest one hundred companies, as measured by their pre exceptional profits, had grown to 120 pounds, and theoretical company A now had pre exceptional profits of 1.2 pounds, the computing device would calculate the weighting of company in the fundamental index down to 1% from 2% in the previous period. Creating such fundamental indices gives an investor the opportunity to follow, or invest, passively in an index which is anchored to the economic realities of the companies within it. This new fundamental index construction technique by a computing device produces an index and related index fund products with increased stability and with increased economically rational as compared with known methods of investing.

In one exemplary embodiment, a computing device creates a fundamental stock market index by using any of the fundamental data points regarding a company or a group of companies that can be found in a company's annual report and accounts. In one exemplary embodiment, the computing device creates an index of companies based on the relative size of the companies sales, assets, profits, cash flow or the shareholders equity. In addition, the computing device can also create the fundamental index by using a ratio of any of the data concerning a company or group of companies that is contained in a company report and accounts. In one exemplary embodiment, this could include the relative size of the return on assets of a selection of companies, their return on investment, or their return on capital compared to their cost of capital.

Once the index manager has decided and entered which fundamental criteria to use and how many constituents the manager decides that he or she wants to include in the index, the computing device creates the index in the following way. If, for example, the index manager decides to construct a fundamental stock market index of one hundred constituent members and decides to use pre exceptional profit as the chosen fundamental criteria, the computing device creates the index as follows. First, the computing device performs a search to find which are the largest one hundred listed companies as defined by the size of their pre exceptional profits. Once the computing device has identified this information, the computing device is ready to construct the index. Companies are accorded index weightings based on the relative size of their pre exceptional profits. If the combined pre exceptional profits of the one hundred companies is 100 pounds and theoretical company A has pre exceptional profits of 2 pounds, then it would have an index weighting of 2%. Once the one hundred companies had been accorded their weightings, the computing device begins to calculate future index performance as the share prices of the different companies in the index changes from day to day. This may be achieved by assuming a starting value for the index, or index portfolio, and then calculating how each of the index constituents performs going forward.

The computing device may then rebalance the index weightings as the fundamental data points change over time as desired by the investor. For instance, if at the end of the next company reporting season the combined pre exceptional profits of the one hundred largest companies had grown from 100 pounds to 120 pounds and the pre exceptional profits of theoretical company A had declined from 2 pounds to 1.2 pounds, the computing device determines its weighting in the index would decline from 2% in the prior period to 1% in the current period. Also, some of the original companies in the first one hundred may be eliminated from the index if their pre exceptional profits fall below a certain level while new companies that were not in the original sample may be included. The computing device, under the direction of an investor, may choose to rebalance the weightings in the index either as individual companies report their pre exceptional profits on a quarterly basis, or wait until the majority of companies have reported their pre exceptional profits and then adjust them all at once. Also, the computing device, under the direction of an investor, could choose to determine the weightings based on either the total nominal amount of pre exceptional profit each quarter or on a cumulative rolling basis.

Constructing a stock market index using fundamental company accounts data or a ratio, or manipulation of that data provides a series of genuine alternatives for investors who want to invest in a passive style while focusing on fundamentals that they believe are important. For instance, an investor may always want to own an index of U.S. or foreign equities that are the largest five hundred companies as measured by sales, or by profits, or by growth in sales, or by return on investment, or any fundamental company accounts data or ratio of that data.

Long-Short Equity Strategies

An exemplary embodiment of the present invention may take long and short positions based on an extent to which accounting data based indexation suggests that equities are under or over valued.

Figure 4:
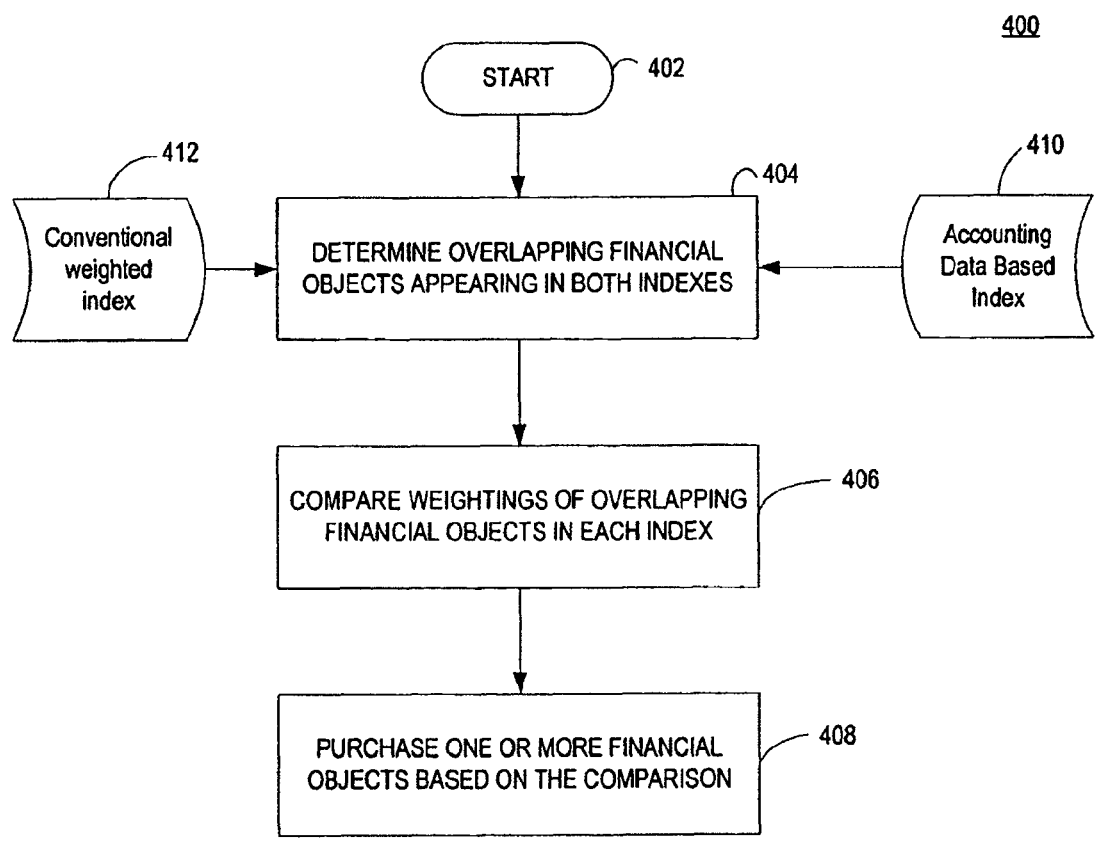
FIG. 4 illustrates an exemplary process flow diagram 400 of a method of creating a portfolio of financial objects according to an embodiment of the present invention.

FIG. 4 illustrates an exemplary process flow diagram 400 of a method of creating a portfolio of financial objects according to an embodiment of the present invention. In block 402 the process starts. In block 404, a determination is made of overlapping financial objects that appear in both an accounting data based index (ADBI) 410 and a conventional weighted index 412. In block 406, the weightings of the overlapping financial objects in the ADBI are compared with the weightings of the overlapping financial objects in the conventionally weighted index. Then, in block 408, one or more of the overlapping financial object may be purchased based on the result of the comparison.

In the alternative, exemplary embodiments of the present invention may determine non-overlapping financial objects appearing in only one of either an accounting data based index (ADBI) or a conventional weighted index by comparing financial objects in an ADBI with financial objects in a conventionally weighted index. Non-overlapping financial objects appearing only in the ADBI may be weighted by accounting data based weighting. Non-overlapping financial objects appearing only in the conventionally weighted index may be weighted by the conventional weighting. Financial objects may then be purchased based on the resulting weightings.

In an exemplary embodiment, an index of the largest 1,000 U.S. equities, weighted by accounting data, may overlap an index of the largest 1,000 U.S. capitalization-weighted companies by approximately 80%. The 20% of non-overlapping companies may drive the 2.0% increase in return of an accounting data based index such as, e.g., but not limited to, RESEARCH AFFILIATES FUNDAMENTAL INDEX™ (RAFI™) available from Research Affiliates, LLC of Pasadena, Calif., versus a cap-weighted index. A long-short strategy according to an exemplary embodiment is designed to leverage this 20% of companies that do not overlap, and may capture the expected alpha from the accounting data based indexation. An exemplary long-short U.S. equity strategy may be approximately beta and dollar neutral and can replace or complement market neutral or long-short strategies, or as part of a portfolio's alternative strategies bucket.

Accounting data based indexation may use economic measures of company size in constructing indexes. Using accounting data based economic measures of firm size may create an index that is indifferent to price. Accounting data based indexes may avoid flaws inherent in capitalization (price)-weighted indexes. Capitalization-weighted indexes naturally overweight overvalued stocks and underweight undervalued stocks. Accounting data based indexes may more accurately estimate a true fair value of a company, allowing the weight of a company's stock in the index to rise or fall only to the extent that the underlying economic value of the issuing company may rise or fall.

ADBI Portfolio Construction

Figure 5:
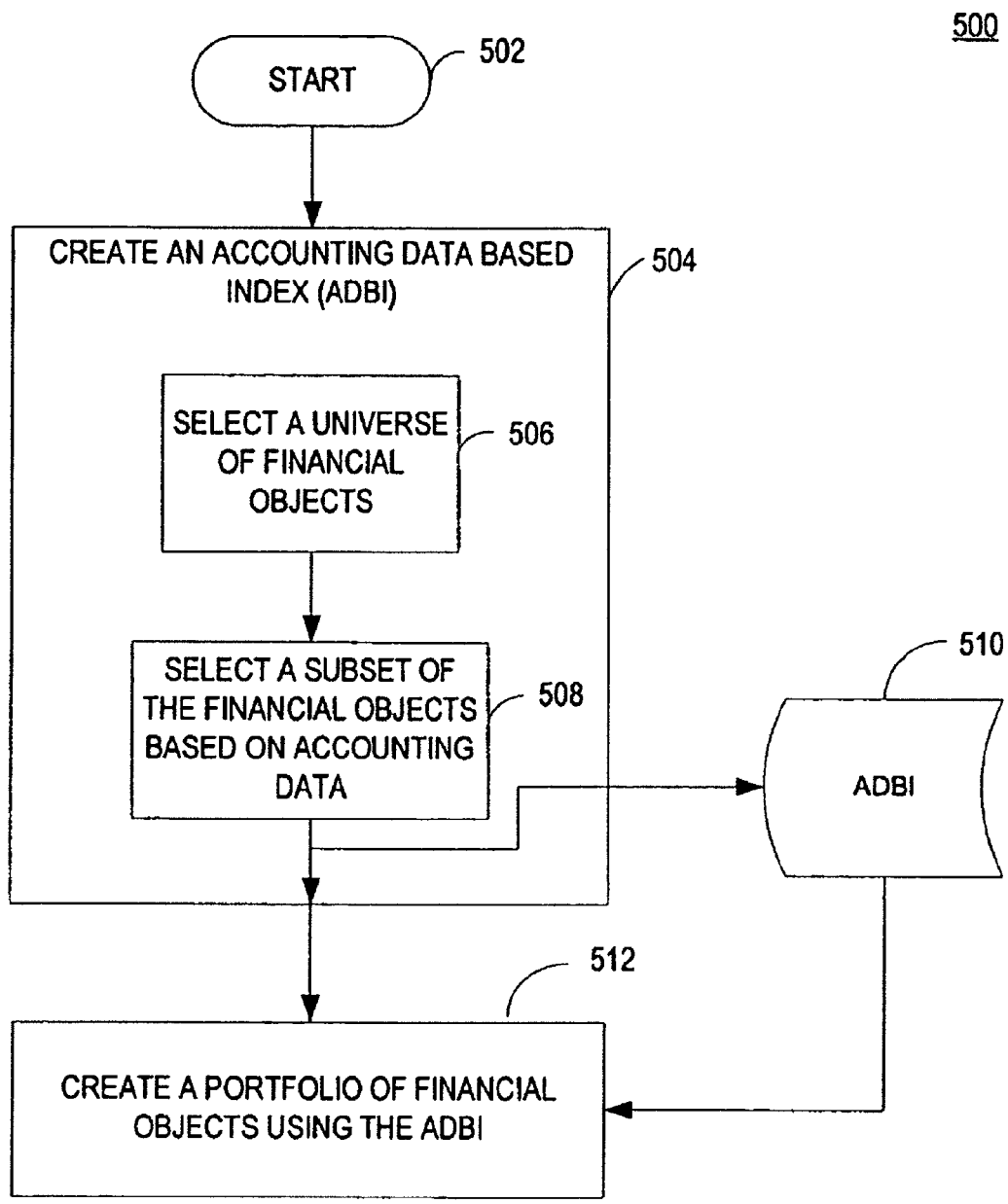
FIG. 5 illustrates an exemplary flow process diagram 500 of a method of constructing an ADBI and a portfolio of financial objects using the ADBI.

FIG. 5 illustrates an exemplary flow process diagram 500 of a method of constructing an ADBI and a portfolio of financial objects using the ADBI, starting at block 502. In block 504, the ADBI 510 is created. Creating the ADBI may include, in block 506, selecting a universe of financial objects, and, in block 508, selecting a subset of the universe based on the accounting data to obtain the ADBI 510. Then, in block 512, a portfolio of financial objects is created using the ADBI 510, including weighting the financial objects in the portfolio according to a measure of value of a company associated with each financial object in the portfolio.

To construct an exemplary accounting data based index (ADBI), such as, e.g., but not limited to, the RESEARCH AFFILIATES FUNDAMENTAL INDEX™ (RAFI™), some number of financial objects, e.g., 1000 US equities, may be selected and/or weighted based on the following four accounting data based measures of firm size: book equity value, free cash flow, sales, and gross dividends.

An exemplary embodiment of an accounting data based index such as, e.g., but not limited to, the RAFI™ index may first weight all US equities by each of the four accounting data based measures of firm size detailed above. According to an exemplary embodiment, an optimal relative weighting between the four factors may differ by geography of the stock market from which the equities are selected such as, e.g., an equal weighting may be optimal in one country or industry sector, while a different relative weighting between the factors may make sense in another country or industry sector. The index may then compute an overall weight for each holding by equally-weighting each of the four accounting data based measure of firm size according to an exemplary embodiment. For example, assume that a company has the following weights: 2.8% of total US book values, 2% of total US cash flow, 3% of total US sales, and 2.2% of total US dividends.

Equally-weighting these four accounting data based measures of firm size (i.e., book value, cashflow, sales and dividends) may produce a weight of 2.5%. According to an exemplary embodiment, for companies that have never paid dividends, one may exclude dividends from the calculation of the company's accounting data based weight. Finally, in an exemplary embodiment, the 1000 equities with the highest accounting data based weights may be selected and may be assigned a weight in the RAFI™ portfolio equal to its accounting data based weight.

According to another exemplary embodiment, an accounting data based index such as, e.g., but not limited to, RAFI™ may be constructed using aggregate (not per-share) measures of firm size. For example, RAFI™ may use total firm cash flow instead of cash flow per share and total book value instead of book value per share in its construction.

In an exemplary embodiment, the accounting data may include the following four factors, book value, sales/revenue, cash flow and dividends. In another exemplary embodiment, only one or more of these factors may be used. In another exemplary embodiment, additional factors may be used, such as, e.g., any other accounting data. In one exemplary embodiment, the weightings of each of these factors may be equal relative to one another, i.e., 25% of each of book value, sales/revenue, cash flow and dividends. In one exemplary embodiment, if there are no dividends, then the other three factors may be weighted in equal parts, i.e., 33% each to book value, sales/revenue, and cash flow. In another exemplary embodiment, dividends may be weighted in a greater part such as, e.g., but not limited to, weighting dividends at 50% and book value, sales/revenue, and cash flow at ⅙th each, etc. In one exemplary embodiment, weightings may be the same, depending on the country or sovereign of origin or the industry sector of the stock or other financial object. In another exemplary embodiment, weightings may vary depending on the country or sovereign of origin or the industry sector of the stock or other financial object. In another exemplary embodiment, weightings may vary based on other factors, such as, e.g., but not limited to, types of assets, industry sectors, geographic sectors, sizes of companies, profitability of companies, amount of revenue generated by the company, etc.

An accounting data based index may be available in several varieties to meet the unique needs of different classes of retail and institutional investors, including, e.g., but not limited to, as enhanced portfolios, Exchange Traded Funds (ETFs), open-end mutual funds, tax managed portfolios, a collection of financial objects managed collectively but tracked separately, and closed-end mutual funds. Various US and international investment managers may offer, e.g., but not limited to, a suite of products.

A limited partnership or other fund or account investing in assets based on an Accounting Data Based Index, such as, e.g., Research Affiliates Fundamental Index, L.P. (RAFI LP) may increase the alpha generated by accounting data based indexation in the US through improvements or enhancements, including, e.g., but not limited to, monthly cash rebalancing and quality of earnings and corporate governance screens. The additional enhancements available through the LP may be expected to add an additional 40-70 bps of annual outperformance above the 200 basis points (bps) of annual out performance that may be achieved through the use of accounting data based indexing in portfolio construction.

A limited partnership or other fund or account investing in assets based on an ADBI international LP such as, RAFI International LP (RAFI™-I may apply accounting data based indexation to the international equity space in an exemplary embodiment to create an enhanced portfolio of, e.g., but not limited to 1000 international (ex-US) equities. RAFI-I may be expected to outperform capitalization weighted indexes by approximately 250 bps per year. Like the other RA Fundamental Index LP's, RAFI-I is an enhanced portfolio that may use monthly cash rebalancing and quality of earnings and corporate governance screens to improve upon the performance of the RAFI International index.

Open-end mutual funds may manage financial objects employing a fixed income strategy and portable alpha using the Accounting Data Based Index (ADBI) according to an exemplary embodiment.

An Exchange Traded Fund (ETF) of the ADBI such as, e.g., but not limited to, POWERSHARES FTSE RAFI US 1000

Portfolio ETF (ticker symbol: PRF) may meet needs of retail and institutional investors interested in a low-cost means of accessing the power of accounting data based indexing in another exemplary embodiment.

Another exemplary embodiment includes a closed-end fund implementing accounting data based indexing such as, e.g., Canadian Fundamental Income 100, a closed-end mutual fund of the largest 100 accounting data based equities in Canada which attracted investments from retail and institutional investors in 2005, one of the most difficult closed end markets in recent history, demonstrating the strength of the accounting data based indexation strategy.

Accounting Data Based Indexation Long-Short (ADBI-LS)

Accounting data based indexation long-short (ADBI-LS) such as, e.g., but not limited to, RAFI-LS, is a long-short U.S. equity strategy that leverages ADBI such as RAFI™ innovation. The RAFI U.S. 1000 portfolio is designed to outperform the Russell 1000 (and the S&P 500) by about 200 bps per annum. By going long in stocks that have greater weight in the RAFI U.S. 1000 portfolio relative to the Russell 1000 and short in the stocks that are underweight in the RAFI U.S. 1000 relative to the Russell 1000, the RAFI-LS strategy captures the RAFI alpha process and enhances that alpha source.

ADBI-LS such as, e.g., RAFI-LS according to an exemplary embodiment, is designed to be roughly dollar and beta neutral, but not sector neutral. The sector bet can be significant if the ADBI strategy determines that a sector is substantially overvalued.

In general the overlap between ADBI RAFI U.S. 1000 and capitalization based index Russell 1000 may be about 75%. This may give 25% weights for the long portfolio and 25% weights for the short portfolio. The portfolio may be applied to 300% long and 300% short, which may magnify the RAFI alpha and the portfolio volatility. Leverage may be applied tactically, and can range from about 200% long/short to about 400% long/short according to exemplary embodiments.

ADBI-LS such as, e.g., RAFI-LS according to an exemplary embodiment may be designed to achieve an annual volatility of 15-25%. Volatility of the exemplary RAFI-LS, since inception, has been about 15%.

According to an exemplary embodiment, ADBI-LS, such as, e.g., RAFI-LS may use leverage in both its short and long positions. On average, $100 invested in RAFI-LS may result in a $300 notional long position and a $300 notional short position.

Implementation of an ADBI-LS's Long and Short Positions

According to an exemplary embodiment, one does not necessarily directly need to hold long or short positions in the underlying stocks, nor does it need to access a direct line of credit for the portfolio leverage. Instead, according to an exemplary embodiment, derivatives, such as a total return swaps may be used to implement the long and short positions. It may be possible to achieve minimal counterparty default risk exposure by entering into swaps with large Wall Street firms in an exemplary embodiment. Investors in an ADBI-LS may not be physically shorting any U.S. equities; rather, investors may merely hold OTC derivative contracts. This may provide both tax benefits and efficiency in investment logistics.

ADBI-LP such as, e.g., RAFI-LP™, may be a full-market ADBI. ADBI-LS such as, e.g., RAFI-LS™, may be a fund that uses the differences between company weights in ADBI such as, e.g., RAFI™ and in a capitalization-weighted index to establish long and short positions according to an exemplary embodiment.

ADBI-LS may be designed to be dollar neutral and equity beta neutral in an exemplary embodiment. Therefore, one may expect ADBI-LS returns to be largely uncorrelated with the equity market return in an exemplary embodiment. However, ADBI may not be market neutral in the traditional sense as it is not industry sector neutral in an exemplary embodiment.

ADBI-LS does not pair positions, and thus is different from traditional equity long-short strategies whereby e.g., but not limited to, a short General Motors (GM) position is paired with a long Ford position. Instead, ADBI-LS may acquire both long and short positions based on the relative difference between the ADB Index such as, e.g., FUNDAMENTAL INDEX™ weights and those of a cap-weighted index, such as, e.g., but not limited to the Russell 1000.

An exemplary embodiment of ADBI-LS may rebalance periodically and/or aperiodically. For example, on average, the ADBI-LS, such as, e.g., RAFI-LS portfolio may hold its long-short bets for about one year. The cash flow from new capital contributed to the strategy may be used to rebalance the portfolio to create new or alter existing long-short bets according to an exemplary embodiment.

In an exemplary embodiment, the present invention may be a method of constructing a portfolio of financial objects, may include: purchasing a portfolio of a plurality of mimicking financial objects to obtain and/or create a mimicking portfolio, wherein performance of the portfolio of mimicking financial objects substantially mirrors the performance of the accounting data based index based portfolio without substantially replicating the accounting data based index based portfolio. The method may further obtain and/or use a risk model for the portfolio where the risk model minors a risk model of the accounting data based index. The risk model may be substantially similar to the Fama-French factors, wherein the Fama-French factors may comprise at least one of size effect (e.g., where small cap beats large cap), value effect (e.g., where high B/P beats low B/P), and/or momentum effect (e.g. where strong momentum beats weak momentum in very long run, e.g. 10 or more years). The performance of the portfolio of mimicking financial objects may substantially mirror the performance of the accounting data based index based portfolio without substantially replicating financial objects and/ or weightings in the accounting data based index based portfolio.

In another exemplary embodiment, the present invention may include purchasing a plurality of financial objects according to weightings substantially similar to the weightings of an accounting data based index (ADBI), where performance of the financial objects substantially minors the performance of the ADBI without using substantially the same financial objects in the ADBI.

Exemplary Sector ADBI Indexes

According to one exemplary embodiment, a universe may be selected where the universe includes one or more sectors, and the weightings may be based on one or more sector metrics or measures. A non-exclusive list of exemplary sectors is shown in Table 1, which is based on North American Industry Classification System (NAICS) sectors. A non-exclusive list of industry sector metrics that be used in selecting and/or weighting, for example, financial objects, is shown in Table 2.

TABLE 1

Exemplary List of Sectors (based on NAICS sectors)

Agriculture, Forestry, Fishing and Hunting
Mining
Utilities

TABLE 1-continued

Exemplary List of Sectors (based on NAICS sectors)

Construction
Manufacturing
Wholesale Trade
Retail Trade
Transportation and Warehousing
Information
Finance and Insurance
Real Estate and Rental and Leasing
Professional, Scientific, and Technical Services
Management of Companies and Enterprises
Administrative and Support and Waste Management and
Remediation Services
Education Services
Health Care and Social Assistance
Arts, Entertainment, and Recreation
Accommodation and Food Services
Other Services (except Public Administration)
Public Administration is the FTSE® RAFI® Developed ex US Mid Small 1500 Index, available from PowerShares Global Exchange Traded Fund Trust of Houston, Tex. A brief, non-exhaustive list of exemplary sectors is provided in Table 3.

An exemplary process for construction of the aforementioned FTSE® RAFI® Developed ex US Mid Small 1500 Index may include the following. First, the securities universe of companies of the index may be calculated, based on any exemplary objective metrics. The exemplary objective metrics may include, for example: (i) the percentage representation of each security using only sales figures; (ii) the percentage representation of each security using cash flow figures; (iii) the percentage representation of each security using book value; and/or (iv) the percentage representation of each security using dividends. (A security that has not paid a dividend in the past five years will have a percentage representation of zero.)

Next, the securities may be ranked, for example in order based on the fundamental value. For example, the securities

TABLE 2

Exemplary List of Sector Metrics

| | | |
|---|---|---|
| Industry growth rate | Total capital expenditures | Inventories total - end of year |
| Average industry dividends | Supplemental labor costs | Inventories finished products - end of year |
| New orders for manufactured goods | Fuel costs | Inventories work in process - end of year |
| Shipments | Electric energy used | Inventories materials supplies fuels, etc - end of year |
| Unfilled orders | Inventories by stage of fabrication | Value of manufacturers inventories by stage of fabrication - beginning of year |
| Inventories | Number of production workers | Inventories total - beginning of year |
| Inventories-to-shipments ratio | Payroll of production workers | Inventories finished products - beginning of year |
| Value of product shipments | Hours of production workers | Inventories work in process - beginning of year |
| Statistics from department of commerce, industry associations, for industry groups and industries | Cost of purchased fuels and electric energy | Inventories materials supplies fuels, etc - beginning of year |
| Geographic area statistics | Electric energy quantity purchased | Value of shipments - total |
| Annual survey of manufacturers (ASM) | Electric energy cost | Value of shipments - products |
| Employment | Electric energy generated | Value of shipments - total miscellaneous receipts |
| All employees payroll | Electric energy sold or transferred | total miscellaneous receipts - Value of resales |
| All employees hours | Cost of purchased fuels | total miscellaneous receipts - contract receipts |
| All employees total compensation | Capital expenditure for plant and equipment total | Other total miscellaneous receipts |
| All employees total fringe benefit costs | Capital expenditure for plant and equipment - buildings and other structures | Interplant transfers |
| Total cost of materials | Capital expenditure for plant and equipment - machinery and equipment total | Costs of materials - total |
| Payroll | Capital expenditure for plant and equipment - autos, trucks, etc for highway use | Costs of materials - materials, parts, containers, packaging, etc |
| Value added by manufacture | Capital expenditure for plant and equipment - computers, peripheral data processing equipment | Costs of materials - resales |
| Cost of materials consumed | Capital expenditure for plant and equipment - all other expenditures | Costs of materials - purchased fuels |
| Value of shipments | Value of manufacturers inventories by stage of fabrication - end of year | Costs of materials - purchased electricity |
| Costs of materials - contract work | Industry cost of capital | Average industry dividend |

As set forth herein, the universe may refer to a complete set of a group of financial objects, for example. Within the group, there may be sub-groups, termed sectors. Each sector may include additional sub-portions, termed sub-sectors. This process may be reiterated for finer degrees of granularity as well.

As one example, the universe may comprise all publicly traded stocks. A sector within the universe may comprise all publicly traded stocks for the developed world except the United States. An exemplary ADBI using the foregoing sector may be ordered in descending order of their fundamental value, and the fundamental value of each company may be divided, for example, by its free-float adjusted market capitalization. The largest small and medium capitalization securities may then be selected. The latter will be the FTSE RAFI® Developed ex US Mid Small 1500 Index constituents. The weights of the constituents in the underlying index may be set proportional to their fundamental value, for example.

Exemplary industry metrics that may be used in weighting financial objects may be found in Table 3.

TABLE 3

Exemplary Industry Metrics

FTSE RAFI ® Utilities Sector Portfolio
FTSE RAFI ® Basic Materials Sector Portfolio
FTSE RAFI ® Consumer Goods Sector Portfolio
FTSE RAFI ® Consumer Services Sector Portfolio
FTSE RAFI ® Energy Sector Portfolio
FTSE RAFI ® Financials Sector Portfolio
FTSE RAFI ® Industrials Sector Portfolio
FTSE RAFI ® Health Care Sector Portfolio
FTSE RAFI ® Telecom & Technology Sector Portfolio Exemplary Process Control System According to an exemplary embodiment, the system 800 may be used to compute using data objects input via an input/output subsystem, a multi-dimensional array storing database system for storage of a multi-dimensional array computed via a multi-dimensional object array creation subsystem may include a selection subsystem operative to select one or more objects based on one or more technical parameters, and a weighting subsystem operative to weight the selected one or more objects based on one or more technical parameters, wherein the technical parameters are chosen such that the technical parameters avoid influence of an undesirable predetermined technical criterion and/or criteria, so as to avoid influence of the undesirable predetermined technical criterion and/or criteria. As a result of elimination of the undesirable predetermined technical criterion and/or criteria, the multi-dimensional array selected and/or weighted to avoid influence of the undesirable predetermined technical criterion and/or criteria may as a result perform processing so as to avoid negative effects from the undesirable predetermined technical criterion and/or criteria. An exemplary embodiment of the selection subsystem may be operative to select objects from a predetermined universe of objects to obtain a subset of the universe, where the selection is based on a technical parameter that is not influenced by the undesirable technical criterion and/or criteria. Following execution of the selection subsystem, according to an exemplary embodiment, an exemplary weighting subsystem may be operative to weight the resulting selected objects by a weighted combination of two or more technical weighting criteria, which are not influenced by the undesirable technical criterion and/or criteria. The process may be used for such technical processes as may include, e.g. but are not limited to, industrial automation, production process automation, a manufacturing process, and/or a chemical processing system, among others as described elsewhere, herein. According to an exemplary embodiment, the process steps may be executed on one or more computing platforms.

According to one exemplary embodiment, the weighting subsystem may further compute an algorithmically computed summation of a plurality of weighting factors, the plurality of weighting factors including a first of the plurality of weighting factors, where the first includes a first given computational product of a first object value and a first technical parameter value associated with the first object value, and a second of the plurality of weighting factors, where the second includes a second given computational product of a second object value and a second technical parameter value associated with the second object value, and/or any additional of the plurality of weighting factors, where the any additional includes an additional given computational product of an additional object value and an additional technical parameter value associated with the additional object value.

Exemplary Embodiment of Computer Environment

An exemplary computer system that may be used in implementing, e.g., but not limited to, analysis host 102, trading host 104, exchange host 112 and/or components of a network coupling the analysis host 102 and trading host 104 together, such as, e.g., but not limited to, a router, may be used in implementing an exemplary embodiment of the present invention, as depicted, for example, in FIG. 1. Specifically, analysis host 102, trading host 104, or exchange host 112, may include, in an exemplary embodiment a computer system 102 that may be used in computing devices such as, e.g., but not limited to, a client and/or a server, etc., according to an exemplary embodiment of the present invention. FIG. 1 depicts an exemplary embodiment of a computer system that may be used as a client device or analysis host 102, trading host 104, and/or a server device (not shown), which may provide access to, e.g., but not limited to, entity data database 106, and/or analysis program 114, trading accounts database 108 and/or trading software 116, and may be used to store, and or distribute index 110, according to an exemplary embodiment. The present invention (or any part(s) or function (s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 102 may be provided including, in an exemplary embodiment an exemplary computer system useful for implementing the present invention. Specifically, analysis host 102 and/or trading host 104 may include or be implemented on one or more example computer system(s), which in an exemplary embodiment may include, e.g., (but not limited to) a personal computer (PC) system running an operating system such as, e.g., (but not limited to) MICROSOFT® WINDOWS® NT/98/2000/XP/CE/ME/ VISTA/7, etc. available from MICROSOFT® Corporation of Redmond, Wash., U.S.A. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 102, 104, 112 may be shown in FIG. 1. Other components of the invention, such as, e.g., (but not limited to) a computing device, a communications device, mobile phone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 1. Services may be provided on demand using, e.g., but not limited to, an interactive television (iTV), a video on demand system (VOD), and via a digital video recorder (DVR), or other on demand viewing system.

The computer system 102, 104, 112 may include, e.g., but is not limited to, one or more processors, such as, e.g., but not limited to, microprocessor(s). The processor(s) may be connected and/or coupled to a communications infrastructure (e.g., but not limited to, a communications bus, cross-over bar, or network, back plane, mother board, etc.). Various exemplary software embodiments may be described in terms of this exemplary computer system. After reading this description, it may become apparent to a person skilled in the relevant art(s) how to implement the invention using other computer systems and/or architectures.

Computer system 102, 104, 112 may include a display interface such as, e.g., but not limited to, cathode ray tube (CRT), a monitor, a flat panel display, a liquid crystal display (LCD) monitor, touch screen, etc., that may forward, e.g., but not limited to, graphics, text, and other data, etc., from the communication infrastructure (or from a frame buffer, etc., not shown) for display on the display unit.

The computer system 102, 104, 112 may also include, e.g., but may not be limited to, a main memory, random access memory (RAM), and a secondary memory, etc. The secondary memory may include, for example, (but not limited to) a hard disk drive and/or a removable storage drive, representing a floppy diskette drive, a magnetic tape drive, an optical disk drive, a compact disk drive (CD-ROM), a magneto-optical drive, a digital versatile disk (DVD), a SDRAM, Flash drive, etc. The removable storage drive of 102, 104, 112 may, e.g., but not limited to, read from and/or write to a removable storage unit in a well known manner. A removable storage unit, also called a program storage device or a computer program product, may represent, e.g., but not limited to, a floppy disk, magnetic tape, optical disk, compact disk, a magneto-optical drive, a digital versatile disk (DVD), a SDRAM, Flash drive, etc. which may be read from and written to by removable storage drive. As may be appreciated, the removable storage unit may include a computer usable storage medium having stored therein computer software and/or data. In some embodiments, a "machine-accessible medium" may refer to any storage device used for storing data accessible by a computer. Examples of a machine-accessible medium may include, e.g., but not limited to: a magnetic hard disk; a floppy disk; an optical disk, like a compact disk read-only memory (CD-ROM) or a digital versatile disk (DVD); a magnetic tape; and a memory chip, etc.

In alternative exemplary embodiments, secondary memory of 102, 104, 112 may include other similar devices for allowing computer programs or other instructions to be loaded into computer system 102, 104, 112. Such devices may include, for example, a removable storage unit and an interface. Examples of such may include, e.g., but not limited to, a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to computer system 102, 104.

Computer 102, 104, 112 may also include an input device such as, e.g., (but not limited to) a keyboard, touchscreen, a mouse or other pointing device such as a digitizer, and a keyboard or other data entry device (not shown).

Computer 102, 104, 112 may also include output devices, such as, e.g., (but not limited to) display, and display interface. Computer 102, 104, 112 may include input/output (I/O) devices such as, e.g., (but not limited to) communications interface, cable and communications path, etc. These devices may include, e.g., but not limited to, a network interface card, and modems (neither are labeled). Communications interface may allow software and data to be transferred between computer system 102, 104, 112 and external devices.

In this document, the terms "computer program medium" and "computer readable medium" may be used to generally refer to media such as, e.g., but not limited to removable storage drive, a hard disk installed in hard disk drive, and signals which may be stored on the medium, etc. These computer program products may provide software to computer system 102, 104, 112. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it may be appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the memories, registers or other such information storage, transmission or display devices of the computing system 102, 104, 112.

In a similar manner, the term "processor" may refer to any device or portion of a device that processes electronic data from registers and/or memory to transform that electronic data into other electronic data that may be stored in registers and/or memory. A "computing platform" 102, 104, 112 may comprise one or more processors.

Embodiments of the present invention may include apparatuses for performing the operations herein. An apparatus may be specially constructed for the desired purposes, or it may comprise a general purpose device 102, 104, 112 selectively activated or reconfigured by a program 114, 116, for example, stored in the device 102, 104, 112.

In yet another exemplary embodiment, the invention may be implemented using a combination of any of, e.g., but not limited to, hardware, firmware and software, etc.

A "network" (see FIG. 1 may refer to a number of computers 102, 104, 112 and associated devices that may be connected and/or coupled by communication facilities. An exemplary network is shown in FIG. 1 coupling analysis host 102 and trading host 104 and/or exchange host 112. A network may involve permanent connections such as cables or temporary connections such as those that may be made through telephone or other communication links. A network may further include hard-wired connections (e.g., coaxial cable, twisted pair, optical fiber, waveguides, etc.) or wireless connections (e.g., radio frequency waveforms, free-space optical waveforms, acoustic waveforms, satellite transmissions, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), or synchronous optical network (SONET), user datagram protocol (UDP), IEEE 802.x, etc.

A "computer" 102, 104, 112 may refer to one or more apparatus or one or more systems that are capable of accepting a structured input, processing the structured input according to prescribed rules, and producing results of the processing as output. Examples of a computer 102, 104, 112 may include: a computer; a stationary or portable computer; a computer having a single processor, multiple processors, or multi-core processors, which may operate in parallel or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer 102, 104, 112 or software, such as, for example, a digital signal processor (DSP), a field-programmable gate array (FPGA), an application specific integrated circuit (ASIC), an application specific instruction-set processor (ASIP), a chip, chips, or a chip set; a system-on-chip (SoC) or a multiprocessor system-on-chip (MPSoC); a communications device, a telephone, a mobile phone, a portable phone, an optical computer; a quantum computer; a biological computer; and an apparatus that may accept data, may process data in accordance with one or more stored software programs, may generate results, and typically may include input, output, storage, arithmetic, logic, and control units.

"Software" may refer to prescribed rules to operate a computer or a portion of a computer. Examples of software may include, e.g., but not limited to: code segments; instructions; applets; pre-compiled code; compiled code; interpreted code; computer programs; and/or programmed logic.

A "computer-readable medium" may refer to any storage device used for storing data accessible by a computer 102, 104, 112. Examples of a computer-readable medium may include: a magnetic hard disk; a floppy disk; a magneto-optical device, an optical disk, such as a CD-ROM and a DVD; a magnetic tape; a memory chip; a flash memory device, an SDRAM card, or other types of media that can store machine-readable instructions thereon.

A "computer system" may refer to a system 102, 104, 112 having one or more computers, where each computer may include a computer-readable medium embodying software to operate the computer 102, 104, 112. Examples of a computer system 102, 104, 112 may include: a distributed computer system for processing information via computer systems linked by a network; two or more computer systems connected together via a network for transmitting or receiving information between the computer systems; and one or more apparatuses or one or more systems that may accept data, may process data in accordance with one or more stored software programs, may generate results, and typically may include input, output, storage, arithmetic, logic, and control units.

Exemplary Communications Embodiments

In one or more embodiments, the present embodiments are practiced in the environment of a computer network or networks. The network (as depicted for example in FIG. 1, coupling analysis host 102 to trading host 104, and/or to exchange host 112, can include, e.g., but not limited to, a private network, or a public network (for example the Internet, as described below), or a combination of both. The network includes hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them called interprocess communication pathways.

On these pathways, appropriate communications protocols are used. The distinction between hardware and software may not be easily defined, with the same or similar functions capable of being preformed with use of either, or alternatives.

An exemplary computer and/or telecommunications network environment in accordance with the present embodiments may include node, which include may hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently.

In an exemplary embodiment, the processes may communicate with one another through interprocess communication pathways (not labeled) supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless e-mail devices including BlackBerry™ devices), document processing devices (such as scanners, printers, facsimile machines, or multifunction document machines), or complex entities (such as local-area networks or wide area networks) to which are connected a collection of processors, as described. For example, in the context of the present invention, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present invention, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include BlueTooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

The embodiments may be employed across different generations of wireless devices. This includes 1G-5G according to present paradigms. 1G refers to the first generation wide area wireless (WWAN) communications systems, dated in the 1970s and 1980s. These devices are analog, designed for voice transfer and circuit-switched, and include AMPS, NMT and TACS. 2G refers to second generation communications, dated in the 1990s, characterized as digital, capable of voice and data transfer, and include HSCSD, GSM, CDMA IS-95-A and D-AMPS (TDMA/IS-136). 2.5G refers to the generation of communications between 2G and 3 G. 3G refers to third generation communications systems recently coming into existence, characterized, for example, by data rates of 144 Kbps to over 2 Mbps (high speed), being packet-switched, and permitting multimedia content, including GPRS, 1xRTT, EDGE, HDR, W-CDMA. 4G refers to fourth generation and provides an end-to-end IP solution where voice, data and streamed multimedia can be served to users on an "anytime, anywhere" basis at higher data rates than previous generations, and will likely include a fully IP-based and integration of systems and network of networks achieved after convergence of wired and wireless networks, including computer, consumer electronics and communications, for providing 100 Mbit/s and 1 Gbit/s communications, with end-to-end quality of service and high security, including providing services anytime, anywhere, at affordable cost and one billing. 5G refers to fifth generation and provides a complete version to enable the true World Wide Wireless Web (WWWW), i.e., either Semantic Web or Web 3.0, for example. Advanced technologies may include intelligent antenna, radio frequency agileness and flexible modulation are required to optimize ad-hoc wireless networks.

As noted, each node 102-108 includes one or more processes 112, 114, executable by processors 110 incorporated into the nodes. In a number of embodiments, the set of processes 112, 114, separately or individually, can represent entities in the real world, defined by the purpose for which the invention is used.

Furthermore, the processes and processors need not be located at the same physical locations. In other words, each processor can be executed at one or more geographically distant processor, over for example, a LAN or WAN connection. A great range of possibilities for practicing the embodiments may be employed, using different networking hardware and software configurations from the ones above mentioned.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. While this invention has been particularly described and illustrated with reference to a preferred embodiment, it will be understood to those having ordinary skill in the art that changes in the above description or illustrations may be made with respect to formal detail without departing from the spirit and scope of the invention.

What is claimed is:

1. A computer implemented method for trading a plurality of financial securities based on an index, the method performed by at least one processor configured to perform the method, the method comprising enabling the at least one processor to perform:

(A) selecting by the at least one processor a portfolio of financial securities for trading according to the index; and (B) trading by the at least one processor one or more financial securities of said portfolio of financial securities based on the index, the index having been constructed based on a method of constructing the index configured to be performed by at least one processor, the method of constructing the index comprising enabling the at least one processor to perform:

(a) accessing by the at least one processor of one or more databases storing and permitting retrieval of data about a plurality of entities and a plurality of corresponding financial securities each issued by or having been issued by at least one of the plurality of entities;

(b) receiving by the at least one processor at least one criterion of the index;

(c) receiving by the at least one processor at least one objective measure of scale regarding one or more of the plurality of entities associated with said corresponding financial securities;

(d) retrieving by the at least one processor one or more of said data about a plurality of said entities and said corresponding financial securities;

(e) selecting a subset of said data by the at least one processor said one or more data to be a quantitative data reflecting the amount of said at least one objective measure of scale associated with each of said entities, wherein said objective measure of scale is substantially independent of:
(i) the market prices of any of said financial securities; and
(ii) the market capitalization of any of said entities,
wherein said at least one objective measure of scale comprises a measure of the size of each said entity associated with each said given financial securities, and wherein said measure of the size of each said entity corresponding to each said financial securities comprises at least one of:
gross revenue of a said entity associated with a said financial security,
sales of a said entity associated with a said financial security,
debt to equity adjusted sales of a said entity,
earnings of a said entity associated with a said financial security,
income of a said entity associated with a said financial security,
earnings before interest and tax (EBIT) of a said entity associated with a said financial security,
earnings before interest, taxes, depreciation and amortization (EBITDA) of a said entity associated with a said financial security,
number of employees of a said entity associated with a said financial security,
book value of a said entity associated with a said financial security,
cumulative retained cashflow of a said financial security,
assets of a said entity associated with a said financial security,
liabilities of a said entity associated with a said financial security,
net worth of a said entity associated with a said financial security,
cashflow of a said entity associated with a said financial security,
any dividends of a said entity associated with a said financial security,
any distribution to financial security holders by a said entity,
any financial security buybacks by a said entity,
an attribute relating to employees of a said entity associated with a said financial security,
an attribute relating to floor space of a said entity associated with a said financial security,
an attribute relating to office space of a said entity associated with a said financial security,
an attribute relating to location of a said entity associated with a said financial security,
a demographic measure (DM) of a said entity associated with a said financial security, or
a measure relating to a demographic attribute of a said entity associated with a said financial security;
(f) ranking by the at least one processor said entities based upon a said quantitative data associated with the at least one objective measure of scale of each of said entities;
(g) selecting by the at least one processor a subset based on said at least one criterion of the index of financial securities of the entities meeting said at least one criterion of said quantitative data to comprise the plurality of constituent index financial securities exclusively comprising the index of financial securities; and (h) calculating by the at least one processor percentage weights for the index of financial securities to be objective measure of scale weights substantially independent of
(i) any of said market prices of any of said financial securities; and
(ii) any of said market capitalization of any of said entities,
wherein the calculating comprises:
(i) adding the quantitative data of each of said at least one objective measure of scale for all of said constituent index financial securities to yield a sum total quantitative data for said at least one objective measure of scale; and
(ii) dividing a said quantitative data of a said at least one objective measure of scale for each said constituent index financial securities by the sum total quantitative data to yield the objective measure of scale weight of each of the constituent index financial securities comprising the index of financial securities,
wherein said at least one objective measure of scale comprises a measure of the size of each said entity associated with each said given constituent index financial security, and
wherein said measure of the size of each said entity corresponding to each said constituent index financial security comprises at least one of:
gross revenue of a said entity associated with said constituent index financial security,
sales of a said entity associated with said constituent index financial security,
debt to equity adjusted sales of a said entity associated with a said financial security,
earnings of a said entity associated with a said financial security,
income of a said entity associated with said constituent index financial security,
earnings before interest and tax (EBIT) of a said entity associated with said constituent index financial security,
earnings before interest, taxes, depreciation and amortization (EBITDA) of a said entity associated with said constituent index financial security,
number of employees of a said entity associated with said constituent index financial security,
book value of a said entity associated with said constituent index financial security,
cumulative retained cashflow of a said entity,
assets of a said entity associated with said constituent index financial security,
liabilities of a said entity associated with said constituent index financial security,
net worth of a said entity associated with said constituent index financial security,
cashflow of a said entity associated with said constituent index financial security,
any dividends of a said entity associated with said constituent index financial security,
any distribution to financial security holders by a said entity,
any financial security buybacks by a said entity,
an attribute relating to employees of a said entity associated with said constituent index financial security,
an attribute relating to floor space of a said entity associated with said constituent index financial security,
an attribute relating to office space of a said entity associated with said constituent index financial security,
an attribute relating to location of a said entity associated with said constituent index financial security, a demographic measure (DM) of a said entity associated with said constituent index financial security, or a measure relating to a demographic attribute of a said entity associated with said constituent index financial security.

2. The computer implemented method of claim 1, wherein the portfolio of financial securities comprises at least one of:
a fund (F);
a mutual fund (MF);
a fund of funds (FF);
an financial security account;
an exchange traded fund (ETF);
a separate account;
a comingled account;
a pooled trust;
a limited liability company; or
a limited partnership.

3. The computer implemented method according to claim 1, wherein said method further comprises: rebalancing the portfolio of financial securities based on the index of assets.

4. The computer implemented method according to claim 3, wherein said rebalancing is performed on a periodic basis.

5. The computer implemented method according to claim 3, wherein said rebalancing is based upon the constituent financial securities reaching a threshold value.

6. The computer implemented method according to claim 3, wherein said rebalancing is performed on a periodic basis.

7. The computer implemented method according to claim 3, wherein said rebalancing is based upon the constituent financial securities reaching a threshold value.

8. The method of claim 1, wherein said financial securities comprises:
at least one unit of interest in at least one of:
an asset;
a liability;
a tracking portfolio;
a financial instrument or a security, wherein said financial instrument or said security denotes at least one of a debt, an equity interest, or a hybrid;
a derivatives contract, including at least one of:
a future, a forward, a put, a call, an option, a swap, or any other transaction relating to a fluctuation of an underlying asset, notwithstanding the prevailing value of the contract, and notwithstanding whether such contract, for purposes of accounting, is considered an asset or liability;
a fund; or
an investment entity or account of any kind, including an interest in, or rights relating to at least one of:
a hedge fund, an exchange traded fund (ETF), a fund of funds, a mutual fund, a closed end fund, an investment vehicle, or any other pooled or separately managed investments.

9. The computer implemented method according to claim 1 wherein the index of financial securities comprises an accounting data index (ADI), the method comprising:
a) receiving, by at least one processor, the ADI from an index provider, wherein the index provider previously constructed the ADI and stored the ADI on at least one analysis host processor,
the at least one analysis host processor of the index provider comprising at least one processor,
at least one of the at least one processors adapted to access by the at least one analysis host processor one or more databases storing and permitting retrieval of data about a plurality of entities and a plurality of corresponding financial securities each issued by or having been issued by at least one of the plurality of entities;
at least one of the at least one processors adapted to receive by the at least one analysis host processor the at least one measure of scale regarding one or more of the plurality of financial securities or one or more of the plurality of the entities associated with the corresponding financial securities;
at least one of the at least one processors adapted to retrieve by the at least one analysis host processor one or more of the data about the plurality of the entities and the corresponding financial securities;
at least one of the at least one processors adapted to receive a universe of the financial securities;
at least one of the at least one processors adapted to select a subset of the universe of the financial securities based on any measure of scale of the entities of the financial objects to obtain a subset of the universe;
at least one of the at least one processors adapted to select a plurality of financial securities of the subset based upon at least one accounting data related to the entities of the financial object to obtain a plurality of constituent index assets of the ADI; and
at least one of the at least one processors adapted to weight said plurality of financial securities based upon at least one accounting data related to the entities of the financial securities to obtain a plurality of constituent weightings of the financial securities of the ADI; and
b) purchasing, by the at least one processor, a portfolio of financial securities by at least one trading host comprising at least one processor, said portfolio of financial securities comprising the plurality of constituent assets of the ADI in proportion to the constituent weights of the ADI received.

10. The method according to claim 9, further comprising:
c) altering, by the at least one processor based on user input, said portfolio of financial securities by said at least one trading host comprising said at least one processor, when the ADI received from the index provider changes over time, said altering comprising at least one of:
i) purchasing by said at least one trading host at least one of: constituent financial securities of the ADBI, or any new constituent financial securities of the ADI over time;
ii) purchasing by said at least one trading host any additional constituent financial securities based on changes in the constituent weights of the constituent financial securities making up the ADI over time;
iii) selling by said at least one trading host any previous constituent financial securities no longer components of the ADI over time; or
iv) selling by said at least one trading host any previous constituent financial securities necessitated by changes in the calculated weights of the constituent financial securities over time.

11. The method of claim 1, wherein the method of constructing the index is performed by at least one of: an index designer, an index calculator, or an index provider.

12. The method of claim 1, wherein the method of trading is performed by at least one of: a portfolio provider, an index calculator, or an index provider.

13. The method of claim 1, wherein the method of constructing the index is performed in advance of said method of trading.

14. The method of claim 1, wherein the method of constructing the index is performed periodically, and the method of trading is performed as the constituents and the weightings of the index of financial securities changes over time.

15. The method of claim 1, wherein the method of trading comprises trading based on rebalancing the portfolio of financial securities over time.

16. The method of claim 1, wherein the method of constructing the index comprises rebalancing the index of financial securities over time.

17. The method of claim 1, wherein said ranking comprises determining whether a given financial security should be included in the index.

18. The method of claim 1, wherein said ranking comprises ordering by a value of said at least one objective measure of scale.

19. The method according to claim 1, wherein said trading based on the index comprises:
receiving, by at least one processor, the index and considering the index as a universe of financial securities;
determining, by the at least one processor, a subset of the universe of the financial securities based on any measure of scale of the entities of the financial objects to obtain said subset of financial securities of the universe of financial securities; and
trading based on said subset of financial objects.

20. The method of 1 wherein the index construction method further comprises:
selecting by the at least one processor a universe (U) of entities based on any measure of size of said entities;
selecting by the at least one processor a subset (SU) of said universe comprising
selecting said entities of the subset of said universe based on at least one of: said at least one objective measure of scale, at least one other objective measure of scale, or at least one additional objective measure of scale comprising a measure of the size of each said entity associated with each said given financial security, and wherein said measure of the size of each said entity corresponding to each said financial security comprises at least one of:
gross revenue of a said entity associated with a said financial security,
sales of a said entity associated with a said financial security,
debt to equity adjusted sales of a said entity,
earnings of a said entity associated with a said financial security,
income of a said entity associated with a said financial security,
earnings before interest and tax (EBIT) of a said entity associated with a said financial security,
earnings before interest, taxes, depreciation and amortization (EBITDA) of a said entity associated with a said financial security,
number of employees of a said entity associated with a said financial security,
book value of a said entity associated with a said financial security,
cumulative retained cashflow of a said entity,
assets of a said entity associated with a said financial security,
liabilities of a said entity associated with a said financial security,
net worth of a said entity associated with a said financial security,
cashflow of a said entity associated with a said financial security,
any dividends of a said entity associated with a said financial security,
any distribution to financial security holders by a said entity;
any financial security buybacks by a said entity;
an attribute relating to employees of a said entity associated with a said financial security,
an attribute relating to floor space of a said entity associated with a said financial security,
an attribute relating to office space of a said entity associated with a said financial security,
an attribute relating to location of a said entity associated with a said financial security,
a demographic measure (DM) of a said entity associated with a said financial security,
any other non-price measure of size of a said entity associated with a said financial security, or
a measure relating to a demographic attribute of a said entity associated with a said financial security.

21. The computer implemented method of claim 20, wherein at least one of the universe or the subset of the universe comprises at least one of:
a sector;
a market;
a market sector;
an industry sector;
a geographic sector;
an international sector;
a sub-industry sector;
a government issue; or
a tax exempt financial object.

22. The computer implemented method of claim 20, wherein said plurality of entities comprising said universe is selected from a group comprising all publicly traded companies.

23. The computer implemented method of claim 20, wherein said plurality of entities comprising said subset comprises all publicly traded companies.

24. The computer implemented method of claim 20, further comprising: selecting a subset (SSU) of said subset based on any measure of size of said entities.

25. The computer implemented method of claim 20, further comprising: selecting another subset (SSU) of said subset based on at least one of: a growth based measure; a value based measure; a large capitalization based measure; a small capitalization based measure; a mid capitalization based measure; a high price to earnings ratio based measure; or a low price to earnings ratio based measure.

26. The computer implemented method of claim 20, comprising partitioning of said subset to generate one or more partitioned subsets.

27. The computer implemented method of claim 20, comprising partitioning of the index into a plurality of partitioned sub-indexes, and wherein said portfolio is based on at least one of said plurality of partitioned sub-indexes.

28. The computer implemented method of claim 27, wherein said partitioning is based on any criterion.

29. The computer implemented method of claim 1, wherein the subset comprises a group of entities greater than 500.

30. The computer implemented method of claim 20, wherein selecting comprises eliminating from the universe a secondary subset (SSU) of any of said entities.

31. The computer implemented method of claim 30, wherein said calculating comprises calculating weights of the remaining entities left after said eliminating.

32. The computer implemented method of claim 31, wherein said eliminating comprises eliminating based on one of an illiquidity measure or a liquidity measure of the financial securities of the eliminated entities.

33. The computer implemented method of claim 20, wherein each of said financial securities comprise at least one of:
a liability;
a tracking portfolio;
a financial instrument or a security, wherein said financial instrument or said security denotes a debt, an equity interest, or a hybrid;
a derivatives contract, including at least one of:
a future, a forward, a put, a call, an option, a swap, or any other transaction relating to a fluctuation of an underlying asset, notwithstanding the prevailing value of the contract, and notwithstanding whether such contract, for purposes of accounting, is considered an asset or liability;
a commodity;
a financial position;
a currency position;
a trust, a real estate investment trust (REIT),
a real estate operating company (REOC), or a portfolio of trusts;
a debt instrument comprising at least one of: a bond, a debenture, a subordinated debenture, a mortgage bond, a collateral trust bond, a convertible bond, an income bond, a guaranteed bond, a serial bond, a deep discount bond, a zero coupon bond, a variable rate bond, a deferred interest bond, a commercial paper, a government security, a certificate of deposit, a Eurobond, a corporate bond, a government bond, a municipal bond, a treasury-bill, a treasury bond, a foreign bond, an emerging market bond, a high yield bond, a developed market bond, a junk bond, a collateralized instrument, an exchange traded note (ETN), or other agreements between a borrower and a lender;
a fund; or
an investment entity or account of any kind, including an interest in, or rights relating to:
a hedge fund, an exchange traded fund (ETF), a fund of funds, a mutual fund, a closed end fund, an investment vehicle, or any other pooled or separately managed investments.

34. The computer implemented method according to claim 1, wherein said each of said financial securities comprises at least one of a stock (S); a commodity (CO); a futures contract (FC); a bond (B); a municipal bond (MB); a corporate bond (CB); a mutual fund (MF); a hedge fund (HF); a fund of funds (FF); an exchange traded fund (ETF); or a derivative (DE).

35. The computer implemented method according to claim 1, wherein each of said financial securities comprises a stock (S).

36. The computer implemented method according to claim 1, wherein each of said financial securities comprises a commodity (CO).

37. The computer implemented method according to claim 1, wherein each of said financial securities comprises a futures contract (FC).

38. The computer implemented method according to claim 1, wherein each of said financial securities comprises a bond (B).

39. The computer implemented method according to claim 1, wherein each of said financial securities comprises a mutual fund (MF).

40. The computer implemented method according to claim 1, wherein each of said financial securities comprises a hedge fund (HF).

41. The computer implemented method according to claim 1, wherein each of said financial securities comprises a fund of funds (FF).

42. The computer implemented method according to claim 1, wherein each of said financial securities comprises an exchange traded fund (ETF).

43. The computer implemented method according to claim 1, wherein each of said financial securities comprises a derivative (DE).

44. The computer implemented method according to claim 1, wherein said weighting comprises performing a negative weighting on any of said financial securities.

45. The computer implemented method according to claim 44, wherein said negative weighting is performed for purposes of at least one of: establishing or measuring performance, for at least one of: any security (S); a portfolio of financial securities (PA); a hedge fund (HF); or at least one of: a long or a short position.

46. The computer implemented method according to claim 1, wherein said at least one objective measure of scale comprises a measure relating to at least one of an underlying attribute of one or more of the financial securities, or a said entity associated with a said financial security.

47. The computer implemented method according to claim 1, (i) wherein said sales comprises at least one of: total sales, foreign sales, domestic sales, net sales, net revenue or gross sales, (ii) wherein said book value comprises at least one of: a value adjusted for inflation, a value adjusted for replacement or a value adjusted for liquidation value, (iii) wherein the cash flow comprises at least one of: a said entity associated with a said financial security, or future value of expected cash flow of a said entity associated with a said financial security, and (iv) wherein said at least one objective measure of scale associated with any said financial securities comprises at least one of:
profitability of a said entity associated with a said financial security;
retained earnings of a said entity associated with a said financial security;
earnings per share of a said entity associated with a said financial security;
reported profits of a said entity associated with a said financial security;
reported pre-exceptional entity of a said entity associated with a said financial security;
value of an expected cash flow of a said entity associated with a said financial security;
dividends of a said entity associated with a said financial security;
assets of a said entity associated with a said financial security;
tangible assets of a said entity associated with a said financial security;
intangible assets of a said entity associated with a said financial security;
fixed assets of a said entity associated with a said financial security;
property of a said entity associated with a said financial security;
plant of a said entity associated with a said financial security;

equipment of a said entity associated with a said financial security;
goodwill of a said entity associated with a said financial security;
replacement value of assets of a said entity associated with a said financial security;
liquidation value of assets of a said entity associated with a said financial security;
liabilities of a said entity associated with a said financial security;
long term liabilities of a said entity associated with a said financial security;
short term liabilities of a said entity associated with a said financial security;
net worth of a said entity associated with a said financial security;
research and development expense of a said entity associated with a said financial security;
accounts receivable of a said entity associated with a said financial security;
accounts payable of a said entity associated with a said financial security;
cost of goods sold (CGS) of a said entity associated with a said financial security;
budget of a said entity associated with a said financial security;
capital budget of a said entity associated with a said financial security;
cash budget of a said entity associated with a said financial security;
direct labor budget of a said entity associated with a said financial security;
factory overhead budget of a said entity associated with a said financial security;
operating budget of a said entity associated with a said financial security;
sales budget of a said entity associated with a said financial security;
liquidity of a said entity associated with a said financial security;
book income of a said entity associated with a said financial security;
tax income of a said entity associated with a said financial security;
capitalization of earnings of a said entity associated with a said financial security;
capitalization of goodwill of a said entity associated with a said financial security;
capitalization of interest of a said entity associated with a said financial security;
capitalization of revenue of a said entity associated with a said financial security;
capital spending of a said entity associated with a said financial security;
cash of a said entity associated with a said financial security;
compensation of a said entity associated with a said financial security;
overhead costs of a said entity associated with a said financial security;
liquidation value of entity of a said entity associated with a said financial security;
capitalization of cash of a said entity associated with a said financial security;
capitalization of earnings of a said entity associated with a said financial security;
capitalization of revenue of a said entity associated with a said financial security; or
value of expected measure of scale of a said entity associated with a said financial security.

48. The computer implemented method according to claim 1, wherein said at least one objective measure of scale comprises a ratio of any combination of objective measures of scale relating to one or more of said financial securities and the ratio is not based on any one of:
    weighting said one or more financial securities based on market capitalization; equal weighting; or
    weighting in proportion to the market price of said one or more financial securities.

49. The computer implemented method according to claim 48, wherein said ratio of any combination of said objective measures of scale comprises at least one of:
    current ratio,
    debt ratio,
    overhead expense as a percent of sales, or
    debt service burden ratio.

50. The computer implemented method according to claim 1, wherein said at least one objective measure of scale comprises said demographic measure of said entity of said financial security, and wherein said demographic measure comprises at least one of a financial attribute, an accounting data attribute, a non-financial attribute, a non-accounting data attribute.

51. The computer implemented method according to claim 1, wherein said measure of scale comprises a demographic measure comprising any accounting data appearing in an annual report of a said entity.

52. The computer implemented method according to claim 1, wherein said objective measure of scale comprises at least one of:
    a financial metric;
    a non-financial metric;
    a non-market related metric;
    a number of employees;
    a floor space; or
    an office space.

53. The method according to claim 1, wherein said at least one objective measure of scale comprises an economic indicator (EI).

54. The computer implemented method according to claim 1, wherein said at least one objective measure of scale comprises a measure tied to a particular geography associated with at least one of the financial securities or the entity.

55. The computer implemented method of claim 1, wherein the portfolio of financial securities comprises at least one of:
    a fund (F);
    a mutual fund (MF);
    a fund of funds (FF);
    an financial security account;
    an exchange traded fund (ETF);
    a separate account;
    a pooled trust; or
    a limited partnership.

56. The computer implemented method according to claim 1, comprising:
    selecting a subset of the portfolio of financial securities for trading; and
    trading said subset of one or more of said financial securities of said portfolio of financial securities based on the index of financial securities.

57. The computer implemented method according to claim 1, wherein said trading comprises: rebalancing the portfolio of financial securities based on the index of financial securities.

58. The computer implemented method according to claim 57, wherein said rebalancing is performed on a periodic basis.

59. The computer implemented method according to claim 57, wherein said rebalancing is based upon the constituent financial securities reaching a threshold value.

60. The computer implemented method according to claim 57, further comprising: applying one or more rules associated with the index of financial securities.

61. The computer implemented method according to claim 1, wherein the method of constructing the index is used for at least one of: investment management; or investment portfolio benchmarking.

62. The computer implemented method of claim 1, wherein the index construction method further comprises an enhanced index investing method, comprising:
constructing a portfolio of financial securities in a fashion in which at least one of: holdings; performance; or characteristics, are substantially similar to the index of financial securities.

63. The computer implemented method according to claim 1, wherein the method further comprises: gathering data about the plurality of financial securities by an index construction manager device comprising computerized databases.

64. The computer implemented method according to claim 1, wherein said at least one objective measure of scale comprises at least one of a financial metric, or a non-financial metric.

65. The computer implemented method of claim 1, wherein the index construction method further comprises at least one of: (i) selecting a group of entities having at least a minimum measure of size above a first threshold value; (ii) selecting a group of entities having at least a minimum level of liquidity surpassing a second threshold value; or (iii) selecting a group of entities having at least a minimum number of tradeable financial securities outstanding above a predetermined third threshold value.

66. The computer implemented method of claim 1, wherein said plurality of entities comprises all publicly traded companies.

67. The computer implemented method of claim 1, wherein said calculating comprises mathematical blending.

68. The computer implemented method of claim 1, wherein said calculating comprises mathematical averaging.

69. The computer implemented method of claim 68, wherein said mathematical averaging is performed on at least one of: a 1-year period, a 3-year period, a 4-year period, a 3-5 year period, a 5-year period, a 6-year period, a 7-year period, a 8-year period or a 9-year period.

70. The computer implemented method of claim 68, wherein said mathematical averaging is performed on a period less than a quarter.

71. The computer implemented method of claim 68, wherein said mathematical averaging is performed on a period equal to, or greater than a quarter.

72. The computer implemented method of claim 68, wherein said mathematical averaging is independent of at least a current quarter.

73. The computer implemented method of claim 68, wherein said mathematical averaging is performed so as to reduce price correlation.

74. The computer implemented method of claim 68, further comprising eliminating another subset (AS) of said entities based on at least one of an illiquidity or a liquidity measure.

75. The computer implemented method of claim 1, further comprising using a statistical technique to at least one: of mimic or substantially mirror a performance of the index.

76. The computer implemented method of claim 1, wherein said plurality of entities comprises substantially all entities having publicly available periodic financial reports.

77. The computer implemented method of claim 1, wherein said financial objects are held by, or on behalf of, one or a plurality of investors.

78. The computer implemented method of claim 1, wherein the index construction method is performed based on at least one of: (i) a current fundamental accounting measure, (ii) a past fundamental accounting measure, (iii) a forecasted fundamental accounting measure, or (iv) a mathematical blend of at least two of said (i) through said (iii).

79. The computer implemented method of claim 1, wherein the index construction method is performed based on taking a mathematical transformation of at least one of: (i) a current fundamental accounting measure, (ii) a past fundamental accounting measure, (iii) a forecasted fundamental accounting measure, (iv) a ratio of at least one of current, past, or forecasted fundamental accounting measures; or (v) a mathematical blend of at least two of said (i) through said (iv).

80. The computer implemented method of claim 79, wherein the mathematical transformation comprises calculating a square root of at least one of said fundamental accounting measures.

81. The computer implemented method of claim 1, wherein said objective measure of scale comprises at least one of: reported profits of a said entity associated with a said asset; reported pre-exceptional profits of a said entity associated with a said asset; value of an expected cash flow of a said entity associated with a said asset; or value of expected measure of scale of a said entity associated with a said asset.

82. The computer implemented method of claim 1, wherein said objective measure of scale comprises at least one of: reported profits of a said entity associated with a said asset; reported pre-exceptional profits of a said entity associated with a said asset; a value of an expected cash flow of a said entity associated with a said asset; a value of expected measure of scale of a said entity associated with a said asset; a forecasted earning of a said entity associated with a said asset; a forecasted dividend of a said entity associated with a said asset; a forecasted sales of a said entity associated with a said asset; a forecasted revenue of a said entity associated with a said asset; a forecasted cashflow of a said entity associated with a said asset; a forecasted cumulative retained cashflow of a said entity associated with a said asset; a forecasted distribution of a said entity to a holder of a said asset; a forecasted buyback associated with a said asset; a forecasted metric of a said entity associated with a said asset; or a forecasted fundamental accounting measure of a said entity associated with a said asset.

83. A computer implemented method for trading a plurality of financial securities, the method performed by at least one processor configured to perform the method, the method comprising enabling the at least one processor to perform:
(A) selecting by the at least one processor a portfolio of financial securities for trading according to an index of financial securities; and
(B) trading by the at least one processor one or more financial securities of said portfolio of financial securities, based on the index of financial securities, the index of financial securities constructed based on a method of constructing the index of financial securities configured to be performed by at least one processor, the method of constructing the index of financial securities comprising enabling the at least one processor to perform:

(a) gathering data by the at least one processor about the plurality of financial securities;

(b) selecting by the at least one processor a plurality of the assets to create the index of financial securities based upon at least one objective measure of scale about one or more entities associated with the financial securities, wherein said selecting is substantially independent of a market price of the financial securities and a market capitalization of said entities, wherein said at least one objective measure of scale comprises a measure of the size of each said entity associated with each said given financial security, and wherein said measure of the size of each said entity corresponding to each said financial security comprises at least one of:

gross revenue of a said entity associated with a said financial security, sales of a said entity associated with a said financial security, debt to equity adjusted sales of a said entity associated with a said financial security, earnings of a said entity associated with a said financial security, income of a said entity associated with a said financial security, earnings before interest and tax (EBIT) of a said entity associated with a said financial security, earnings before interest, taxes, depreciation and amortization (EBITDA) of a said entity associated with a said financial security, number of employees of a said entity associated with a said financial security, book value of a said entity associated with a said financial security, cumulative retained cashflow of a said entity, assets of a said entity associated with a said financial security, liabilities of a said entity associated with a said financial security, net worth of a said entity associated with a said financial security, cashflow of a said entity associated with a said financial security, any dividends of a said entity associated with a said financial security, any distribution to asset holders by a said entity, any financial security buybacks by a said entity, an attribute relating to employees of a said entity associated with a said financial security, an attribute relating to floor space of a said entity associated with a said financial security, an attribute relating to office space of a said entity associated with a said financial security, an attribute relating to location of a said entity associated with a said financial security, a demographic measure (DM) of a said entity associated with a said financial security, or a measure relating to a demographic attribute of a said entity associated with a said financial security; and (c) weighting by the at least one processor the constituent assets of the index of financial security to obtain constituent weightings based on at least one objective measure of scale regarding the entities associated with the financial security, wherein said at least one objective measure of scale comprises a measure of the size of each said entity associated with each said financial security, and wherein said measure of the size of each said entity corresponding to each said financial security comprises at least one of:

gross revenue of a said entity associated with a said financial security, sales of a said entity associated with a said financial security, debt to equity adjusted sales of a said entity associated with a said financial security, earnings of a said entity associated with a said financial security, income of a said entity associated with a said financial security, earnings before interest and tax (EBIT) of a said entity associated with a said financial security, earnings before interest, taxes, depreciation and amortization (EBITDA) of a said entity associated with a said financial security, number of employees of a said entity associated with a said financial security, book value of a said entity associated with a said financial security, cumulative retained cashflow of a said entity, assets of a said entity associated with a said financial security, liabilities of a said entity associated with a said financial security, net worth of a said entity associated with a said financial security, cashflow of a said entity associated with a said financial security, any dividends of a said entity associated with a said financial security, any distribution to financial security holders by a said entity, any financial security buybacks by a said entity, an attribute relating to employees of a said entity associated with a said financial security, an attribute relating to floor space of a said entity associated with a said financial security, an attribute relating to office space of a said entity associated with a said financial security, an attribute relating to location of a said entity associated with a said financial security, a demographic measure (DM) of a said entity associated with a said financial security, or a measure relating to a demographic attribute of a said entity associated with a said financial security; and (i) wherein the weighting is substantially independent of the market price of the financial securities and a market capitalization of said entities; and (ii) wherein the weighting is substantially independent of:

equal weighting;

weighting in proportion to the market price of the financial securities; and weighting in proportion to market capitalization of the entities associated with the financial securities.

84. The computer implemented method of claim 83, wherein the portfolio of financial securities comprises at least one of:
a fund (F);
a mutual fund (MF);
a fund of funds (FF);
an financial security account;
an exchange traded fund (ETF);
a separate account;
a comingled account;
a pooled trust;
a limited liability company; or
a limited partnership.

85. The computer implemented method according to claim 84, wherein said method further comprises: rebalancing the portfolio of financial securities based on the index of financial securities.

86. The method of claim 83, wherein said financial securities comprises:
at least one unit of interest in at least one of:
an asset;
a liability;
a tracking portfolio;
a financial instrument or a security, wherein said financial instrument or said security denotes at least one of a debt, an equity interest, or a hybrid;
a derivatives contract, including at least one of:
a future, a forward, a put, a call, an option, a swap, or any other transaction relating to a fluctuation of an underlying asset, notwithstanding the prevailing value of the contract, and notwithstanding whether such contract, for purposes of accounting, is considered an asset or liability;
a fund; or
an investment entity or account of any kind, including an interest in, or rights relating to at least one of:
a hedge fund, an exchange traded fund (ETF), a fund of funds, a mutual fund, a closed end fund, an investment vehicle, or any other pooled or separately managed investments.

87. The computer implemented method according to claim 83 wherein the index of financial securities comprises an accounting data index (ADI), the method comprising:
a) receiving, by at least one processor, the ADI from an index provider, wherein the index provider previously constructed the ADI and stored the ADI on at least one analysis host processor,
the at least one analysis host processor of the index provider comprising at least one processor,
at least one of the at least one processors adapted to access by the at least one analysis host processor one or more databases storing and permitting retrieval of data about a plurality of entities and a plurality of corresponding financial securities each issued by or having been issued by at least one of the plurality of entities;
at least one of the at least one processors adapted to receive by the at least one analysis host processor the at least one measure of scale regarding one or more of the plurality of financial securities or one or more of the plurality of the entities associated with the corresponding financial securities;
at least one of the at least one processors adapted to retrieve by the at least one analysis host processor one or more of the data about the plurality of the entities and the corresponding financial securities;
at least one of the at least one processors adapted to receive a universe of the financial securities;
at least one of the at least one processors adapted to select a subset of the universe of the financial securities based on any measure of scale of the entities of the financial objects to obtain a subset of the universe;
at least one of the at least one processors adapted to select a plurality of financial securities of the subset based upon at least one accounting data related to the entities of the financial object to obtain a plurality of constituent index assets of the ADI; and
at least one of the at least one processors adapted to weight said plurality of financial securities based upon at least one accounting data related to the entities of the financial securities to obtain a plurality of constituent weightings of the financial securities of the ADI; and
b) purchasing, by the at least one processor, a portfolio of financial securities by at least one trading host comprising at least one processor, said portfolio of financial securities comprising the plurality of constituent assets of the ADI in proportion to the constituent weights of the ADI received.

88. The method according to claim 87, further comprising:
c) altering, by the at least one processor based on user input, said portfolio of financial securities by said at least one trading host comprising said at least one processor, when the ADI received from the index provider changes over time, said altering comprising at least one of:
i) purchasing by said at least one trading host at least one of: constituent financial securities of the ADBI, or any new constituent financial securities of the ADI over time;
ii) purchasing by said at least one trading host any additional constituent financial securities based on changes in the constituent weights of the constituent financial securities making up the ADI over time;
iii) selling by said at least one trading host any previous constituent financial securities no longer components of the ADI over time; or
iv) selling by said at least one trading host any previous constituent financial securities necessitated by changes in the calculated weights of the constituent financial securities over time.

89. The method of claim 83, wherein the method of constructing the index is performed by at least one of: an index designer, an index calculator, or an index provider.

90. The method of claim 83, wherein the method of trading is performed by at least one of: a portfolio provider, an index calculator, or an index provider.

91. The method of claim 83, wherein the method of constructing the index is performed in advance of said method of trading.

92. The method of claim 83, wherein the method of constructing the index is performed periodically, and the method of trading is performed as the constituents and the weightings of the index of financial securities changes over time.

93. The method of claim 83, wherein the method of trading comprises trading based on rebalancing the portfolio of financial securities over time.

94. The method of claim 83, wherein the method of constructing the index comprises rebalancing the index of financial securities over time.

95. The method of claim 83, wherein said ranking comprises determining whether a given financial security should be included in the index.

96. The method of claim 83, wherein said ranking comprises ordering by a value of said at least one objective measure of scale.

97. The method according to claim 83, wherein said trading based on the index comprises:

receiving, by at least one processor, the index and considering the index as a universe of financial securities;

determining, by the at least one processor, a subset of the universe of the financial securities based on any measure of scale of the entities of the financial objects to obtain said subset of financial securities of the universe of financial securities; and trading based on said subset of financial objects.

* * * * *